US009112885B2

(12) United States Patent
Chan et al.

(10) Patent No.: US 9,112,885 B2
(45) Date of Patent: Aug. 18, 2015

(54) INTERACTIVE MULTI-TASKER

(71) Applicant: NEXTBIT SYSTEMS INC., San Francisco, CA (US)

(72) Inventors: Michael A. Chan, San Francisco, CA (US); Tom Moss, Los Altos, CA (US); Linda Tong, San Francisco, CA (US); Jaikumar Ganesh, San Francisco, CA (US); Matthew Blake Engel, San Francisco, CA (US)

(73) Assignee: NEXTBIT SYSTEMS INC.

( * ) Notice: Subject to any disclaimer, the term of this patent is extended or adjusted under 35 U.S.C. 154(b) by 0 days.

(21) Appl. No.: 14/479,140

(22) Filed: Sep. 5, 2014

(65) Prior Publication Data

US 2014/0379811 A1   Dec. 25, 2014

Related U.S. Application Data

(63) Continuation-in-part of application No. 13/772,163, filed on Feb. 20, 2013.

(60) Provisional application No. 61/708,794, filed on Oct. 2, 2012, provisional application No. 62/027,136, filed on Jul. 21, 2014, provisional application No. 62/027,245, filed on Jul. 22, 2014.

(51) Int. Cl.
*G06F 12/00* (2006.01)
*H04L 29/08* (2006.01)

(52) U.S. Cl.
CPC .................. *H04L 67/1095* (2013.01)

(58) Field of Classification Search
CPC .................................. H04L 67/1095

USPC .......................... 709/204, 25, 206
See application file for complete search history.

(56) References Cited

U.S. PATENT DOCUMENTS

| | | | |
|---|---|---|---|
| 6,811,486 B1 | 11/2004 | Luciano, Jr. | |
| 7,315,740 B2 | 1/2008 | Maes | |
| 7,326,117 B1 | 2/2008 | Best | |
| 7,490,045 B1 * | 2/2009 | Flores et al. | 705/1.1 |
| 7,774,457 B1 | 8/2010 | Talwar et al. | |
| 7,903,383 B2 | 3/2011 | Fukano et al. | |
| 8,005,956 B2 | 8/2011 | Williams et al. | |
| 8,234,348 B1 | 7/2012 | Tulchinsky et al. | |

(Continued)

OTHER PUBLICATIONS

"Data Synchronization Patterns in Mobile Application Design"—McCormick et al, Vanderbilt Univ., Sep. 2011 https://www.dre.vanderbilt.edu/~schmidt/PDF/PatternPaperv11.pdf.*

(Continued)

*Primary Examiner* — Randy Scott

(57) ABSTRACT

The disclosure is directed to an interactive multi-tasker for casting applications executing on a first computing device of a user on any of multiple computing devices of the user from any of the computing devices. Each of the computing devices presents a unified view of tasks and applications executing on each of the computing devices through the multi-tasker. The user can perform multiple actions on the tasks and applications, e.g., cast using a first device an instance of an application that is executing on a second device on to a third device. The state data is synchronized from the second device to the third device. Another instance of the application resumes execution on the third device using the synchronized state data. Once cast, each of the instances of the application executes independently of each other.

30 Claims, 41 Drawing Sheets

(56) References Cited

U.S. PATENT DOCUMENTS

| | | | |
|---|---|---|---|
| 8,290,920 B2* | 10/2012 | Mahajan et al. | 707/703 |
| 8,315,977 B2 | 11/2012 | Anand et al. | |
| 8,423,511 B1 | 4/2013 | Bhatia | |
| 8,438,298 B2 | 5/2013 | Arai et al. | |
| 8,473,577 B2 | 6/2013 | Chan | |
| 8,475,275 B2 | 7/2013 | Weston et al. | |
| 8,478,816 B2 | 7/2013 | Parks et al. | |
| 8,494,576 B1 | 7/2013 | Bye et al. | |
| 8,495,129 B2 | 7/2013 | Wolman et al. | |
| 8,515,902 B2 | 8/2013 | Savage | |
| 8,539,567 B1 | 9/2013 | Logue et al. | |
| 8,589,140 B1 | 11/2013 | Poulin | |
| 8,606,948 B2 | 12/2013 | Evans et al. | |
| 8,666,938 B1 | 3/2014 | Pancholy | |
| 8,747,232 B1 | 6/2014 | Quan et al. | |
| 8,764,555 B2 | 7/2014 | Quan et al. | |
| 8,775,449 B2 | 7/2014 | Quan et al. | |
| 8,812,601 B2 | 8/2014 | Hsieh et al. | |
| 8,840,461 B2 | 9/2014 | Quan et al. | |
| 2001/0039212 A1 | 11/2001 | Sawano et al. | |
| 2002/0161908 A1 | 10/2002 | Benitez et al. | |
| 2004/0018876 A1 | 1/2004 | Kubota et al. | |
| 2005/0147130 A1 | 7/2005 | Hurwitz et al. | |
| 2006/0030408 A1 | 2/2006 | Kiiskinen | |
| 2006/0073788 A1 | 4/2006 | Halkka et al. | |
| 2007/0130217 A1 | 6/2007 | Linyard et al. | |
| 2008/0055311 A1 | 3/2008 | Aleksic et al. | |
| 2008/0220878 A1 | 9/2008 | Michaelis | |
| 2009/0063690 A1 | 3/2009 | Verthein et al. | |
| 2009/0077263 A1 | 3/2009 | Koganti et al. | |
| 2009/0106110 A1 | 4/2009 | Stannard et al. | |
| 2009/0204966 A1 | 8/2009 | Johnson et al. | |
| 2009/0282125 A1* | 11/2009 | Jeide et al. | 709/217 |
| 2010/0173712 A1 | 7/2010 | Buhr | |
| 2010/0235511 A1 | 9/2010 | Kai | |
| 2010/0257403 A1 | 10/2010 | Virk et al. | |
| 2010/0332401 A1 | 12/2010 | Prahlad et al. | |
| 2011/0078319 A1 | 3/2011 | Ishida | |
| 2011/0093567 A1 | 4/2011 | Jeon et al. | |
| 2011/0126168 A1 | 5/2011 | Ilyayev | |
| 2011/0219105 A1* | 9/2011 | Kryze et al. | 709/223 |
| 2011/0252071 A1 | 10/2011 | Cidon | |
| 2011/0275316 A1 | 11/2011 | Suumäki et al. | |
| 2011/0286026 A1 | 11/2011 | Matsuzawa | |
| 2012/0017236 A1 | 1/2012 | Stafford et al. | |
| 2012/0023250 A1 | 1/2012 | Chen et al. | |
| 2012/0028714 A1 | 2/2012 | Gagner et al. | |
| 2012/0036218 A1 | 2/2012 | Oh et al. | |
| 2012/0036239 A1 | 2/2012 | Donaghey et al. | |
| 2012/0079095 A1 | 3/2012 | Evans et al. | |
| 2012/0084803 A1 | 4/2012 | Johansson et al. | |
| 2012/0110568 A1 | 5/2012 | Abel et al. | |
| 2012/0128172 A1 | 5/2012 | Alden | |
| 2012/0149309 A1 | 6/2012 | Hubner et al. | |
| 2012/0171951 A1 | 7/2012 | 't Hooft | |
| 2012/0203932 A1 | 8/2012 | da Costa et al. | |
| 2012/0210343 A1 | 8/2012 | McCoy et al. | |
| 2012/0303778 A1 | 11/2012 | Ahiska et al. | |
| 2012/0311820 A1 | 12/2012 | Chang | |
| 2013/0007203 A1 | 1/2013 | Szu | |
| 2013/0044106 A1 | 2/2013 | Shuster et al. | |
| 2013/0045795 A1 | 2/2013 | Fiedler | |
| 2013/0086114 A1 | 4/2013 | Wilson et al. | |
| 2013/0117806 A1 | 5/2013 | Parthasarathy et al. | |
| 2013/0159890 A1 | 6/2013 | Rossi | |
| 2013/0219381 A1 | 8/2013 | Lovitt | |
| 2013/0223240 A1 | 8/2013 | Hayes et al. | |
| 2013/0225087 A1 | 8/2013 | Uhm | |
| 2013/0304898 A1 | 11/2013 | Aggarwal et al. | |
| 2014/0040239 A1 | 2/2014 | Hirsch | |
| 2014/0053054 A1 | 2/2014 | Shen et al. | |
| 2014/0101300 A1 | 4/2014 | Rosensweig et al. | |
| 2014/0170978 A1 | 6/2014 | Wolman et al. | |
| 2014/0379853 A1 | 12/2014 | Shelton | |

OTHER PUBLICATIONS

Final Office Action mailed Jul. 24, 2014, U.S. Appl. No. 14/179,709 by Quan, J., et al., filed Feb. 13, 2014.
Final Office Action mailed Nov. 6, 2014, U.S. Appl. No. 14/158,682 by Quan, J., et al., filed Jan. 17, 2004.
International Search Report mailed Sep. 11, 2014, 7 pps., for International Application No. PCT/2013/031488 filed Mar. 21, 2014.
International Search Report and Written Opinion mailed Feb. 3, 2014, 7 pp., for International Application No. PCT/2013/62737 filed Sep. 30, 2013.
International Search Report and Written Opinion mailed Feb. 3, 2014, 7 pp., for International Application No. PCT/US13/62729 filed Sep., 30, 2013.
International Search Report and Written Opinion mailed Feb. 3, 2014, 9 pp., for International Application No. PCT/US13/62986 filed Oct. 2, 2013.
Layton, J.B., "User Space File Systems," Linux Magazine, accessed at http://www.linux-mag.com/id/7814, Jun. 22, 2010, pp. 1-4.
Non Final Office Action mailed Nov. 3, 2014, for U.S. Appl. No. 13/772,163 by Quan, J., filed Feb. 20, 2013.
Non Final Office Action mailed Oct. 23, 2014, for U.S. Appl. No. 14/252,674 by Chan, M.A., et al., filed Apr. 14, 2014.
Non Final Office Action mailed Mar. 10, 2014, co-pending U.S. Appl. No. 14/173,680, by Quan et al., filed Feb. 5, 2014.
Non-Final Office Action mailed Apr. 2, 2014, U.S. Appl. No. 14/179,709 by Quan, J., et al., filed Feb. 13, 2014.
Non-Final Office Action mailed Apr. 3, 2014, U.S. Appl. No. 14/158,682 by Quan, J., et al., filed Jan. 17, 2004.
Non-Final Office Action mailed Aug. 26, 2014, for U.S. Appl. No. 14/267,823 by Chan, M.A., et al., filed May 1, 2014.
Non-Final Office Action mailed Jun. 9, 2014, for U.S. Appl. No. 14/167,939 by Quan, J., et al., filed Jan. 29, 2014.
Non-Final Office Action mailed Mar. 7, 2014, co-pending U.S. Appl. No. 14/158,715, by Quan et al., filed Jan. 17, 2014.
Non-Final Office Action mailed May 27, 2014, U.S. Appl. No. 14/158,733 by Quan, J., et al., filed Jan. 17, 2014.
Non-Final Office Action mailed May 8, 2014, U.S. Appl. No. 14/179,744 by Quan, J., et al., filed Feb. 13, 2014.
Non-Final Office Action mailed May 9, 2014, U.S. Appl. No. 14/160,444 by Quan, J., et al., filed Jan. 21, 2014.
Notice of Allowance mailed Apr. 15, 2014, co-pending U.S. Appl. No. 14/167,834, by Quan et al., filed Jan. 29, 2014.
Notice of Allowance mailed Aug. 12, 2014, U.S. Appl. No. 14/179,709 by Quan, J., et al., filed Feb. 13, 2014.
Notice of Allowance mailed May 14, 2014, co-pending U.S. Appl. No. 14/158,715, by Quan et al., filed Jan. 17, 2014.
Notice of Allowance mailed May 20, 2014, co-pending U.S. Appl. No. 14/173,680, by Quan et al., filed Feb. 5, 2014.
Notice of Allowance mailed Sep. 3, 2014, U.S. Appl. No. 14/160,444 by Quan, J., et al., filed Jan. 21, 2014.
Restriction Requirement mailed Aug. 29, 2014, for U.S. Appl. No. 14/252,674 by Chan, M.A., et al., filed Apr. 14, 2014.
Restriction Requirement mailed Jun. 12, 2014, for U.S. Appl. No. 14/251,463 by Quan, J., et al., filed Apr. 11, 2014.
Design U.S. Appl. No. 29/486,424 by Chan, M.A., et al., filed Mar. 28, 2014.
U.S. Appl. No. 13/772,163 by Quan, J., filed Feb. 20, 2013.
U.S. Appl. No. 13/865,515 by Quan, J., et al., filed Apr. 18, 2013.
U.S. Appl. No. 14/042,398 by Chan, M.A., et al., filed Sep. 30, 2013.
U.S. Appl. No. 14/042,509 by Chan, M.A., et al., filed Sep. 30, 2013.
U.S. Appl. No. 14/042,567 by Chan, M.A., et al., filed Sep. 30, 2013.
U.S. Appl. No. 14/043,034 by Chan, M.A., et al., filed Oct. 1, 2013.
U.S. Appl. No. 14/158,682 by Quan, J., et al., filed Jan. 17, 2004.
U.S. Appl. No. 14/158,715 by Quan, J., et al., filed Jan. 17, 2014.
U.S. Appl. No. 14/158,733 by Quan, J., et al., filed Jan. 17, 2014.
U.S. Appl. No. 14/160,444 by Quan, J., et al., filed Jan. 21, 2014.
U.S. Appl. No. 14/167,834 by Quan, J., et al., filed Jan. 29, 2014.
U.S. Appl. No. 14/167,939 by Quan, J., et al., filed Jan. 29, 2014.
U.S. Appl. No. 14/173,680 by Quan, J., et al., filed Feb. 5, 2014.
U.S. Appl. No. 14/179,709 by Quan, J., et al., filed Feb. 13, 2014.
U.S. Appl. No. 14/179,744 by Quan, J., et al., filed Feb. 13, 2014.
U.S. Appl. No. 14/221,174 by Chan, M.A., et al., filed Mar. 20, 2014.
U.S. Appl. No. 14/228,190 by Quan, J., et al., filed Mar. 27, 2014.

(56) References Cited

OTHER PUBLICATIONS

U.S. Appl. No. 14/251,463 by Quan, J., et al., filed Apr. 11, 2014.
U.S. Appl. No. 14/252,674 by Chan, M.A., et al., filed Apr. 14, 2014.
U.S. Appl. No. 14/267,823 by Chan, M.A., et al., filed May 1, 2014.
U.S. Appl. No. 14/479,087 by Chan, M.A et al., filed Sep. 5, 2014.
Notice of Allowance mailed Oct. 29, 2014, for U.S. Appl. No. 14/167,939 by Quan, J., et al., filed Jan. 29, 2014.
Notice of Allowance mailed Oct. 29, 2014, for U.S. Appl. No. 14/179,744 by Quan, J., et al., filed Feb. 13, 2014.
Notice of Allowance mailed Nov. 25, 2014, for U.S. Appl. No. 14/252,674 by Chan, M.A., et al., filed Apr. 14, 2014.
Non Final Office Action mailed Dec. 3, 2014, for U.S. Appl. No. 14/251,463 by Quan, J., et al., filed Apr. 11, 2014.
Notice of Allowance mailed Dec. 17, 2014, for U.S. Appl. No. 14/267,823 by Chan, M.A., et al., filed May 1, 2014.
Notice of Allowance mailed Dec. 22, 2014, for U.S. Appl. No. 14/179,744 by Quan, J., et al., filed Feb. 13, 2014.
Final Office Action mailed Dec. 23, 2014, for U.S. Appl. No. 14/158,733 by Quan, J., et al., filed Jan. 17, 2014.
Notice of Allowance mailed on Mar. 17, 2015, for U.S. Appl. No. 14/158,733, Quan, J., et al., filed on Jan. 17, 2014.
Notice of Allowance mailed on Mar. 30, 2015, for U.S. Appl. No. 13/772,163, Quan, J., filed on Feb. 20, 2013.
Notice of Allowance mailed on Mar. 30, 2015, for U.S. Appl. No. 14/267,823, Chan, M.A., et al., filed on May 1, 2014.
Non-Final Office Action mailed on Apr. 8, 2015, for U.S. Appl. No. 13/865,515, Quan, J., et al., filed on Apr. 18, 2013.
Non-Final Office Action mailed Apr. 8, 2015, for U.S. Appl. No. 14/228,190, Quan, J., et al., filed on Mar. 27, 2014.
Non-Final Office Action mailed May 15, 2015, for U.S. Appl. No. 14/042,398, by Chan, M.A., et al., filed Sep. 30, 2013.
Non-Final Office Action mailed Jun. 22, 2015, for U.S. Appl. No. 14/043,034, of Quan, J., et al., filed Oct. 01, 2013.
Non-Final Office Action mailed Jun. 22, 2015, for U.S. Appl. No. 14/158,682, of Quan, J., et al., filed Jan. 17, 2014.

* cited by examiner

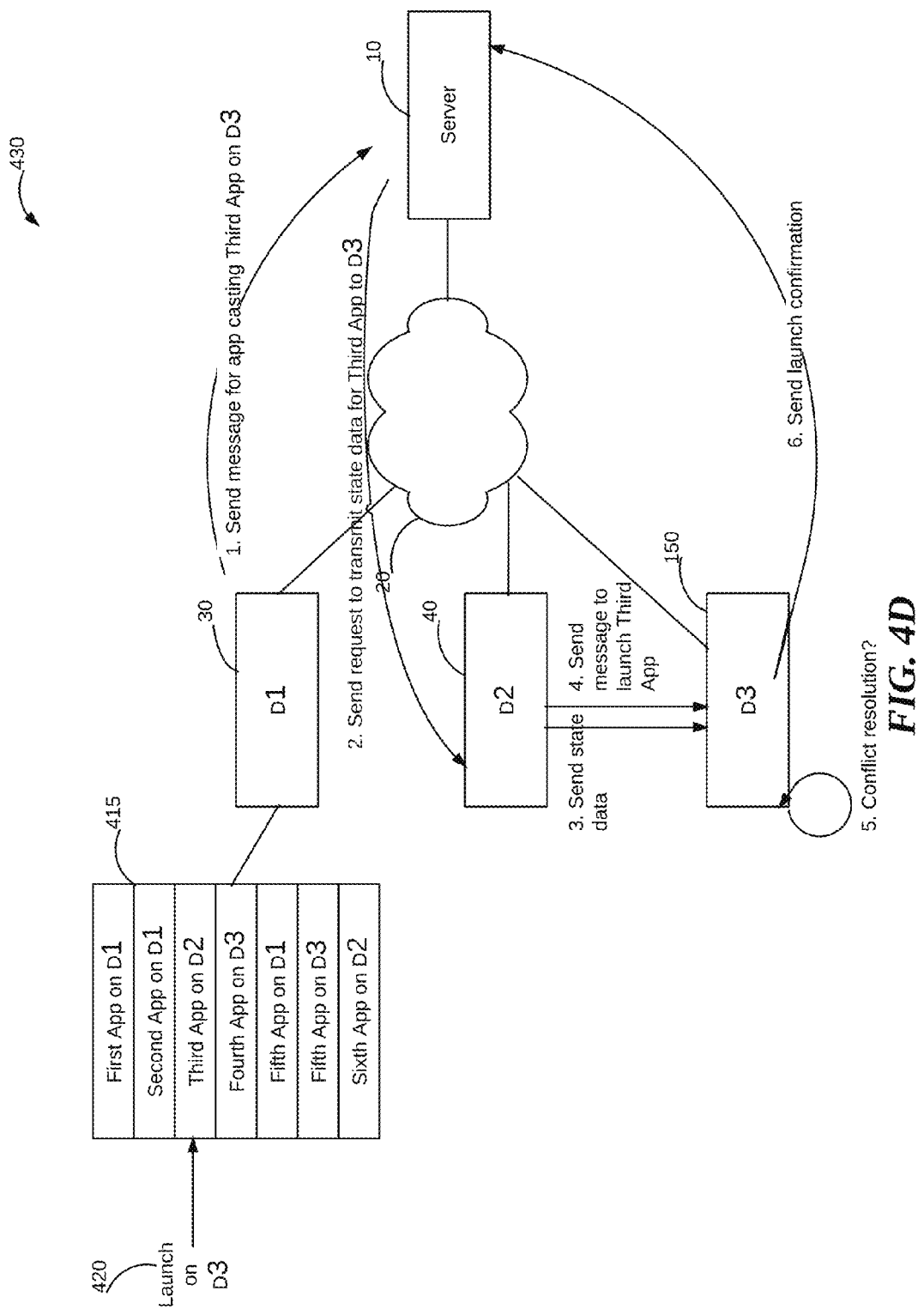

INTERACTIVE MULTI-TASKER

CROSS-REFERENCE TO RELATED APPLICATION(S)

This application is a continuation-in-part of U.S. patent application Ser. No. 13/772,163 entitled "APPLICATION STATE SYNCHRONIZATION ACROSS MULTIPLE DEVICES", filed on, Feb. 20, 2013, which claims the benefit of U.S. Provisional Patent Application No. 61/708,794, entitled "CLOUD COMPUTING INTEGRATED OPERATING SYSTEM" filed on Oct. 2, 2012, all of which are incorporated by reference herein in their entirety.

This application further claims the benefit of U.S. Provisional Patent Application No. 62/027,136, entitled "UNIFIED TASK LIST AND APPLICATION LIST ACROSS USER DEVICES" filed on Jul. 21, 2014 and U.S. Provisional Patent Application No. 62/027,245, entitled "APPLICATION CASTING" filed on Jul. 22, 2014, all of which are incorporated by reference herein in their entirety.

TECHNICAL FIELD

Several of the disclosed embodiments relate to an interactive task list and an application ("app") list on a user device, and more particularly, to an interactive task list and app list to provide a seamless user experience across a group of user devices.

BACKGROUND

Portable devices such as mobile phones, smartphones, and tablet computers have become more common among individuals. The portable devices provide a convenient way to access various content, e.g., on Internet, via a wireless network. Typically, a user has multiple portable devices, e.g., a smartphone, an iPod, a tablet, etc. The user can install a number of applications on each of the devices. Further, the user can install one set of apps on one device and another set of apps on another device. If the user wants information regarding the list of apps installed on a particular device, the user may obtain that in one or more ways, e.g., by viewing home screen of the portable device which has the icons or tiles of the apps installed, or by viewing an installed apps section in the device.

However, if the user wants to view the list of apps installed on all his/her portable devices; the user may have to repeat the above steps for each of the devices. Similarly, if the user wants to view the list of apps executing on all his portable devices, the user may have to view the executing apps section in each of the devices. Repeating the above steps for each of the devices is not only convenient and burdensome, especially if the user has a number of portable devices, the user may not have physical access to all the devices at a given instance of time.

Further, the current technology has none to limited abilities to let a user perform an action on an application installed on one device from another device.

BRIEF DESCRIPTION OF THE DRAWINGS

FIG. 4D is an example illustrating app casting, using the task manager of the first computing device, a task that is executing on a second computing device on to a third computing device.

FIGS. 16A and 16B, collectively, is an example GUI of a task manager illustrating transferring execution of an application from the first computing device to the second computing device.

DETAILED DESCRIPTION

Figure 1A:
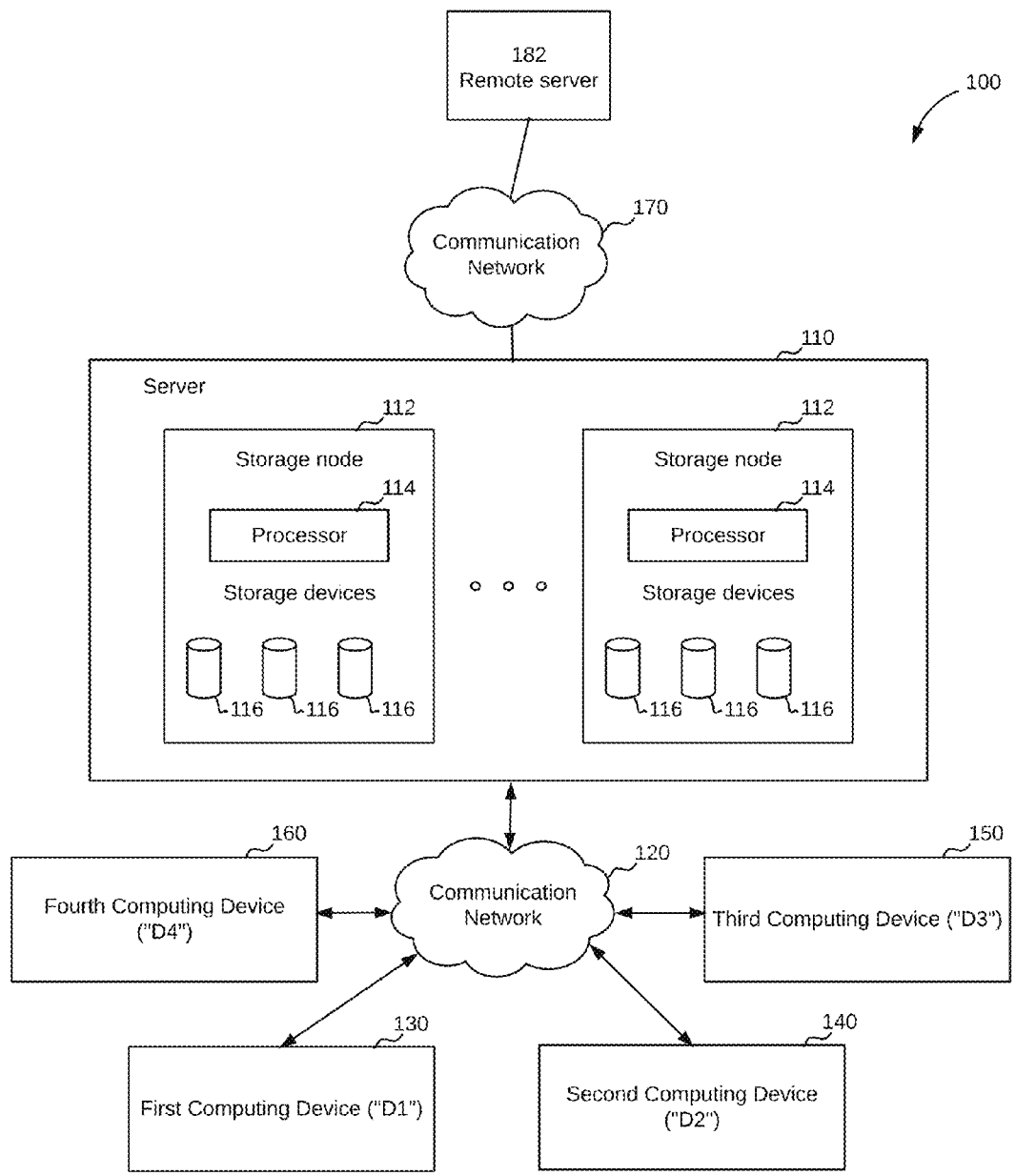
FIG. 1A is a block diagram illustrating an environment in which a multi-tasker and a unified app tray can be implemented.

Technology is disclosed towards an interactive multi-tasker for casting applications executing on a first computing device (also referred to as "user device") of a user on any of multiple computing devices of the user from any of the computing devices. Each of the computing devices presents a unified view of applications and tasks executing on each of the computing devices. The unified view of the applications/tasks can be presented as a multi-tasker (also referred to as "task manager" or "unified task manager"). The user can perform multiple actions on the executing applications/tasks, e.g., cast using a first device an instance of an application that is executing on a second device on to a third device. The state data of the instance of the application is synchronized from the second device to the third device. Another instance of the application resumes execution on the third device using the synchronized state data. Once cast, each of the instances of the application executes independently of each other. Further, after the application is casted on to the third device, the multi-tasker is updated to indicate that an instance of the application is now executing on the third device.

Technology is also disclosed for presenting a unified view of tasks and applications across multiple computing devices of a user. One example of presenting a unified view of the tasks is using the multi-tasker. When the user accesses a task manager on a particular computing device the multi-tasker presents a list of tasks that are executing at each of the computing devices. The task manager also provides device identification information of a computing device where each of the tasks is executing. In some embodiments, an application that is executing at a computing device is referred to as a task. In some embodiments, an application can execute as multiple sub-tasks and each sub-task can be displayed as a separate task in the task manager. In some embodiments, the technology monitors the tasks executing at each of the computing devices, obtains a task list from each of the computing devices, synchronizes the task lists to generate a master task list that includes a list of tasks executing across the computing devices of the user, and sends the master task list to each of the computing devices. Each of the computing devices can present the master task list to the user using a task manager of the corresponding computing device.

The task manager is an interactive graphical user interface (GUI), which allows a user to perform a number of actions on the tasks displayed in the task manager. For example, the user can launch on a second computing device a particular task already executing on a first computing device by selecting the particular task from the task manager displayed on the second computing device. After the particular task is launched on the second computing device, the particular task may be terminated at the first computing device. In some embodiments, the particular task continues to execute on the first computing device. In another example, the user may also terminate a particular task executing on a second computing device by selecting the particular task from the task manager displayed on the first computing device.

One example of presenting a unified view of the applications is using a unified application tray (also referred to as "app tray"). An app tray on a particular computing device presents a list of applications that are installed at each of the computing devices of the user. In some embodiments, while displaying the list of applications, the app tray displays information regarding those applications that are installed on the particular computing device in a format different than the information for applications that are installed on computing devices other than the particular computing device. For example, consider that a first computing device includes two applications, "App A" and "App B" and a second computing device includes one application "App C." The app tray on the first computing device can display icons associated with "App A" and "App B" in a first format and display a "shadow" icon, a "greyed out" icon, or a translucent icon for "App C" indicating that "App C" is installed on a computing device other than the first computing device. Similarly, the app tray on the second computing device can display an icon associated with "App C" in a first format and display "shadow" icons, "greyed out" icons, or translucent icons for "App A" and "App B" indicating that "App A" and "App B" are installed on a computing device other than the second computing device.

The app tray is an interactive GUI, which allows the user to perform a number of actions on the applications displayed in the app tray. For example, the user can launch a particular application from the app tray. In another example, the user can launch a particular application that is installed at a computing device other than a first computing device, at the first computing device by selecting the shadow icon of the particular application from the app tray at the first computing device. After the user selects the shadow icon of the particular application, the first computing device downloads the application from a specified location, e.g., a remote server that hosts the downloadable application, installs the application and launches the application. After the application is launched at the first computing device, the technology updates the app tray at the first computing device to remove the shadow icon of the application and display an icon of the application in a first format.

In some embodiments, the technology monitors the installation and uninstallation of applications at each of the computing devices, obtains an application list from each of the computing devices, synchronizes the application lists to generate a master application list that includes a list of applications installed across the computing devices of the user, and sends the master application list to each of the computing devices. Consequently, an app tray of a computing device can present the master application list to the user.

Environment

FIG. 1A illustrates an environment 100 in which a multi-tasker and a unified app tray can be implemented. The environment 100 includes a server 110 configured to facilitate communications between the computing devices 130-140 and a remote server 182. The computing devices, e.g., a first computing device 130, a second computing device 140, a third computing device 150, and a fourth computing device 160, are associated with a user. In some embodiments, multiple computing devices are considered to be associated with a user, if the user has logged into the computing devices using a common user login profile that is recognizable by the server 110. In some embodiments, multiple computing devices are considered to be associated with a user, if the user has logged into the computing devices using a common user login profile that is recognizable using a common application, such as an operating system, executing on the computing devices.

In some embodiments, multiple computing devices are considered to be associated with a user, if the user can communicate with at least one of the computing devices of the group using another computing device of the group. For example, if a user's tablet can communicate with a smartphone of the user's friend, then the user's tablet and the friend's smartphone are considered to be associated with the user. In some embodiments, a user can be an organization and the computing devices, e.g., smartphones, provided by the organization to its employees can be considered to be a group of computing devices associated with the user. Continuing with the organization example, in some embodiments, the employees may have to login to the computing devices using login profiles that are generated using the organization managed server. Various other techniques can be implemented to determine that a particular computing device belongs to a group of computing devices associated with a user.

Each of the computing devices 130-160 can be a desktop computer, a laptop computer, a tablet computer, an automobile computer, a game console, a smartphone, a personal digital assistant, home appliances, televisions, automobiles, drones, airplanes, autonomous devices such as robots, or other computing devices capable of running computer applications, as contemplated by a person having ordinary skill in the art. The computing devices 130-160 can include an operating system to manage the hardware resources of the computing devices and provide services for executing computer applications (e.g., mobile applications running on mobile devices). The operating system facilitates execution of the computer applications on the computing device 130-160. The computing devices 130-160 include at least one local storage device to store the computer applications and user data. The computing devices 130-160 can download computer applications from a remote server 182 that hosts the computer applications.

The computer applications stored in the computing devices 130-160 can include applications for general productivity and information retrieval, including email, calendar, contacts, and stock market and weather information. The computer applications can also include applications in other categories, such as mobile games, factory automation, GPS and location-based services, banking, order-tracking, ticket purchases or any other categories as contemplated by a person having ordinary skill in the art.

The computer applications generate and maintain network connections directed to various remote servers, e.g. remote server 182. In some embodiments, instead of directly opening and maintaining the network connections with these remote servers, the server 110 is responsible to open and maintain network connections with the remote servers. All or some of the network connections of the computing devices 130-160 are through the server 110. The network connections can include Transmission Control Protocol (TCP) connections, User Datagram Protocol (UDP) connections, or other types of network connections based on other protocols. When there are multiple computer applications that need network connections to multiple remote servers, the computing devices 130-160 only needs to maintain one network connection with the server 110. The server 110 can in turn maintain multiple connections with the remote servers on behalf of the computer applications.

In some embodiments, the server 110 can be a server cluster having computer nodes interconnected with each other by a network. The server cluster can communicate with remote server 182 via a communication network 170, such as the Internet, a metropolitan area network (MAN), a wide area network (WAN), a LAN, or any other type of network or combination of networks.

The server 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A communication network 120 can also be included to facilitate communications between the server 110 and the computing devices 130 and/or 140 and between the computing devices 130-160. The communication network 120 can include network communication hardware and network connection logic to receive the information from computing devices. The communication network 120 can be a local area network (LAN), wide area network (WAN) or the Internet.

In some embodiments, communications between the computing devices 130-160 are routed through the server 110. For example, when the first computing device 130 requests access to an application executing on the second computing device 140, the request is routed through server 110. In some embodiments, the computing devices 130-160 can communicate with each other directly when they are in proximity to each other. In some embodiments, the computing devices 130-160 are considered to be in proximity to each other if they can communicate with each other using a short range wireless communication. For example, the computing devices 130-160 can exchange data related to computer applications between them using a short range wireless communication, e.g. Bluetooth, Infrared, NFC, AirDrop, Wi-Fi direct, Wi-Fi, or DLNA.

In some embodiments, while the computing devices 130-160 communicate directly, the server 110 is also informed of the direct communication between the computing devices. The server 110 can further obtain data related to the direct communication. For example, if the first computing device 130 instructed the second computing device 140 to terminate an application executing at the second computing device 140, the server 110 may obtain information the application is not executing on the second computing device 140 anymore.

Although FIG. 1A illustrates four computing devices 130, 140, 150, and 160, a person having ordinary skill in the art will readily understand that the technology disclosed herein can be applied to a single computing device or more than two computing devices connected to the server 110.

Figure 1B:
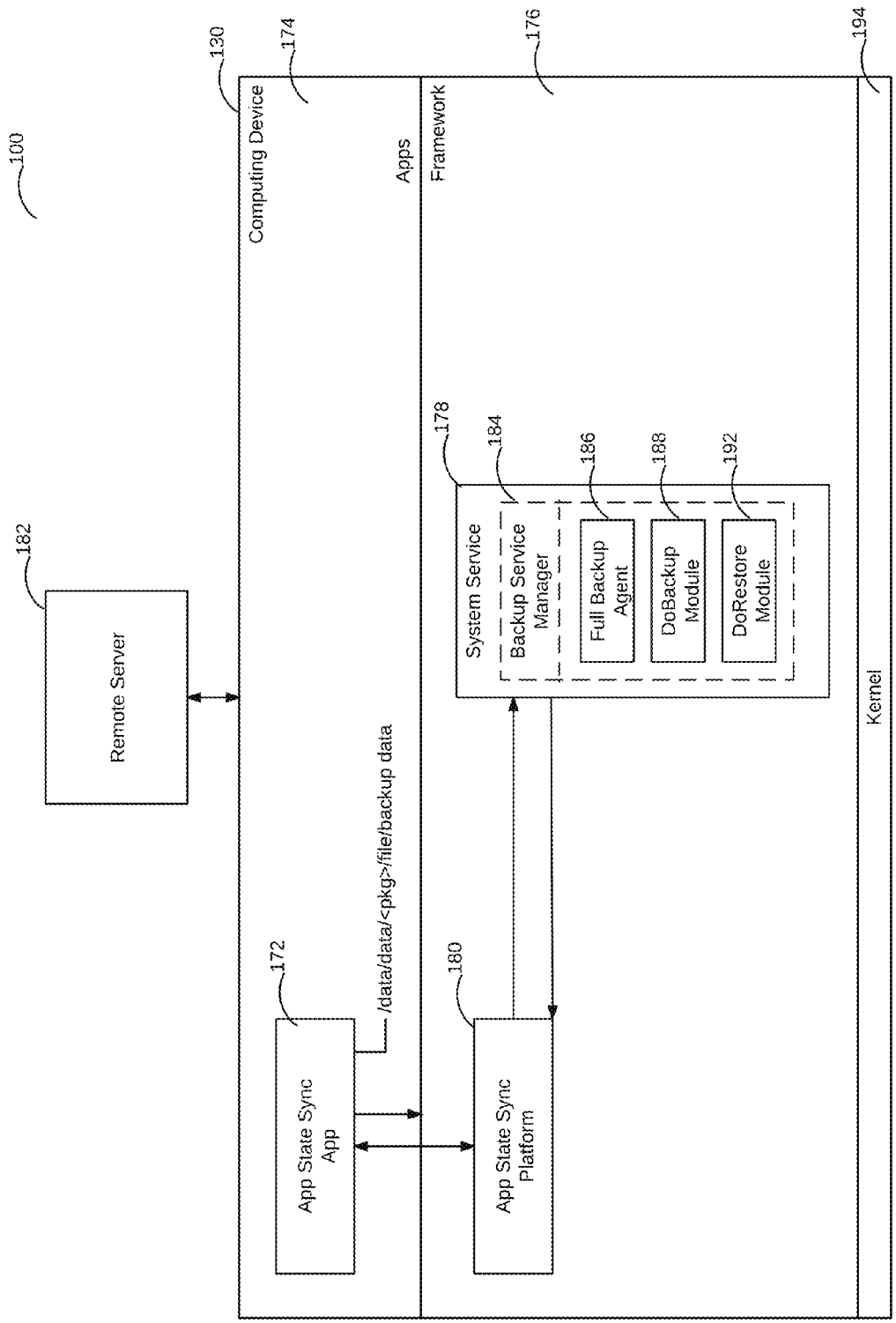
FIG. 1B is a block diagram illustrating implementation of application state synchronization for a given application, across multiple computing devices, utilizing the framework of the operating systems executing on the various computing devices.

FIG. 1B is a block diagram illustrating implementation of application state synchronization for a given application, across multiple computing devices, utilizing the framework of the operating systems executing on the various computing devices.

In embodiments, each of the computing devices 130-160 is running an operating system to manage the various hardware resources of the computing devices 130-160. In some embodiments, the operating system is a stack of software components, roughly divided into four main layers, including the kernel 194, the libraries (not illustrated in FIG. 1B), the application framework 176, and the applications 174. The applications layer 174 is at the top of the software stack, where applications are installed and accessed by the users of the computing devices 130-160.

The kernel layer 194 provides basic system functionality like process management, memory management, device management for devices such as camera, keypad, display, etc. Further, the kernel manages networking and device drivers. Built over the kernel 194, the native libraries of the operating system are sets of instructions to guide the computing device 130-160 in handling different types of data, Internet security, playing/recording audio and video, etc.

Further, built over the libraries layer, the Application Framework layer 176 provides many higher-level services to applications in the form of Java classes. Application developers are allowed to make use of these services in their applications. The various higher-level services include activity manager, content providers, telephone manager, location manager, resource manager, backup service manager 184, etc. The activity manager manages the activity life cycle of applications and the content provider manages the data sharing between applications. The telephony manager manages all voice call capabilities to provide voice call services.

Further, the location manager provides location management using GPS, cell tower, etc. The resource manager manages the various types of resources used by the applications. In some embodiments, the backup service manager 184, part of the system services 178, provides data backup services for the applications executing on the computing device 130. The backup service manager 184 backs up the persistent data of an executing application to enable possible restoration of the application to a particular execution state.

In some embodiments, the backup service manager 184 includes a full backup agent 186 to gather and store a backup of the data of all the applications when invoked. In some embodiments, the operating system of the computing device 130 invokes the full backup agent 186 when the computing device 130 is being restarted. The backed up data can be utilized to restore the application state of all the applications when the computing device 130 is fully restarted.

In some embodiments, the backup service manager 184 includes a DoBackup module 188 and a DoRestore module 192 to perform data backup and restoration, respectively, for a given application. In some embodiments, the DoBackup module 188 backs up a copy of the application data of a given application, which is stored in the application folder of the given application. In some embodiments, the application folder is utilized by the given application to store all the persistent data associated with an executing instance of the given application.

In some embodiments, the DoBackup module 188 prompts the given application whose data is being backed up to store all the persistent data needed to resume execution of the application at the current execution point to the application folder associated with the given application. In some embodiments, the DoBackup module 188 prompts the given application to store all the persistent data by utilizing the framework 176 of the operating system.

In some embodiments, the operating system can be configured to prompt a given application to store (e.g., write to the application folder) all the persistent data when the given application is switching from executing as a foreground process (i.e., application being accessed by the user) to a background process. So, when the application being backed up is executing as a background process, the DoBackup module 188 can backup the data in the application folder, knowing all the persistent data of the application is stored in the application folder to restore the application to the point of execution before the application switched from foreground to background.

In some embodiments, the operating system can be configured to prompt the given application to store all the persistent data when a predefined sync event occurs, e.g., a low battery event, a geo-location based event, multi-device proximity based event, etc. In some embodiments, the operating system can be configured to switch a given application from a foreground process to a background process momentarily to trigger the given application to store all the persistent data when the DoBackup module 188 is invoked.

For example, the chrome® application stores all persistent application data under the application folder "/data/data/com.google/chrome" associated with the chrome® application. When the DoBackup module 188 is invoked, the module 188 creates a backup copy, either locally or in a remote storage, of all the persistent application data in the application folder associated with the application to provide an execution restoration point for the application.

In some embodiments, the DoRestore module 192 utilizes the backup copy of the application data of a given application to restore the application data of the given application, where the restored application data provides a restored execution point for the application. In some embodiments, the DoRestore module 192 utilizes the backup copy of the application data to create a copy of the application data under the application folder associated with the given application, where the restored application data is utilized to resume execution of the application from the execution point corresponding to the restored application data.

In some embodiments, the application framework 176 includes an application state synchronization platform ("app state sync platform") service 180 that interacts with the backup service manager 184 to enable application state synchronization of the various applications executing across the various computing devices 130-160. In some embodiments, the app state sync platform 180 invokes the DoBackup module 188 and DoRestore module 192 through the backup service manager 184 to gather application state data of a given application.

The app state sync platform service 180 provides the gathered application state data to any of the associated computing devices 130-160 to enable resumption of the given application on the associated computing devices 130-160 using the provided application state data. The computing device 130-

160 receiving the application state data utilize the DoRestore module 192 through its app state sync platform service 180 to restore the application state of the given application using the received application state data before resuming execution of the given application using the restored application state data. When the given application is initiated in the receiving computing system 130-160, the given application utilizes the persistent data restored in the application's application folder and resumes executing the application at the point of execution corresponding to the restored application data.

In some embodiments, the app state sync platform service 180 of the various computing devices 130-160 interact at a framework level to enable the synchronization of application state of a given application. In some embodiments, the app state sync platform service 180 performs synchronization of application state of the given application based upon request by the user of the computing device, occurrence of sync events, periodicity, etc. Later discussion provides additional details on the various triggers for synchronization of application state of the given application, which can be utilized by the app state sync platform service 180.

In some embodiments, the services of the app state sync platform service 180 can be utilized by an application state synchronization application 172 ("app state sync app") to provide synchronization of application state data for a given application across multiple computing devices 130-160. In some embodiments, the app state sync app 172 provides the app state sync service 180 a name of the application for which to gather application state data and a data path to which to copy the gathered application state data. The app state sync service 180 utilizes the received name to gather the application state data and copy the gathered application state data to the data path provided by the app state sync app 172.

In some embodiments, the app state sync service 180 notifies the app state sync app 172 that the application state data has been copied to the provided data path. In some embodiments, the app state sync app 172 interacts with a corresponding app state sync app 172 in the other computing devices 130-160, either directly or through the remote server 182, to provide the gathered application state data to the app state sync service 180 in the other computing devices 130-160 to synchronize the application state of the application in any of the other computing devices 130-160.

In some embodiments, the app state sync app 172 is a stand-alone application that provides application state synchronization for any of the applications executing across the various computing devices 130-160. In some embodiments, the app state sync app 172 is a stand-alone application that provides application state synchronization for any of the applications executing across the various computing devices 130-160. In some embodiments, the app state sync app 172 can be integrated within an existing application, e.g., as a Software Development Kit ("SDK"), to provide application state synchronization across the various computing devices 130-160.

Figure 2A:
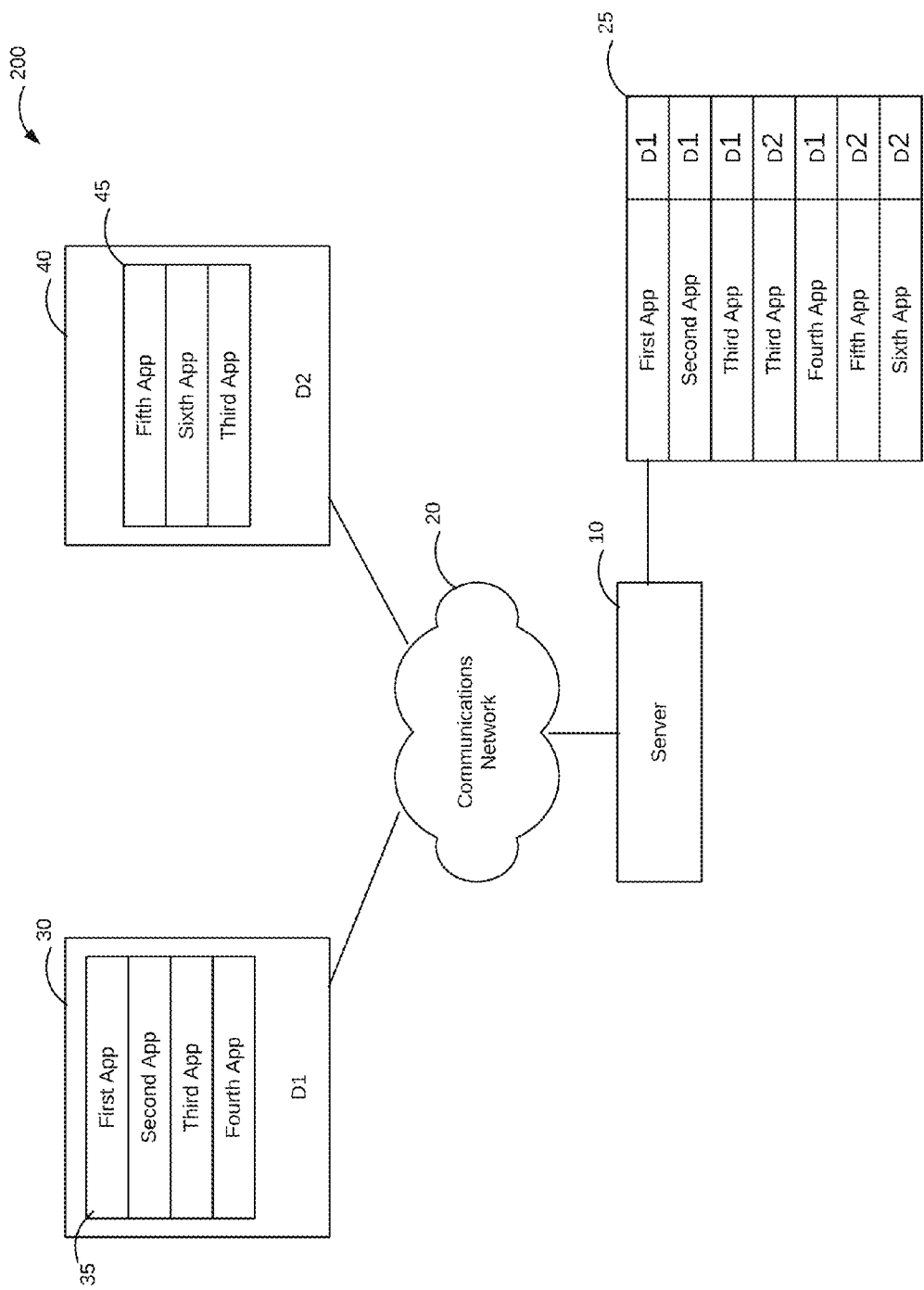
FIG. 2A is a block diagram illustrating synchronization of task lists across a first computing device of the user and a second computing device of the user.
Figure 2B:
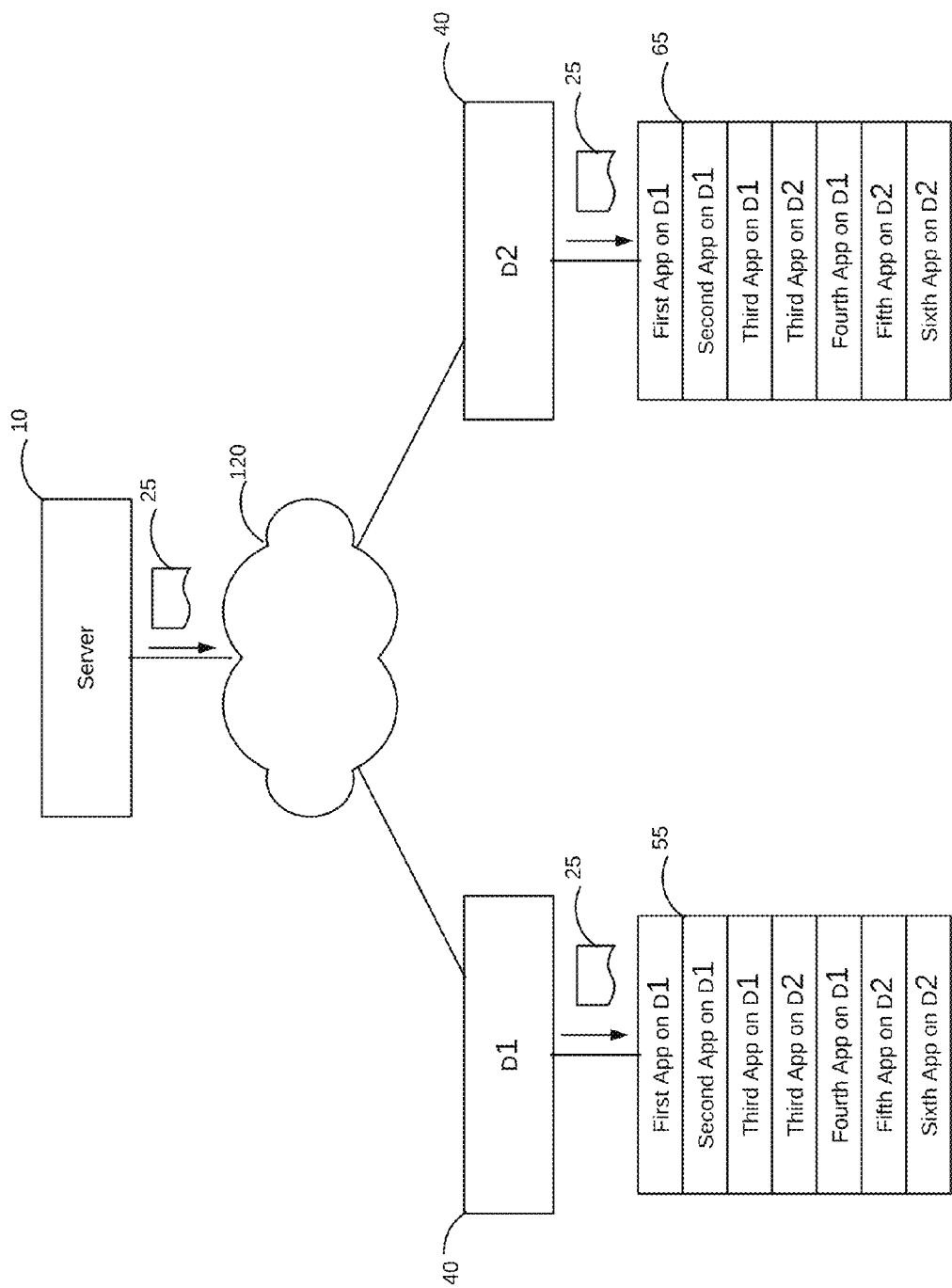
FIG. 2B is a block diagram illustrating display of master task list of FIG. 2A in task managers of the first computing device and the second computing device, respectively.
Figure 2C:
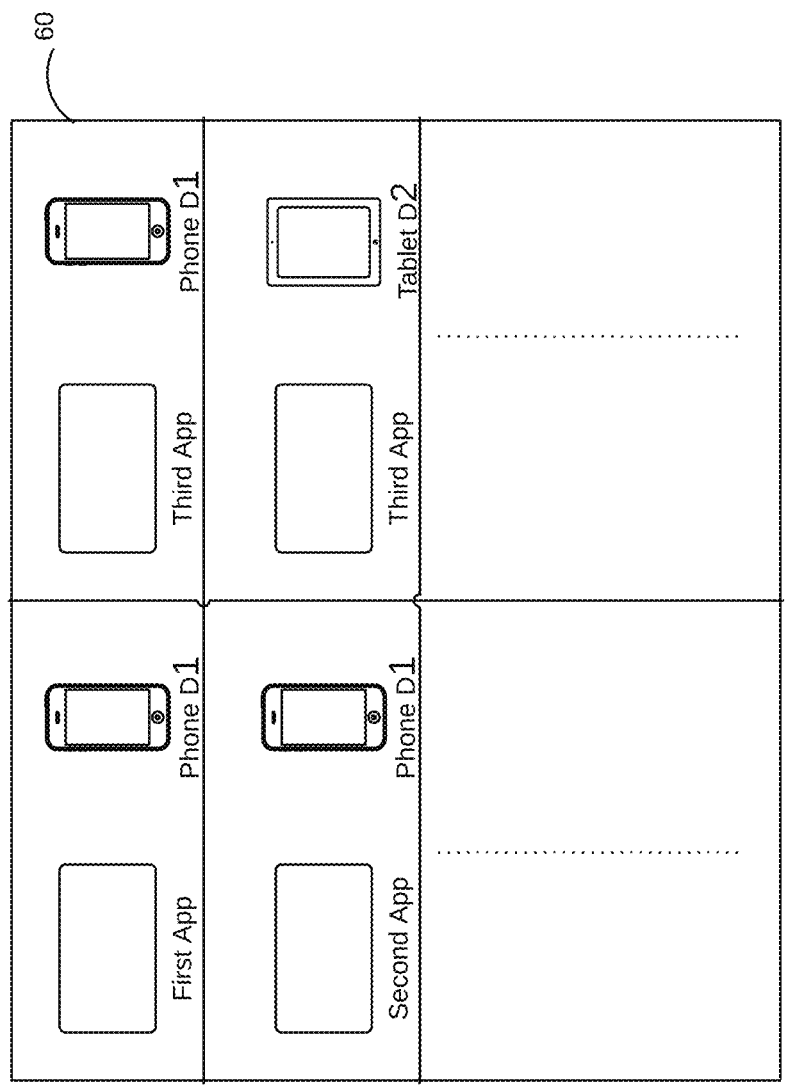
FIG. 2C is an example graphical user interface (GUI) displaying the master task list of FIG. 2A.

FIG. 2, which includes FIGS. 2A, 2B and 2C, illustrates a system 200 for presenting in a task manager a unified list of tasks executing across computing devices associated with a user. The computing devices associated with a user, e.g., the first computing device 130 and the second computing device 140, include a task manager that presents a list of tasks executing on each of the computing devices associated with the user. The list of tasks displayed by the task manager is synchronized such that when any new task begins to execute and/or any existing task stops executing at any of the computing devices, the task manager at each of the computing devices is updated to show the corresponding change.

FIG. 2A is a block diagram illustrating synchronization of task lists from the first computing device 130 and the second computing device 140. In some embodiments, the server 110 facilitates the synchronization of task lists. The server 110 obtains a first task list 235 from the first computing device 130 and a second task list 245 from the second computing device 140. The first task list 235 includes information regarding applications that are executing at the first computing device 130, such as "First App," "Second App," "Third App" and "Fourth App". The second task list 245 includes information regarding applications that are executing at the second computing device 140, such as "Third App," "Fifth App" and "Sixth App." A task can be an application that is executing at a computing device. In some embodiments, the application can execute as multiple sub-tasks on the computing device. A task list of the computing device can include a task that is executing in the foreground and/or in the background of the computing device. In some embodiments, a background task is a computer process that runs without user intervention. A background task can also continue to execute when other tasks are executing in the foreground. For example, a daemon program is a background task. Other typical background tasks can include logging, system monitoring, scheduling, and user notification.

After obtaining the first task list 235 and the second task list 245, the server 110 synchronizes the task lists to generate a master task list 225. The master task list 225 includes information regarding all tasks executing across the first computing device 130 and the second computing device 140. The master task list 225 further includes device identification (ID) of the computing device on which the task is executing. The device identification can be any information that uniquely identifies the computing devices. In some embodiments, the device IDs can be user defined device IDs, media access control (MAC) address of the computing devices, Internet Protocol (IP) address, or other IDs that can identify the computing devices uniquely.

The master task list 225 can be generated in various formats. FIG. 2A illustrates one example format of the master task list 225. The master task list 225 includes an entry for each task on every computing device. Each entry includes the task information, e.g., name of the application, and a device ID of the computing device where the task is executing. In some embodiments, the master task list 225 can include only entry for each task, and the entry for that task can include device IDs of all the computing devices where the task is executing. For example, the master task list 225 can have one entry for the "Third App" and indicate in the same entry that the task is executing on computing devices "D1" and "D2", where "D1" corresponds to a first computing device 130 and "D2" corresponds to a second computing device.

After the master task list 225 is generated, the server 110 transmits the master task list 225 to the first computing device 130 and the second computing device 140 as illustrated in FIG. 2B. A task manager, e.g., first task manager 255 and second task manager 265, can display the master task list 225 on the computing devices. For example, the first task manager 255 executing at the first computing device 130 can display the master task list 225 on the first computing device 130 to the user. Similarly, the second task manager 265 executing at the second computing device 140 can display the master task list 225 on the second computing device 140 to the user.

The first task manager 255 can display the master task list 225 in various formats, e.g., text, image, or a combination thereof. For example, the first task manager 255 can display the master task list 225 as text as illustrated in FIG. 2B. The text can include information such as a name or ID of the task and device ID of the computing device where the task is executing. In another example, the first task manager 255 can display the master task list 225 as a combination of text and image, as illustrated by GUI 260 in FIG. 2C. For the task, the GUI 260 displays information such as a name or ID of the task and an icon associated with the task. For the device ID, the GUI 260 displays device ID of the computing device where the task is executing and/or an icon or image associated with the computing device. For example, if a task such as Google Maps is executing on a Samsung Android smartphone, the first task manager 255 can display an icon associated with Google Maps app and an image associated with Samsung Android smartphone.

Referring back to the first task manager 255, in some embodiments, the first task manager 255 is implemented as an interactive GUI. The user can perform a number of actions on the tasks displayed in the first task manager 255 using the interactive GUI. For example, the user can terminate a task executing on any of the computing devices. In another example, the user can launch on a computing device a task that is executing on a different computing device. The user may perform such actions via various user interactions. For example, the user may perform a swipe action on a task in the GUI 260 to terminate the task. In another example, the user may terminate the task by selecting the terminate button or link displayed in the GUI 260 (not illustrated).

FIG. 3, which includes FIGS. 3A, 3B, 3C, 3D, 3E and 3F, is an example illustrating application pulling ("app pulling") to a first computing device an application (or task) that is executing on a second computing device using the task manager 255. When the executing application (or a task) is app pulled to a first device from a second device, an instance of the application is initiated on the first device to resume execution of the application using the application's state data from the second device. After app pulling, the two instances of the application, executing on the corresponding two computing devices, continue executing independently of each other. In some embodiments, the state data of the application gathered from the first device is associated with a current point of execution of the application on the second device when the app pulling was initiated.

In some embodiments, the example 300 may be implemented in the environment 100 and using the system 200. The user intends to app pull to the first computing device 130 the "Fifth App" that is executing on the second computing device 140. When the user accesses the first task manager 255 at the first computing device 130, the first task manager 255 displays the master task list 225, which indicates that the "Fifth App" is executing on the second computing device 140. The user provides a user input 305 to app pull the "Fifth App" on to the first computing device 130, e.g., by selecting the "Fifth App" from first task manager 255 displayed on the first computing device 130.

On receiving the user input 305, the first computing device 130 determines that the "Fifth App" is executing on the second computing device 140. The first computing device 130 sends a message to the server 110 requesting the server 110 to facilitate app pulling the "Fifth App" on to the first computing device 130. The server 110 receives the request (e.g., step 1) and determines that the "Fifth App" is executing on the second computing device 140. In some embodiments, the request from the first computing device 130 can include the device ID of a computing device where the selected task is executing. In some embodiments, the server 110 determines the computing device where the selected task is executing by using a copy of the master task list 225 stored at the server 110 and/or by probing one or more of the computing devices associated with the user.

After the server 110 determines that the "Fifth App" is executing on the second computing device 140, the state data of the "Fifth App" is synchronized from the second computing device 140 to the first computing device 130. In some embodiments, the state data is synchronized by the server 110. The server 110 synchronizes the state data by obtaining the state data of the "Fifth App" from the second computing device 140 (e.g., step 2) and transmitting it to the first computing device 130 (e.g., step 3). After the state data is transmitted to the first computing device 130, the first computing device 130 launches the "Fifth App" and executes the "Fifth App" using the state data obtained from the second computing device 140. In some embodiments, when the "Fifth App" is launched on the first computing device 130, the state of the "Fifth App" on the first computing device 130 will be same as the state of the "Fifth App" when it last executed on the second computing device 140.

In some embodiments, state data of an application is data used to record the running status of a computer application at a given instant in time. In some embodiments, the state data synchronized between the computing devices can be the minimum set of state data that enables an instance of the computer application running on the second computing device 140 to be replicated on the first computing device 130, such that the instance of application on the first computing device 130 and the instance on the second computing device 140 have the same application state at the time of synchronization.

After a task that is executing on a particular computing device is launched on another computing device, the task can continue to execute on the particular computing device or be terminated. The user may configure whether or not to allow a task to be executed at multiple computing devices simultaneously. For example, the user can be playing a video game on the second computing device 140. When the user chooses to let a friend resume playing the video game on the first computing device 130 (which can be owned either by the user or the friend), the friend can app pull (or the user can app cast, described below) the video game at the current level of play on the first computing device 130 and resume playing the game on the first computing device 130. Further, the user can continue playing the video game on the second computing device 140 independent of any progress on the game being made by the user's friend on the first computing device 130.

In some embodiments, the task can be terminated at the particular computing device after the task is launched on the other device. After the first computing device 130 launches the "Fifth App," the first computing device 130 sends a launch confirmation message to the server 110. The server 110 can then instruct the second computing device 140 to terminate the execution of "Fifth App" on the second computing device 140. Further, after the "Fifth App" is launched at the first computing device 130, the server 110 updates the master task list 225 to indicate that the "Fifth App" is now executing on the first computing device 130.

Figure 3A:
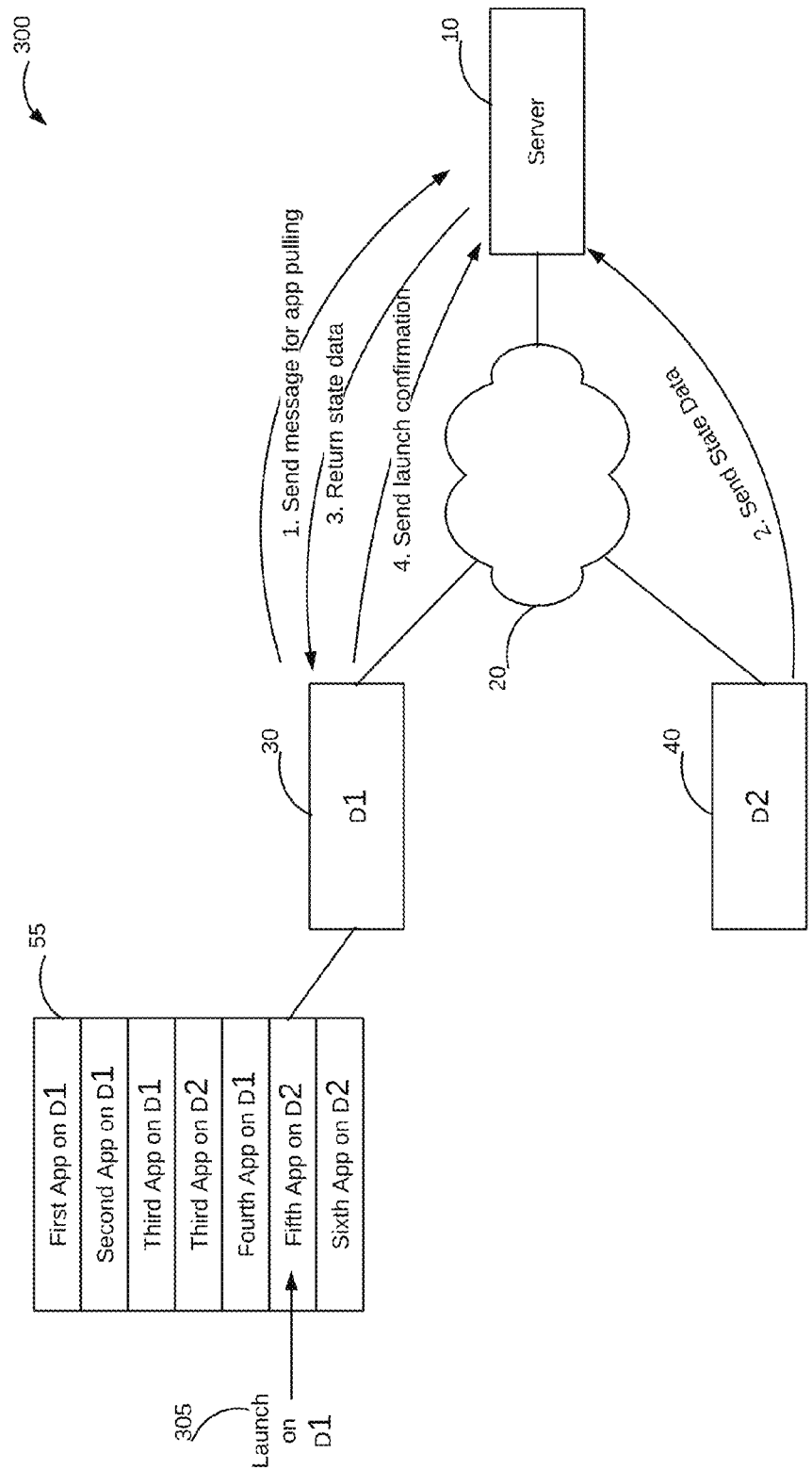
FIG. 3A is an example illustrating app pulling on the first computing device an application (or simply a "task") that is executing on the second computing device.
Figure 3B:
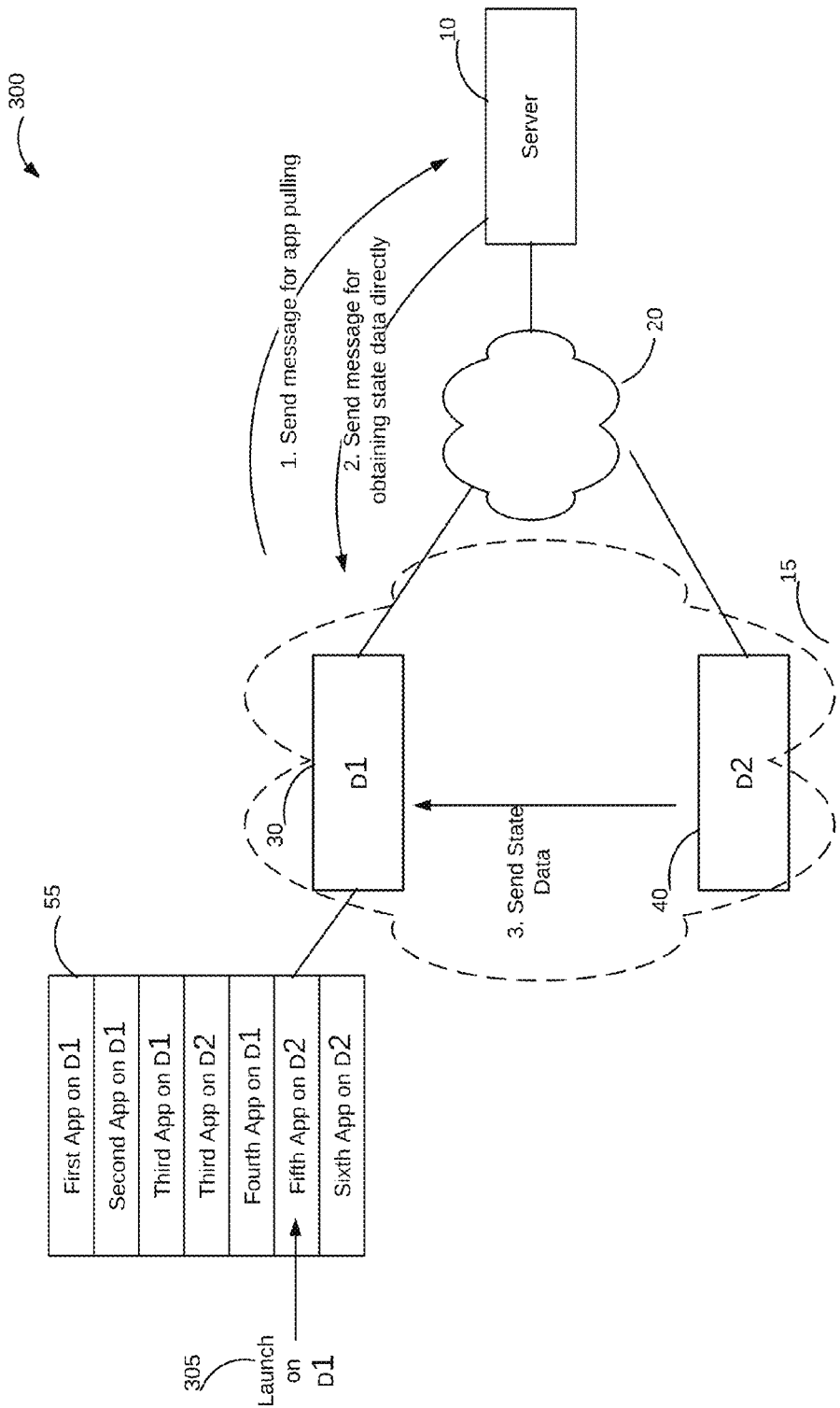
FIG. 3B is an example illustrating app pulling on the first computing device a task that is executing on a second computing device of the user which is in proximity to the first computing device.
Figure 3C:
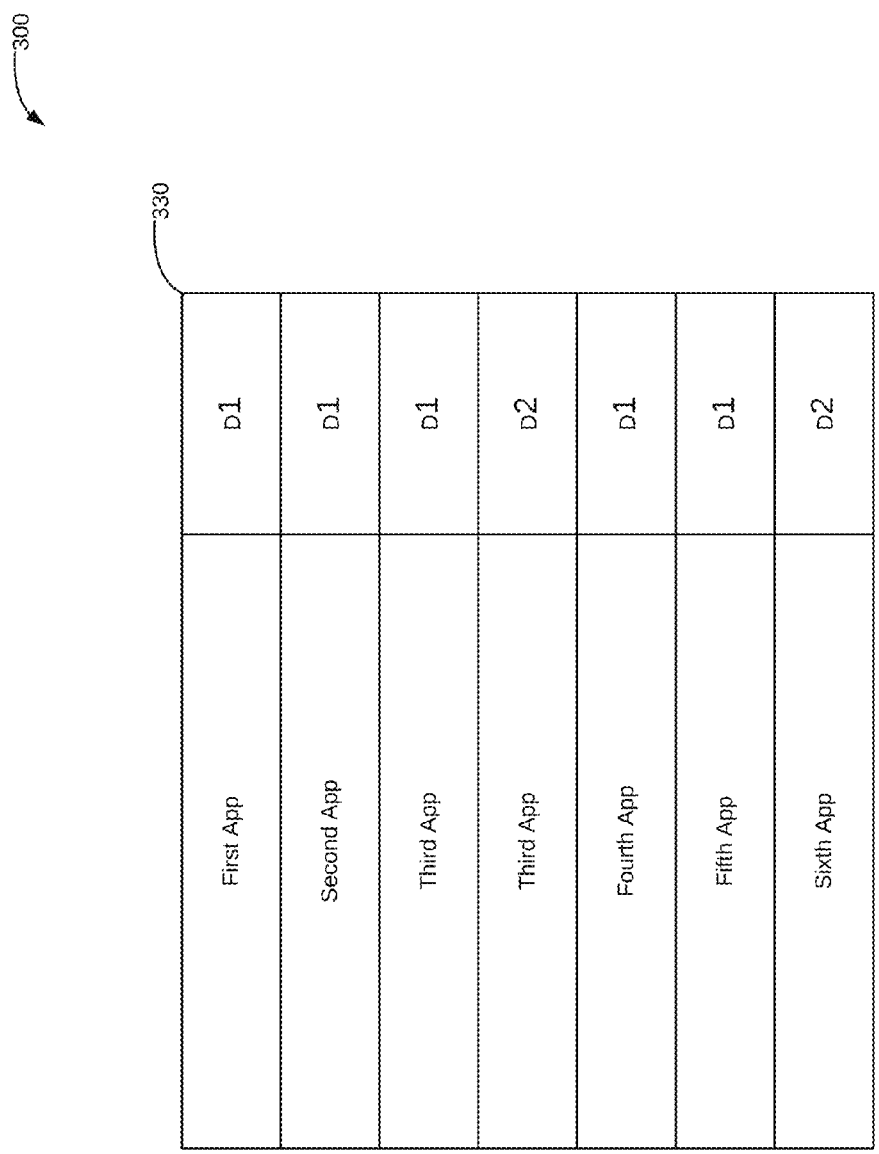
FIG. 3C illustrates an updated master task list indicating that the "Fifth App" is now executing on the first computing device.
Figure 3D:
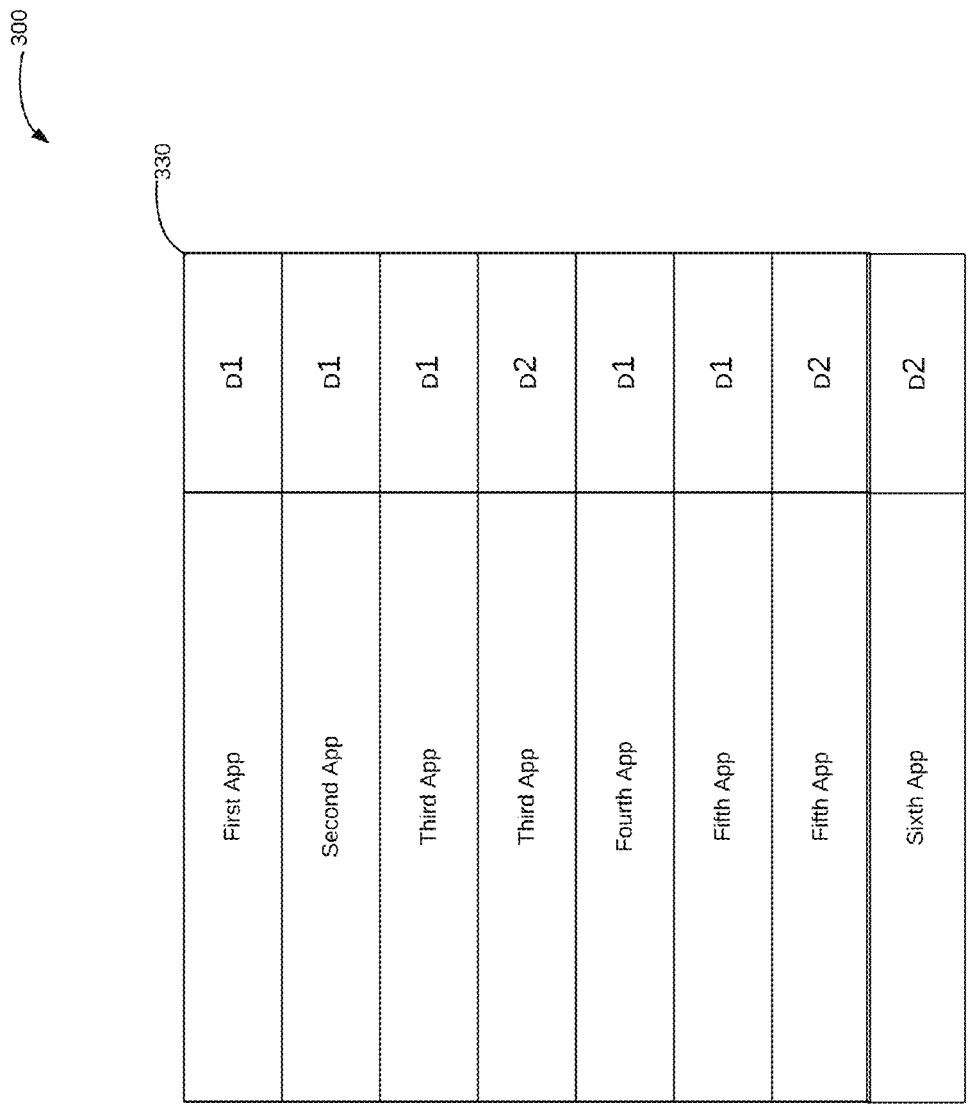
FIG. 3D illustrates an updated master task list indicating that the "Fifth App" is now executing on both the first computing device and the second computing device when the user chooses to continue executing the task on the first computing device.
Figure 3E:
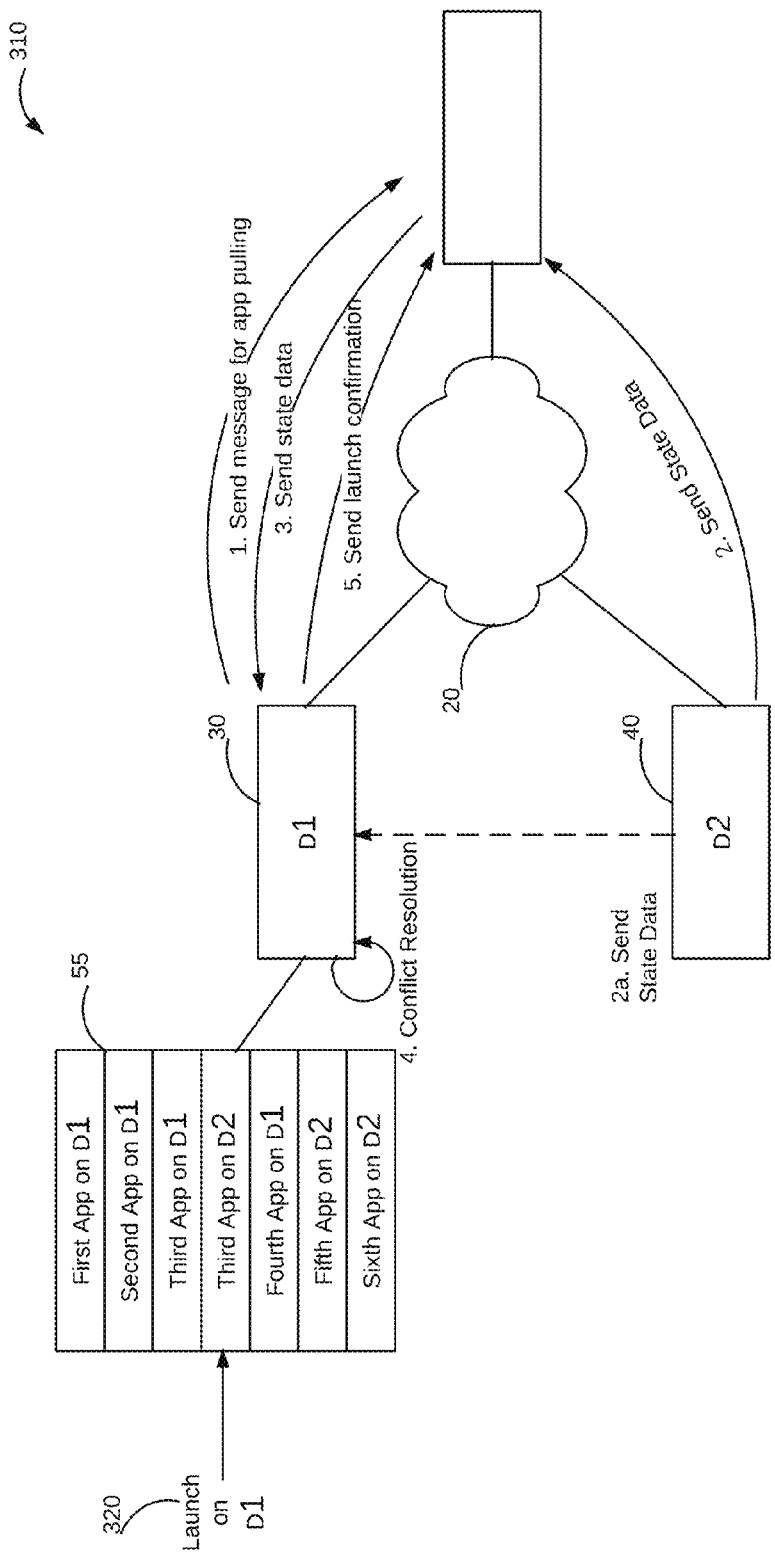
FIG. 3E is an example illustrating app pulling on the first computing device an instance of an application that is executing on the second computing device while another instance of the application is already executing on the first computing device.

FIG. 3C illustrates an updated master task list 325 indicating that the "Fifth App" is now executing on the first computing device 130. The server 110 then transmits the updated master task list 325 to the first computing device 130 and the second computing device 140. FIG. 3D illustrates an updated master task list 330 indicating that the "Fifth App" is now executing on both the first computing device 130 and the second computing device 140 when the user chooses to continue executing the task on the first computing device 130.

The server 110 then transmits the updated master task list 330 to the first computing device 130 and the second computing device 140.

Referring back to launching the "Fifth App" on the first computing device 130, the server 110 determines if the "Fifth App" is installed on the first computing device 130. If the "Fifth App" is not installed on the first computing device 130, the server 110 sends a message to the first computing device 130 to install the "Fifth App," e.g., from a remote server, such as the remote server 182, which hosts the "Fifth App." The server 110 can facilitate the first computing device 130 to communicate with the remote server for downloading the "Fifth App." The first computing device 130 launches the "Fifth App" after successfully downloading the "Fifth App." In some embodiments, the first computing device 130 can have an application that is not same but similar to the "Fifth App", e.g., a different version of the "Fifth App." The server 110 can either let the first computing device 130 execute the different version or can instruct the first computing device to download the same version of the "Fifth App" as installed on the second computing device 140, e.g., if the state data is not compatible with the version installed on the first computing device 130. Additionally, in some embodiments, the first computing device 130 can prompt the user to install the same version of the "Fifth App" as installed on the second computing device 140 before executing the "Fifth App".

Referring back to synchronizing the state data of the "Fifth App," in some embodiments, the state data can be synchronized by the first computing device 130 directly, as illustrated in FIG. 3B. For example, if the first computing device 130 and the second computing device 140 are in proximity 315 to each other, then the first computing device 130 can obtain the state data of the "Fifth App" from the second computing device 140 directly, e.g., using a short range wireless communication. Examples of short range wireless communication can include Bluetooth, Infrared, NFC, AirDrop, Wi-Fi direct, Wi-Fi, or DLNA. In some embodiments, the first computing device 130 and the second computing device 140 are considered to be in proximity 315 to each other if they can communicate with each other using a short range wireless communication.

The direct synchronization of state data between the first computing device 130 and the second computing device 140 may or may not be facilitated by the server 110. In embodiments where the direct synchronization is not facilitated by the server 110, the first computing device 130 obtains the state data from the second computing device 140 directly. In embodiments where the direct synchronization is facilitated by the server 110, the first computing device 130 sends a request to the server 110 indicating its intent to launch on the first computing device 130 the "Fifth App" that is executing on the second computing device 140 (e.g., step 1). The server 110 determines that the first computing device 130 and the second computing device 140 are in proximity 315 to each other and instructs the first computing device 130 to obtain the state data from the second computing device 140 directly (e.g., step 2). In some embodiments, if multiple computing devices of the user are executing the "Fifth App," the server 110 may suggest the user to obtain the state data from a particular computing device based on various factors. For example, the server 110 may suggest the user to obtain the state data from the computing device that has the latest state data. In another example, the server 110 may suggest the user to obtain the state data from the computing device that has faster data transfer capabilities.

After the first computing device 130 obtains the state data from the second computing device 140 (e.g., step 3), the first computing device 130 can send an instruction to the second computing device 140 to terminate the execution of the "Fifth App" on the second computing device 140 (e.g., step 4). After the "Fifth App" is terminated on the second computing device 140, the second computing device 140 can send a termination confirmation message to the server 110. Similarly, after the "Fifth App" is launched on the first computing device 130, the first computing device 130 can send a launch confirmation message to the server 110. The server 110 updates the master task list 225 to indicate that the "Fifth App" is now executing on the first computing device 130 and is terminated on the second computing device 140, as illustrated by the updated master task list 325.

In some embodiments, the example 310 may be implemented in the environment 100 and using the system 200. The user intends to launch on the first computing device 130 the instance of the "Third App" that is executing on the second computing device 140. When the user accesses the first task manager 255 at the first computing device 130, the first task manager 255 displays the master task list 225, which indicates that both the first computing device 130 and the second computing device 140 are executing an instance of the "Third App". In some embodiments, each instance of the "Third App" executes independently of each other and maintains a corresponding execution/running status.

The user provides a user input 320 to launch the "Third App", executing on the second computing device 140, on the first computing device 130, e.g., by selecting the "Third App on $D_2$" from first task manager 255 displayed on the first computing device 130. On receiving the user input 305, the first computing device 130 determines that the "Third App on $D_2$" is executing on the second computing device 140. The first computing device 130 sends a message to the server 110 requesting the server 110 to facilitate resuming execution of the "Third App" on the first computing device 130 using the current execution status of the "Third App" on the second computing device 140.

The server 110 receives the request (e.g., step 1) and determines that the requested instance of the "Third App" is executing on the second computing device 140. After the server 110 determines that the requested instance of the "Third App" is executing on the second computing device 140, the state data of the "Third App" is gathered from the second computing device 140. In some embodiments, the server 110 gathers the state data of the "Third App" from the second computing device 140 (e.g., step 2). The server 110 transmits the gathered state data to the first computing device 130 (e.g., step 3).

In some embodiments, the first computing device 130 directly obtains the state data of the "Third App" from the second computing device 140, e.g., using a short range wireless communication (e.g., step 2b), without requiring the server 110 to mediate the transmission. After the state data is transmitted to the first computing device 130, the first computing device 130 launches the "Third App" and executes the "Third App" using the state data obtained from the second computing device 140. In some embodiments, when the "Third App" is launched on the first computing device 130, the state of the "Third App" on the first computing device 130 will be same as the state of the "Third App" when it last executed on the second computing device 140.

In some embodiments, the first computing device 130, after receiving the state data from the second computing device 140, initiates a conflict resolution to determine which state data of the "Third App" to utilize to resume execution of the "Third App". In some embodiments, the user will be prompted to elect between one of the available state data of the "Third App", where the elected state data will be utilized to resume execution of the "Third App" and the unelected state data will be discarded.

Figure 3F:
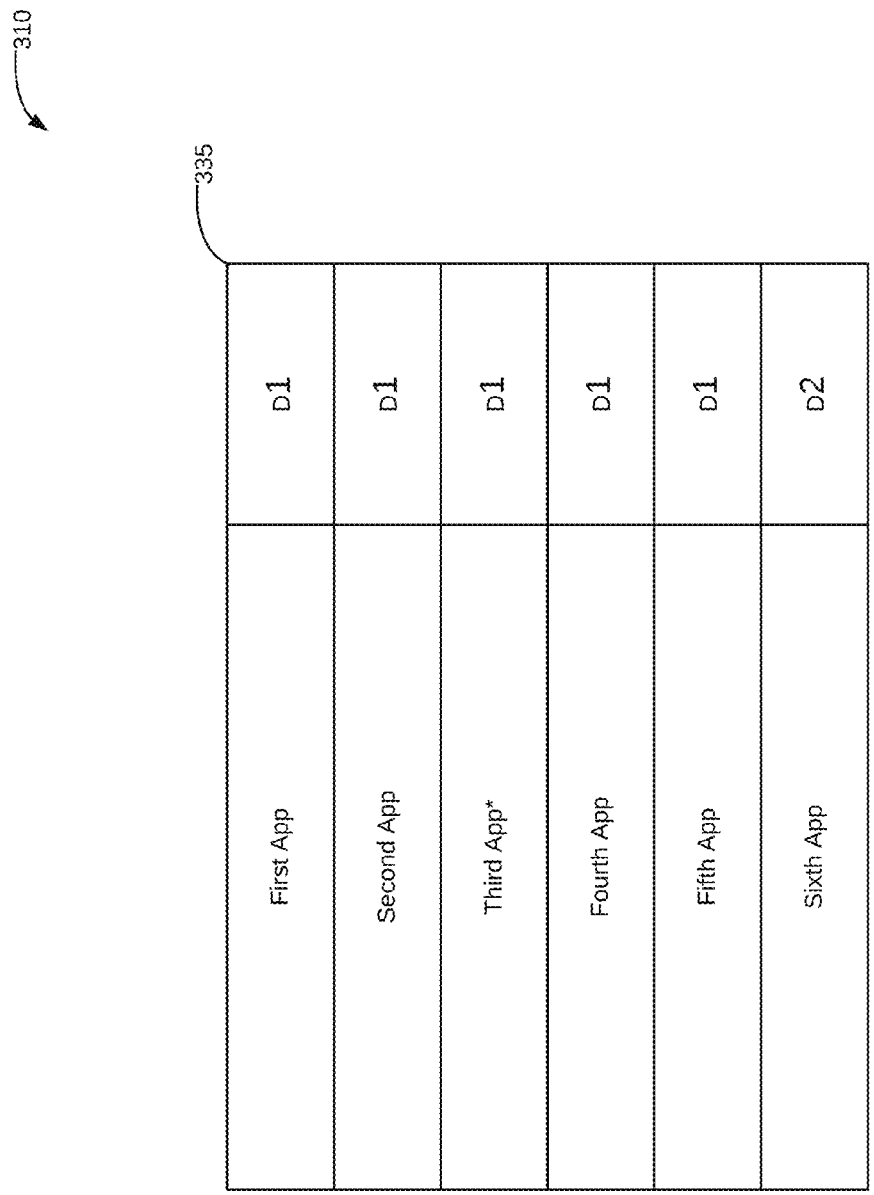
FIG. 3F illustrates an updated master task list indicating that the "Third App" is now executing on the first computing device using the state data of the "Third App" from the second computing device.

For example, when the user elects to resume execution of the "Third App" utilizing the received state data from the second computing device 140, the first computing device 130 resumes execution of the "Third App" utilizing the received state data and discards the state data associated with the instance of the "Third App" which was executing on the first computing device 130. FIG. 3F illustrates an updated master task list 335 indicating that the "Third App" is now executing on the first computing device 130 utilizing the state data obtained from the second computing device and that the execution of the "Third App" on the second computing device 140 has been terminated.

In some embodiments, the conflict resolution provides the user the option to retain any of the available state data of the "Third App". When the user elects to retain more than one state data of the "Third App", the first computing device resumes execution of the "Third App" with one of the retained state data and stores the remaining retained state data of the "Third App". The master task list 335 is updated to list multiple instances of the "Third App" as executing on the first computing device 130, where each of the instances of the "Third App" corresponds to one of the retained state data.

When the user chooses one of the instances of the "Third App" from the master task list 335, the first computing device determines whether the currently executing "Third App" corresponds to the instance of the "Third App" chosen by the user. When the user chosen instance matches with the currently executing "Third App", the first computing device provides the user with access to the currently executing "Third App". When the user chosen instance does not match with the currently executing "Third App", the first computing device stores the state data of the currently executing "Third App" and retrieves the saved state data corresponding to the user chosen instance. The first computing device then utilizes the retrieved state data to resume execution of the "Third App". The resumed "Third App" is then provided to the user as the user chosen instance of the "Third App".

Referring back to retaining more than one state data of the "Third App" during conflict resolution, in some embodiments, the first computing device resumes execution of multiple instances of the "Third App" with a corresponding one of the retained state data. The master task list 335 is updated to list multiple instances of the "Third App" as executing on the first computing device 130, where each of the instances of the "Third App" corresponds to one of the retained state data.

Those skilled in the art will appreciate that the logic illustrated in each of the diagrams discussed above, e.g., with reference to at least FIGS. 3A-3F, and similarly in the following figures may be altered in various ways. For example, the order of the logic may be rearranged, substeps may be performed in parallel, illustrated logic may be omitted; other logic may be included, etc. For example, in FIG. 3B, after the second computing device 140 terminates the "Fifth App", it may send a termination confirmation to the server 110. In another example, in FIG. 3B, if the first computing device 130 and the second computing device 140 are in proximity, the first computing device 130 may send the launch instruction to the second computing device 140 directly instead of communicating the server 110 as illustrated.

Further, the synchronization of state data between the computing devices of the users can be managed in many other ways. For example, a computing device of the user can be configured to transmit the state data of an application to the server periodically and/or based on a trigger condition, and the server can in turn transmit the state data to other computing devices of the user periodically and/or based on the trigger condition. The trigger condition can include predefined schedules, turning off or powering off of a screen of the computing device, turning off, powering off or hibernating the computing device, closing, exiting from or hibernating the application at the computing device, opening the application at the computing device, battery level of the computing device reaching a certain threshold, etc.

The trigger condition can also be based on user access pattern of the computing devices. For example, in accessing a particular application, if it is determined that the user often switches from a given computing device to a particular computing device at particular time of the day, the server 110 can synchronize the state data of the particular application to the particular computing device before the particular time. So when the user accesses the particular application on the particular computing device, the particular computing device is ready to resume the execution of the particular application (e.g., at the state it last executed on the given computing device) without any delay.

In some embodiments, a computing device can transmit the state data of an application to the server as incremental updates, e.g., as a difference between the current state data and previously transmitted state data of the application. In other words, if the state data of the application at the computing device at current time, $t_0$, is $SD_0$ and the state data transmitted to the server at time $t_{-1}$ which is prior to $t_0$, is $SD_{-1}$, then the computing device can transmit the difference between $SD_0$ and $SD_{-1}$ at time $t_0$. The server receives the incremental updates and stores them. The server can then transmit the incremental updates to other computing devices of the user, e.g., based on the trigger condition.

In some embodiments, the server generates a hash value that represents the state data received from the computing device, and stores the hash value. Further, the server can generate a hash value for each of the incremental updates received from the computing device. The server can maintain a record of the hash values of the state data transmitted to the computing devices. For example, the server can generate a table or a log that maintains a mapping of the computing devices and the hash value of the last transmitted state data to the computing devices.

The hash values can be used to determine whether two computing devices have the same state data of an application. For example, when the user requests the server 110 to launch on the first computing device 130 an application executing on the second computing device 140, the server compares the hash value of the current state data of the application executing on the second computing device 140 with the hash value of the state data last transmitted to the first computing device 130. If the hash values match, that is, both the computing devices have the same state data, the server 110 does not transmit the state data to the first computing device 130. On the other hand, if the hash values do not match, that is, the first computing device 130 does not have the same state data of the application as that of the second computing device 140, the server 110 transmits the updated state data to the first computing device 130. In some embodiments, the server 110 transmits the difference between the current state data of the application at the second computing device 140 and the state data of the application at the first computing device 130.

In embodiments where a given computing device receives the state data of an application from another computing device directly, the given computing device may send information regarding the receipt of state data to the server. The server can then update the records to indicate the given computing device has received the particular state data.

Figure 4A:
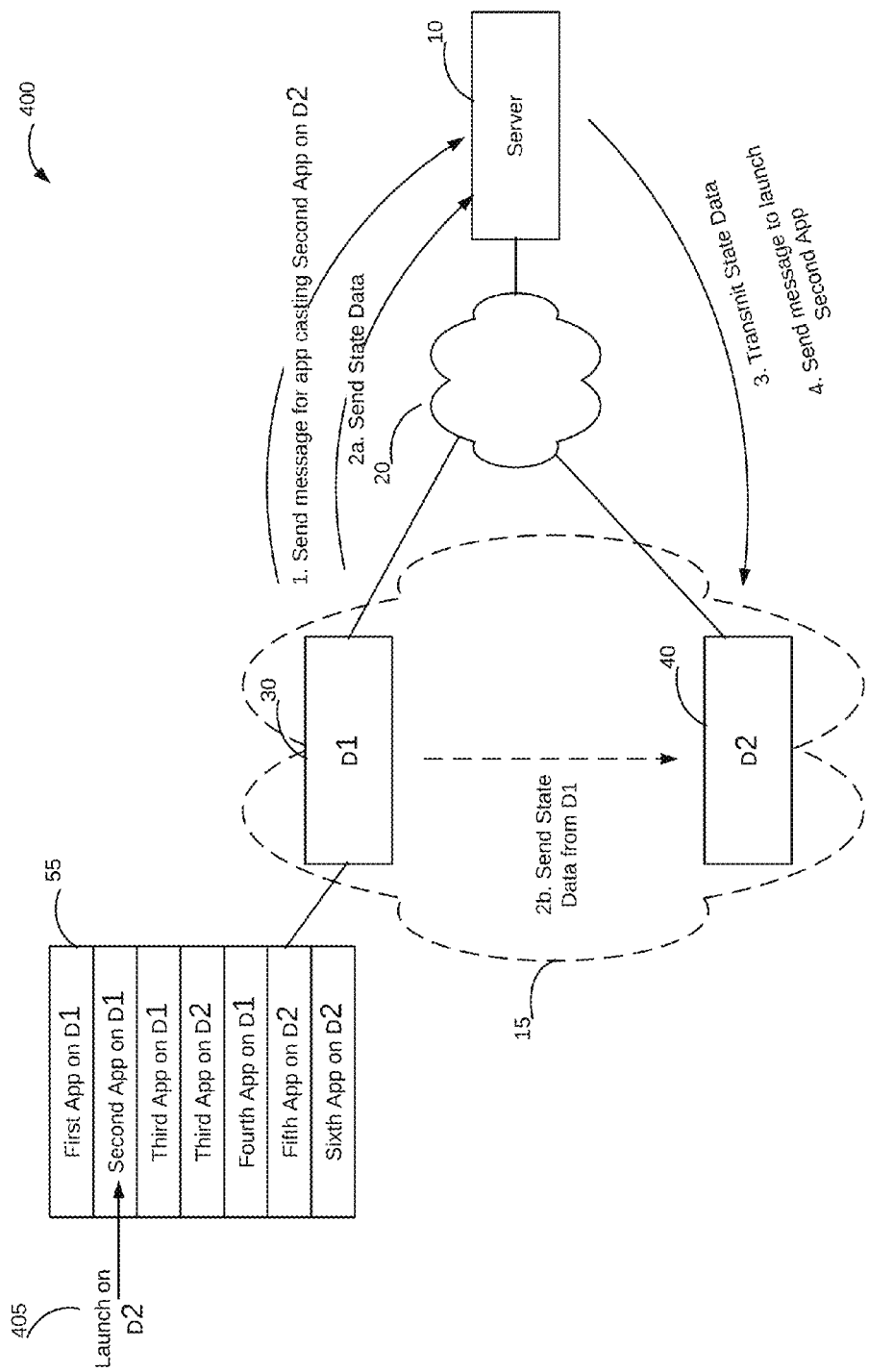
FIG. 4A is an example illustrating app casting from a computing device of a user a task that is executing on one computing device to another computing device.

FIG. 4A is an example 400 illustrating application casting ("app casting"), from a computing device, an application that is executing on one computing device to another computing device. When the executing application (or a task) is app casted from a first device to a second device, an instance of the application is initiated on the second device to resume execution of the application using the application's state data from the first device. Once app casted, the two instances of the application, executing on the corresponding two computing devices, continue executing independently of each other. In some embodiments, the state data of the application gathered from the first device is associated with a current point of execution of the application on the first device when the app casting was initiated.

In some embodiments, the example 400 may be implemented in the environment 100 and using the system 200. The user intends to app cast, from the first computing device 130, the "Second App" executing on the first computing device 130 to the second computing device 140. The user provides a user input 405 to transfer the task "Second App", to the second computing device 140. In some embodiments, a third computing device 150 can be utilized to app cast the "Second App" that is executing on the first computing device 130 to the second computing device 140.

On receiving the user input 405, the first computing device 130 sends a message to the server 110 requesting the server 110 to facilitate app casting the execution of "Second App" on the first computing device 130 to the second computing device 140. After the server 110 receives the request (e.g., step 1), the state data of the "Second App" is synchronized from the first computing device 130 to the second computing device 140. In some embodiments, the state data is synchronized by the server 110. The server 110 synchronizes the state data by obtaining the state data of the "Second App" from the first computing device 130 (e.g., step 2a) and transmitting it to the second computing device 140 (e.g., step 3). After the state data is transmitted to the second computing device 140, the server 110 instructs the second computing device 140 to launch the "Second App" (e.g., step 4) and execute it using the state data obtained from the first computing device 130.

In some embodiments, the state data can be synchronized by the first computing device 130 directly. For example, if the first computing device 130 and the second computing device 140 are in proximity 315 to each other, then the first computing device 130 can transmit the state data of the "Second App" to the second computing device 140 directly, e.g., using a short range wireless communication (e.g., step 2b).

In some embodiments, the server 110 may determine if a target computing device to which the execution of application is being transferred is capable of executing the application. The server 110 can determine if the application is executable at the target computing device based on various parameters, e.g., type of the application, type of the target computing device, or computing resource availability at the target computing device. For example, the server 110 can determine if the target computing device has a camera to execute a camera based application. In another example, the server 110 can determine if the target computing device, e.g., a smartphone, can execute the application if the application is designed for a tablet. In still another example, the server 110 can determine if the target computing device has the required computing resources to execute the transferred application, e.g., processor capacity, memory availability, resolution of a display. In some embodiments, the server 110 may suggest a list of compatible target computing devices to which an application can be transferred.

Figure 4B:
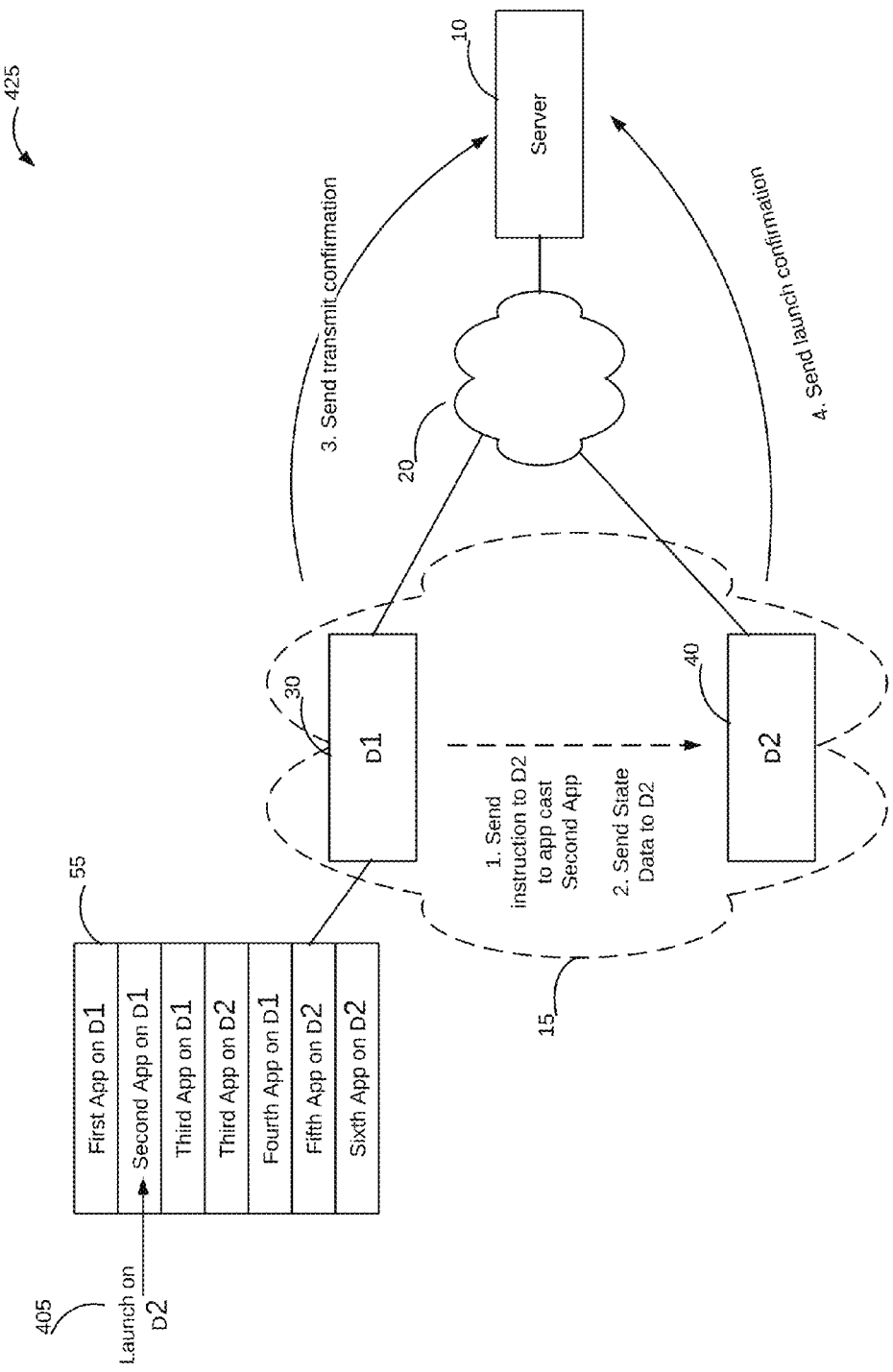
FIG. 4B is another example illustrating app casting from a computing device of a user a task that is executing on one computing device to another computing device that is in proximity to the computing device on which the task is executing.

FIG. 4B is an example 425 illustrating app casting from a computing device a task that is executing on one computing device to another computing device. Like in example 400, the user can transfer the task executing on the first computing device 130 to the second computing device 140. However, in the example 425, the first computing device 130 app casts the task to the second computing device 140 directly, thereby minimizing the usage of server 110 and the network bandwidth. For example, if the first computing device 130 and the second computing device 140 are in proximity 315 to each other, then the first computing device 130 can send the instructions to launch the "Second App" (e.g., step 1) and send the state data of the "Second App" to the second computing device 140 directly, e.g., using a short range wireless communication (e.g., step 2). The first computing device 130 and the second computing device 140 may send app cast confirmation (e.g., step 3) and launch confirmation to the server 110 (e.g., step 4), respectively.

Though the above examples describe app casting, from the first computing device 130, an application (or task) that is executing on the first computing device 130, the feature is not limited to app casting an application from the first computing device 130 that is executing on the first computing device 130. That is, the user can app cast an application (or task) executing on any computing device associated with the user to any other computing device associated with the user from any of the computing devices associated with the user. For example, the user can transfer from the first computing device 130, a task such as "Fifth App" executing on the second computing device 140 to a third computing device 150.

Figure 4C:
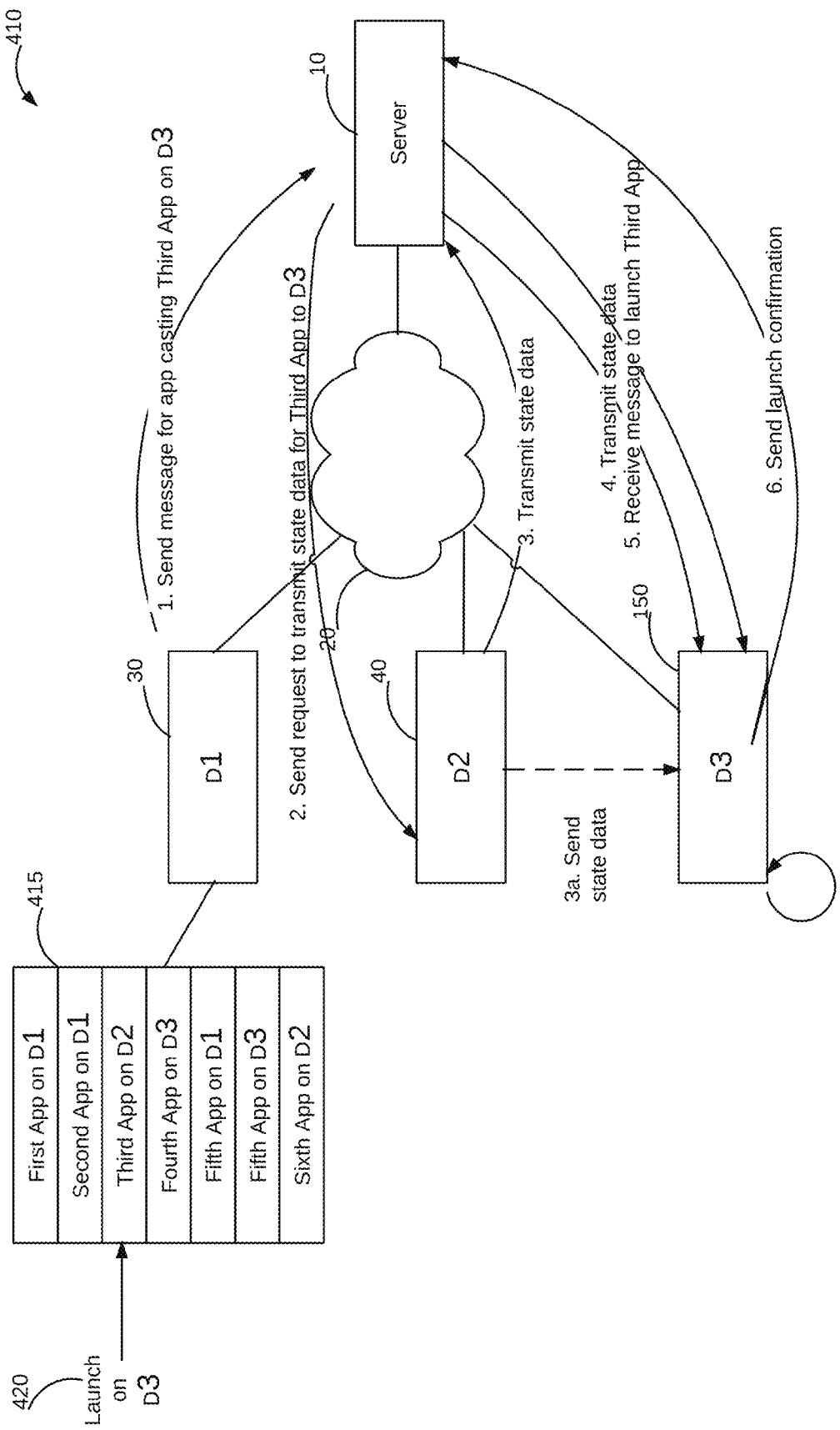
FIG. 4C is an example illustrating app casting, using the task manager of the first computing device, a task that is executing on a second computing device on to a third computing device.

FIG. 4C is an example 410 illustrating app casting, from a first computing device 130 using the task manager 415, a task that is executing on a second computing device 140 to a third computing device 150. Like in example 400, the user can transfer the task executing on one computing device to another computing device. However, in the example 410, the first computing device 130 app casts the task executing on the second computing device 140 to the third computing device 150. For example, the user can utilize the task manager 415 on the first computing device 130 and provide a user input 420 to app cast the "Third App" that is executing on the second computing device 140 on to the third computing device 150. In response to the user input 420, the first computing device 130 can send the server 110 instructions to app cast the "Third App" executing on the second computing device 140 on to the third computing device 150 (e.g., step 1).

The server 110 in turn sends instruction to the second computing device 140 to send the state data of the "Third App" to the third computing device 140 (e.g., step 2). The second computing device 140 can send the state data either by forwarding it to the server (e.g., step 3) to in turn forward it to the third computing device 150 (e.g., step 4) or forwarding it directly (e.g., step 3a). The server may further send an instruction to the third computing device to resume execution of the "Third App" using the received state data (e.g., step 5). The third computing device 150 may perform conflict resolution to resolve any conflict amongst various available state data of the "Third App" (e.g., step 6). The third computing device 150 may further send app cast confirmation to the server 110 (e.g., step 7).

FIG. 4D is an example 430 illustrating app casting, from a first computing device 130 using the task manager 415, a task that is executing on a second computing device 140 on to a third computing device 150. Like in example 410, using the first computing device 130, the user can app cast the task executing on the second computing device 140 to the third computing device 150. However, in the example 430, the second computing device 140 app casts the task to the third computing device 150 directly, thereby minimizing the usage of server 110 and the network bandwidth.

For example, the user can utilize the task manager 415 on the first computing device 130 and provide a user input 420 to app cast the "Third App" that is executing on the second computing device 140 on to the third computing device 150. In response to the user input 420, the first computing device 130 can send the server 110 instructions to app cast the "Third App" executing on the second computing device 140 on to the third computing device 150 (e.g., step 1). The server 110 in turn sends instruction to the second computing device 140 to send the state data of the "Third App" to the third computing device 140 (e.g., step 2).

Upon receiving the instruction from the server 110, the second computing device 140 can send the instructions to launch the "Third App" (e.g., step 4) and send the state data of the "Third App" to the third computing device 150 directly, e.g., using a short range wireless communication (e.g., step 3). The third computing device 150 may perform conflict resolution to resolve any conflict amongst various available state data of the "Third App" (e.g., step 6). The second computing device 140 and the third computing device 150 may send app cast confirmation and launch confirmation to the server 110 (e.g., step 6), respectively.

Figure 5:
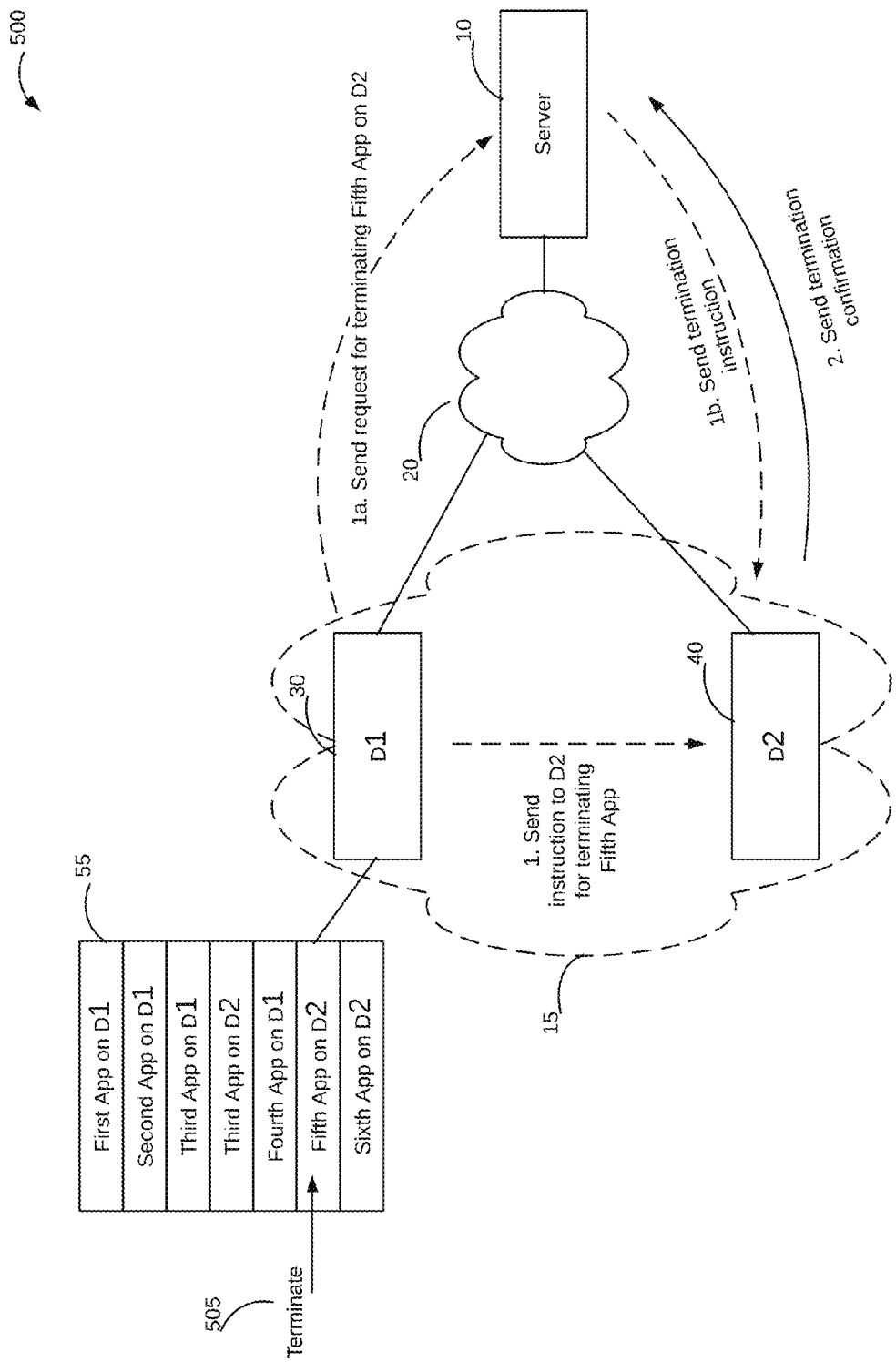
FIG. 5 is an example illustrating terminating from the first computing device a task that is executing on the second computing device.

Similar to the launch action and the transfer action, the user can perform a number of other actions on the tasks displayed in the first task manager 255, such as terminating a task executing on any of the computing devices. FIG. 5 is an example 500 illustrating terminating from a computing device a task that is executing on a remote computing device of the user. In some embodiments, the example 500 may be implemented in the environment 100 and using the system 200. The user intends to terminate the "Fifth App" executing on the second computing device 140 from the first computing device 130. When the user accesses the first task manager 255 at the first computing device 130, the first task manager 255 displays the master task list 225, which indicates that the "Fifth App" is executing on the second computing device 140. The user provides a user input 505 to terminate the "Fifth App" on the second computing device 140, e.g., by selecting the "Fifth App" from first task manager 255 displayed on the first computing device 130.

On receiving the user input 505, the first computing device 130 determines that the "Fifth App" is executing on the second computing device 140. The first computing device 130 sends a message to the server 110 requesting the server 110 to facilitate terminating the "Fifth App" on the second computing device 140. The server 110 receives the request (e.g., step 1a) and determines and/or confirms that the "Fifth App" is executing on the second computing device 140. After the server 110 determines that the "Fifth App" is executing on the second computing device 140, the server 110 sends a message instructing the second computing device 140 to terminate the execution of "Fifth App" (e.g., step 1b). The second computing device 140 terminates the "Fifth App" and sends a termination confirmation to the server 110 (e.g., step 2). The server 110 updates the master task list 225 accordingly, e.g., removes the entry "Fifth App, D2" from the master task list 225.

In some embodiments, if the first computing device 130 and the second computing device 140 are in proximity 315, the first computing device 130 may directly instruct the second computing device 140 to terminate the "Fifth App," via short range wireless communication (e.g., step 1).

Figure 6A:
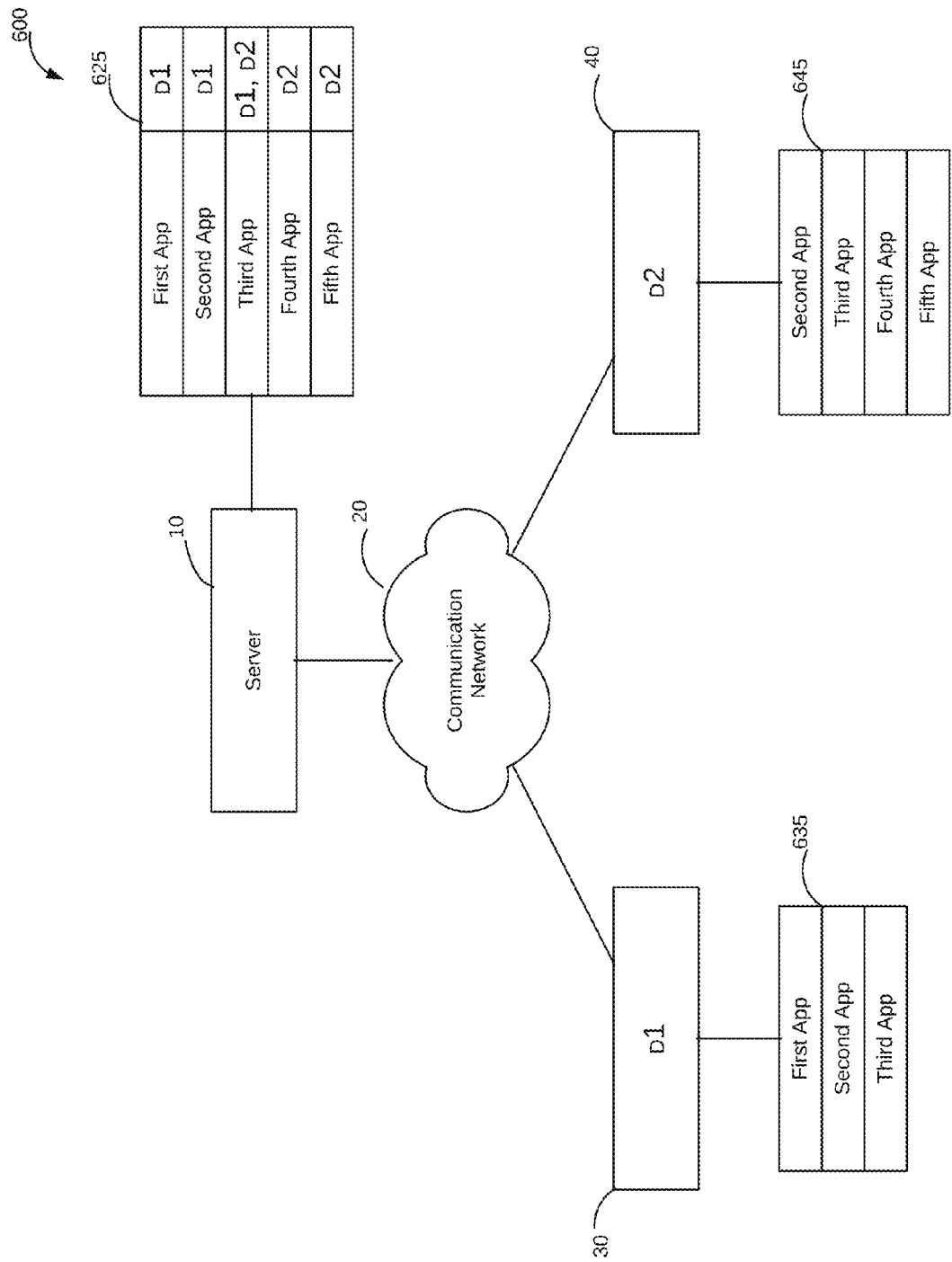
FIG. 6A is a block diagram illustrating synchronization of application lists of the first computing device and the second computing device.
Figure 6B:
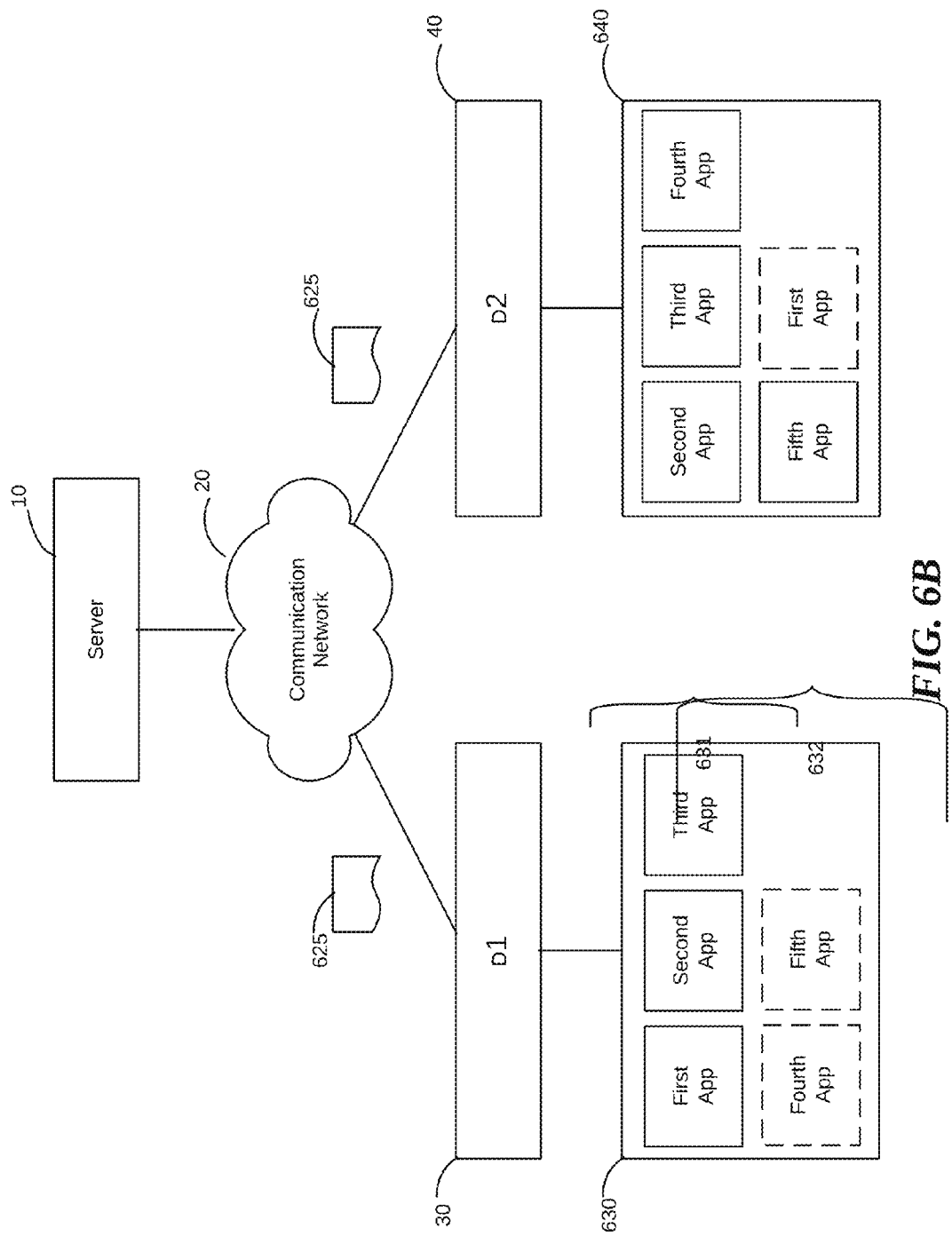
FIG. 6B is a block diagram illustrating display of master application list in app trays of the first computing device and the second computing device, respectively.
Figure 6C:
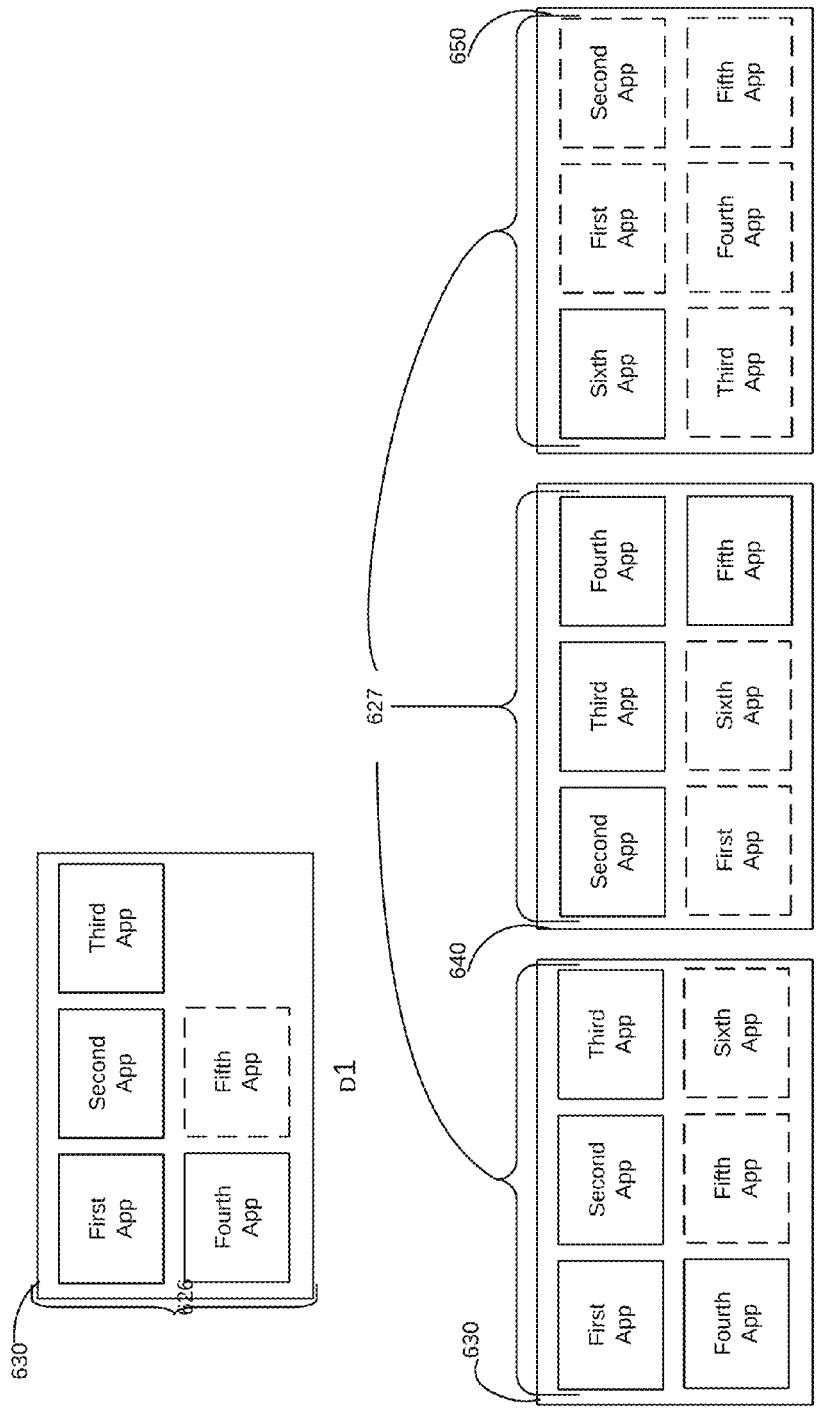
FIG. 6C is a block diagram illustrating display of an updated master application list of FIG. 6A.

FIG. 6, which includes FIGS. 6A, 6B and 6C, illustrates a system 600 for presenting in an app tray a unified list of applications installed across computing devices associated with a user. The computing devices include an app tray that presents a list of applications installed on each of the computing devices associated with the user. While a task manager, e.g., the first task manager 255, displays a list of tasks, e.g., applications, that are executing, the app tray displays a list of applications that are installed (regardless of whether or not they are executing) on all of the computing devices of the user. The list of applications displayed by the app tray is synchronized such that when any new application is installed and/or any existing application is uninstalled at any of the computing devices, the app tray at each of the computing devices is updated to show the corresponding change. In some embodiments, the app tray of a particular computing device displays information regarding the applications that are installed on the particular computing device and information regarding the applications that are installed on computing devices other than the particular computing device in different formats.

FIG. 6A is a block diagram illustrating synchronization of application lists from the first computing device 130 and the second computing device 140. In some embodiments, the server 110 facilitates the synchronization of application lists. The server 110 obtains a first application list 535 from the first computing device 130 and a second application list 645 from the second computing device 140. The first application list 635 includes information regarding applications that are installed on the first computing device 130, such as "First App," "Second App" and "Third App". The second application list 645 includes information regarding applications that are installed on the second computing device 140, such as "Second App," "Third App," "Fourth App" and "Fifth App." In some embodiments, an application is an "app" downloaded from a remote server, e.g., remote server 182, via an application store on the first computing device 130. The application store lists a number of apps that are available to be installed on the first computing device 130. The apps are typically hosted at the remote servers by various parties, including third parties. The server 110 facilitates the listing of the apps in the application store and downloading of the apps from the remote servers.

After obtaining the first application list 635 and the second application list 645, the server 110 synchronizes the application lists to generate a master application list 625. The master application list 625 includes information regarding all applications installed on the first computing device 130 and the second computing device 140. The master application list 625 further includes device ID of the computing device on which the application is installed. In some embodiments, the applications listed in the master application list 625 can be distinct. That is, there can be only one entry per application regardless of whether the application is installed on multiple computing devices. For example, though the "Second App" and "Third App" are installed in both the computing device, there is only one entry for each of them in the master application list 625. However, the device IDs of all the computing devices on which the application is installed can be includes in the master application list 625.

After the master application list 625 is generated, the server 110 transmits the master application list 625 to the first computing device 130 and the second computing device 140 as illustrated in FIG. 6B. An app tray can display the master application list 625 on the computing devices. For example, the first app tray 630 executing at the first computing device 130 can display the master application list 625 to the user on the first computing device 130. Similarly, the second app tray 640 executing at the second computing device 140 can display the master application list 625 to the user on the second computing device 140.

The app tray displays information regarding local applications in a format different from that of the remote applications. For a particular computing device, local applications are the applications that are installed on the particular computing device remote applications are the application that are installed on computing devices other than the particular computing device. Further, in some embodiments, one or more of the local applications can also be installed on computing devices other than the particular computing device. For the sake of convenience, the format in which the information regarding local applications is displayed in the app tray is referred to as a first format and the format in which the information regarding remote applications is displayed is referred to as a second format. The second format clearly indicates that the corresponding applications are not installed on the particular computing device.

For example, as illustrated in FIG. 6B, the first app tray 630 displays information regarding the "Fourth App" and "Fifth App" in the second format, e.g., as shadow icons 632 (or translucent icons or grayed out icons). The shadow icons 632 indicate that the "Fourth App" and "Fifth App" are remote applications, that is, applications that are not installed on the first computing device 130. The first app tray 630 displays information regarding the applications "First App," "Second App" and "Third App" in the first format, e.g., as icons 631, which are visually distinct from shadow icons 632. Similarly, the second app tray 640 at the second computing device 140 can display the icon associated with "First App" as a shadow icon indicating that the "First App" is not installed on the second computing device 140.

While information regarding applications is displayed as icons, the information can also be displayed in various other forms. For example, the app tray can display the information regarding applications as a text based list, e.g., a list of application names, instead of icons. The app tray can display the names of the local applications in the first format and the remote applications in the second format. For example, one or more of a font, size, color, style of the names of the local applications can be different from that of the remote applications. The first format and second format are not limited to the embodiments described above; various other embodiments can be used to clearly distinguish between the local applications and the remote applications in the app tray.

The app tray is implemented as an interactive GUI. The user can perform a number of actions on the applications in the app tray using the interactive GUI, for example, launch an application from the first app tray 630 and/or uninstall an application. Different user interactions can be used to perform different actions. For example, the user can tap the application icon in the app tray to launch the application. In another example, the user can perform a swipe action to uninstall the application.

Continuing with the launch application example, when the user selects one of the icons 631, e.g., taps an icon associated with "First App," which is a local application, the first computing device 130 launches the application. If the user selected one of the shadow icons 632, e.g., shadow icon of "Fourth App", which is an application not installed on the first computing device 130, the first computing device 130 downloads the "Fourth App," e.g., from a remote server, and then launches the "Fourth App." After the "Fourth App" is installed on the first computing device 130, the first app tray 630 is updated to indicate that the "Fourth App" is also a local application, that is, the icon associated with the "Fourth App" is now displayed in the first format, as illustrated in FIG. 6C. The server 110 updates the master application list 625 to indicate that the "Fourth App" is also executing on the first computing device 130, generates the updated master application list 626 and transmits the updated master application list 626 to the first computing device 130 and the second computing device 140.

The app trays of all the computing devices of the user are typically synchronized to provide the latest information regarding the installed applications. In some embodiments, the server 110 monitors all the computing devices to determine if any application is installed and/or uninstalled from any of the computing devices. For example, if the user installs a "Sixth App" on a third computing device "D3" of the user (not illustrated), the server 110 updates the updated master application list 626 to indicate that the "Sixth App" is installed on the third computing device to generate a second updated master application list 627 and transmits the second updated master application list 627 to the first computing device 130, the second computing device 140 and the third computing device. The app trays at the corresponding computing devices are updated to display the second updated master application list 627 accordingly. For example, as illustrated in FIG. 6C, the first app tray 630 and the second app tray 640 indicate the "Sixth App" is a remote application on the first computing device 130 and the second computing device 140, respectively. The third app tray 650 of the third computing device indicates that the "Sixth App" is a local application on the third computing device. Further, the third app tray 650 also indicates that the "First App," "Second App," "Third App," "Fourth App" and "Fifth App" are remote applications on the third computing device.

Figure 7:
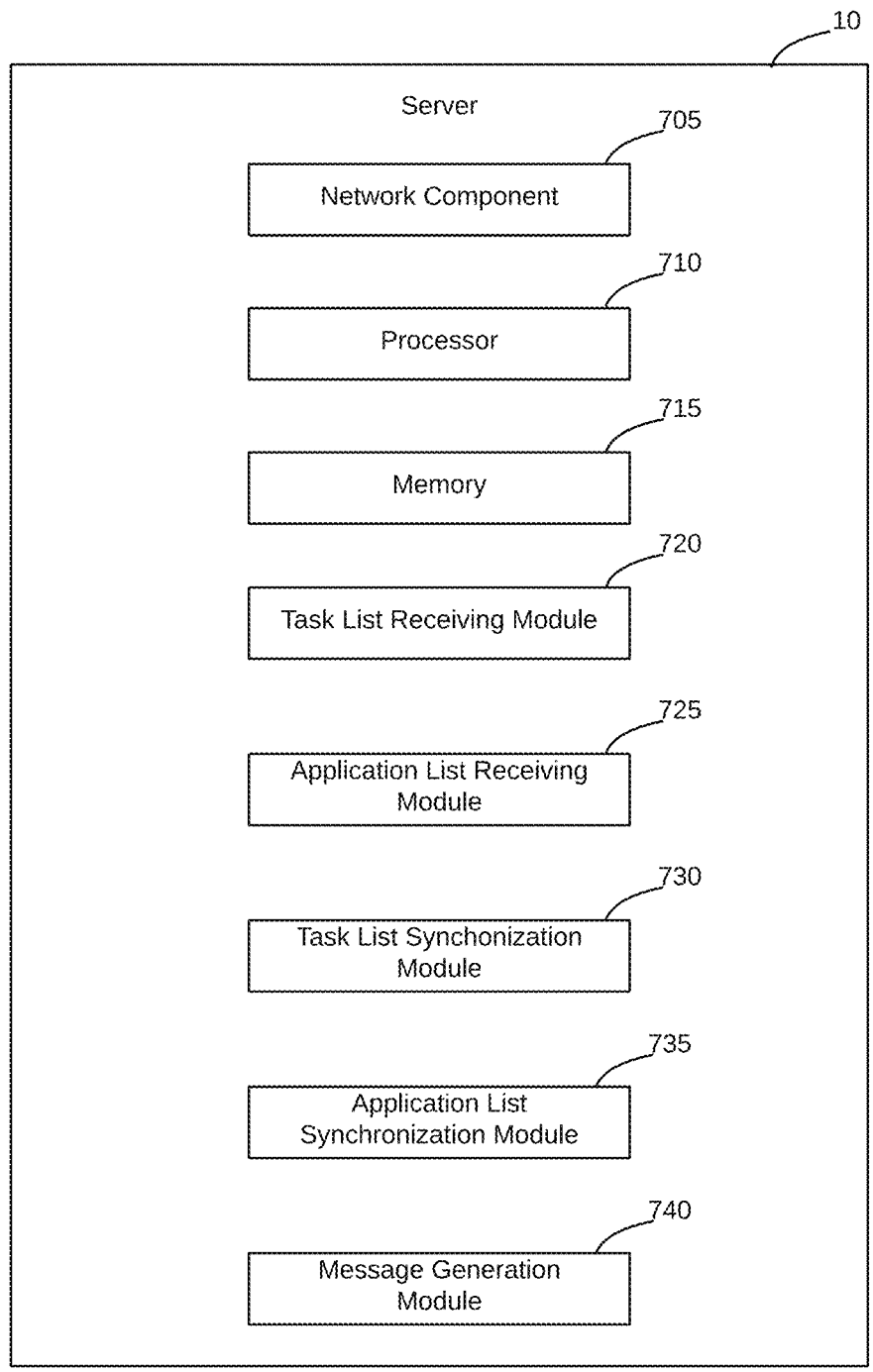
FIG. 7 is a block diagram of a server of the environment of FIG. 1.

FIG. 7 is a block diagram of a server 110 for facilitating presenting a unified view of tasks executing and applications installed on a group of computing devices associated with a user. The server 110 can be, e.g., a dedicated standalone server, or implemented in a cloud computing service having a plurality of servers. The server 110 includes a network component 705, a processor 710, a memory 715, a task list receiving module 720, an application list receiving module 725, a task list synchronization module 730, an application list synchronization module 735, and a message generation module 740. The memory 715 can include instructions which when executed by the processor 710 enables the server 110 to perform the functions, including synchronization of task lists and application lists between the computing devices, e.g., first computing device 130 and the second computing device 140, as described at least with reference to FIGS. 1-6. The network component 705 is configured for network communications with other devices, including the computing devices 130-160 and remote server 182.

The network component 705 receives a request from a computing device of a user, e.g., the first computing device 130 to provide a master task list containing information regarding a list of tasks executing on all computing devices of the user. The network component 705 can also receive a request from a computing device of the user, e.g., the first computing device 130, to provide a master application list containing information regarding applications installed on all computing devices of the user.

The task list receiving module 720 obtains a task list from each of the computing devices. The task list can include information regarding the applications executing on a particular computing device and device identification of the particular computing device. The task list receiving module 720 sends the lists of tasks received from the computing devices to the task list synchronization module 730 for synchronizing the task lists. In some embodiments, the task list receiving module 720 monitors the computing devices based on a predefined schedule to determine the list of applications executing on the computing devices. In some embodiments, the task list receiving module 720 requests the computing devices to report the list of tasks the computing devices are executing based on a predefined schedule.

The task list synchronization module 730 synchronizes the task lists to generate a master task list, e.g., master task list 225, containing a list of tasks executing on all of the computing devices associated with the user. The master task list also includes device identification information of the computing devices where each of the applications is executing. In some embodiments, the task list synchronization module 730 synchronizes the task lists to generate the master task list when the task list receiving module 720 indicates a change in any of the task lists received from one or more of the computing devices. In some embodiments, the task list synchronization module 730 synchronizes the task lists to generate the master task list when any of the computing devices requests for the master task list. After the master task list is generated, the task list synchronization module 730 instructs the network component 705 to transmit the master task list to each of the computing devices.

The task list synchronization module 730 also instructs the message generation module 740 to generate a message for instructing the computing devices to display the master task list in the task manager of the respective computing devices. In some embodiments, the message can also include instructions for generating a user interface in a specific format for displaying the master task list in the task manager. The task list synchronization module 730 also instructs the message generation module 740 to send the message to the computing devices via the network component 705.

The application list receiving module 725 obtains an application list from each of the computing devices. The application list can include information regarding applications installed on a particular computing device and device identification of the particular computing device. The application list receiving module 725 sends the applications lists received from the computing devices to the application list synchronization module 735 for synchronizing the application lists. In some embodiments, the application list receiving module 725 monitors the computing devices based on a predefined schedule to determine the list of applications installed on the computing devices. In some embodiments, the application list receiving module 725 requests the computing devices to report the list of applications installed on the respective computing devices based on a predefined schedule.

The application list synchronization module 735 synchronizes the application lists to generate a master application list, e.g., master application list 625, containing a list of applications installed on all of the computing devices associated with the user. The master application list also includes device identification information of the computing devices where each of the applications is installed. In some embodiments, the application list synchronization module 735 synchronizes the application lists when the application list receiving module 725 indicates a change in any of the application lists received from one or more of the computing devices. In some embodiments, the application list synchronization module 735 synchronizes the application lists to generate the master application list when any of the computing devices requests for the master application list. After the master application list is generated, the application list synchronization module 735 instructs the network component 705 to transmit the master application list to each of the computing devices.

The application list synchronization module 735 also instructs the message generation module 740 to generate a message for instructing the computing devices to display the master application list in the app tray of the respective computing devices. In some embodiments, the message can also include instructions for generating a user interface for displaying the master application list in the app tray in a specific format. The application list synchronization module 735 can also instruct the message generation module 740 to send the message to the computing devices via the network component 705. Additional details of the server 110 and functionalities of the components of the server 110 are discussed at least with respect to FIGS. 9-12.

Figure 8:
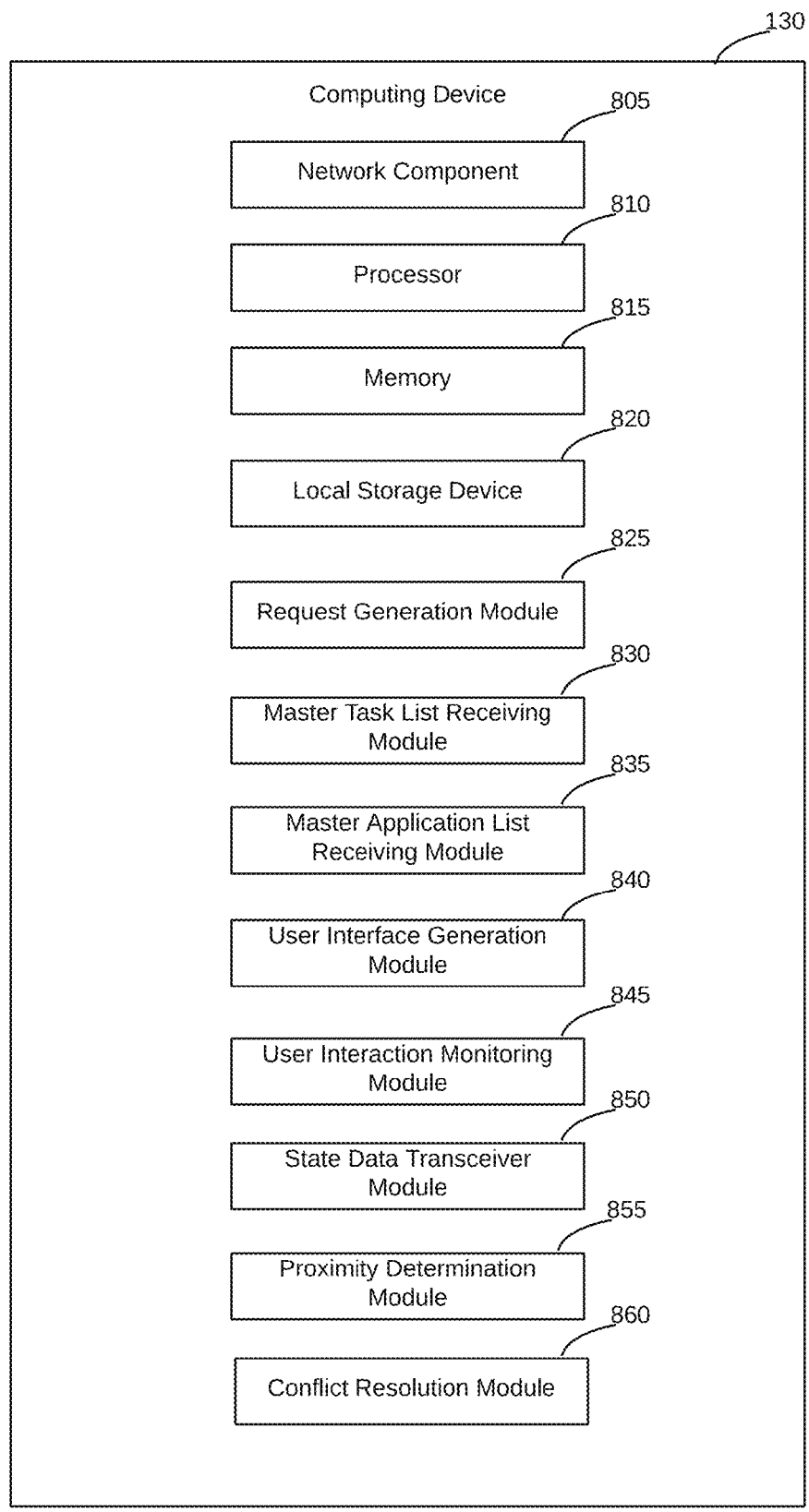
FIG. 8 is a block diagram of a computing device of the environment of FIG. 1.

FIG. 8 is a block diagram of a computing device of environment 100 of FIG. 1. The computing device 130 can include a network component 805, a processor 810, a memory 815, a local storage device 820, a request generation module 825, a master task list receiving module 830, a master application list receiving module 835, a user interface generation module 840, a user interaction monitoring module 845, and a state data transceiver module 850. The memory 815 stores instructions of the operating system which, when executed by the processor 810, cause the operating system to perform processes for realizing certain functionalities of the first computing device 130. For instance, the process of the operating system can facilitate the other modules of the computing device 130 to communicate with the server 110 and other computing devices to obtain the master task list, master application list, launch or terminate applications on other computing devices, etc. The memory 815 can further store instructions of the computer applications installed at the computing device 130.

The network component 805 can be capable of switching between states including a high power consumption state and a low power conservation state. The network component 805 can be, e.g. a Wi-Fi networking adapter, a cellular phone networking adapter, etc. The network component 805 is configured for network communications with other devices, including the server 110 and other computing devices, e.g., the second computing device 140, e.g., for receiving master task lists and master application list. The processor 810 is configured to execute the computer applications and the operating system of the first computing device 130.

The local storage device 820, as described above, can store the operating system, installed applications, user data such as profile data of the user, data files of the user and any other data necessary for the operation of the first computing device 130 and execution of the applications.

The request generation module 825 can generate a number of requests, e.g., a request for obtaining a master task list and/or master application list from the server 110, a request for launching, transferring or terminating an application, a request for obtaining state data of an application etc. The master task list receiving module 830 receives the master task list from the server 110. The master task list receiving module 830 can request for the master task list on a periodic basis and/or in response to a user request, e.g., when the user accesses the first task manager 255 on the first computing device 130.

The master application list receiving module 835 receives the master application list from the server 110. The master application list receiving module 835 can request for the master application list on a periodic basis and/or in response to a user request, e.g., when the user accesses the first app tray 630 on the first computing device 130.

The user interface (UI) generation module 840 generates the GUI for displaying the tasks in the task manager and the applications in the app tray. The UI generation module 840 works with the server 110, e.g., the message generation module 740 to generate the GUI in the specific format. For example, the UI generation module 840 generates the GUI for the first app tray 630 to display the information regarding the local applications on the first computing device in a first format and the remote applications on the first computing device 130 in a second format.

The user interaction monitoring module 845 monitors the user interactions on the first computing device 130 and receives an input from the user to perform a particular action, e.g., launching, transferring or terminating a particular application. For example, the user interaction monitoring module 845 receives a user input for launching an application that is already executing on the second computing device 140 on the first computing device 130. After the user interaction monitoring module 845 receives the user input for launching the application, the request generation module 825 generates a message for requesting the server 110 to facilitate launching of the application on the first computing device 130 and sends the request to the server 110 via the network component. The state data transceiver module 850 obtains the state data of the application from the second computing device 140 and notifies the user interaction monitoring module 845 regarding the receipt of the state data. The user interaction monitoring module 845 launches the application on the first computing device 130.

The proximity determination module 855 determines if the first computing device is in proximity with other computing devices, e.g., the second computing device 140. If the second computing device 140 is in proximity to the first computing device 130, the computing devices can communicate with each other directly, thereby minimizing the involvement of the server 110 in communications between the computing devices. For example, to terminate an application executing on the second computing device 140 from the first computing device 130, the first computing device 130 can send termination instruction to the second computing device 140 directly, e.g., via short range wireless communication. If the computing devices were not in proximity, the first computing device 130 would have to send the termination request to the server 110, which then sends the termination instruction to the second computing device 140.

The conflict resolution module 860 determines if more than one state data, representing a point of execution within a given application, is available for the given application and resolves the state data to be retained for resuming execution of the given application. A conflict exists when more than one state data is available for use during resumption of the given application. In some embodiments, the conflict resolution module 860 detects a conflict on a given computing device by identifying the application a received state data (e.g., transmitted from a second computing device) is associated with and analyzing the master task list to determine if the identified application is executing on the given computing device. When the given application is executing, the conflict resolution module 860 flags a conflict and utilizes the conflict resolution process 1300 (described below) to resolve the conflict.

In some embodiments, other computing devices of the user, e.g., the second computing device 140, also include components/modules described above with reference to computing device 130.

Figure 9:
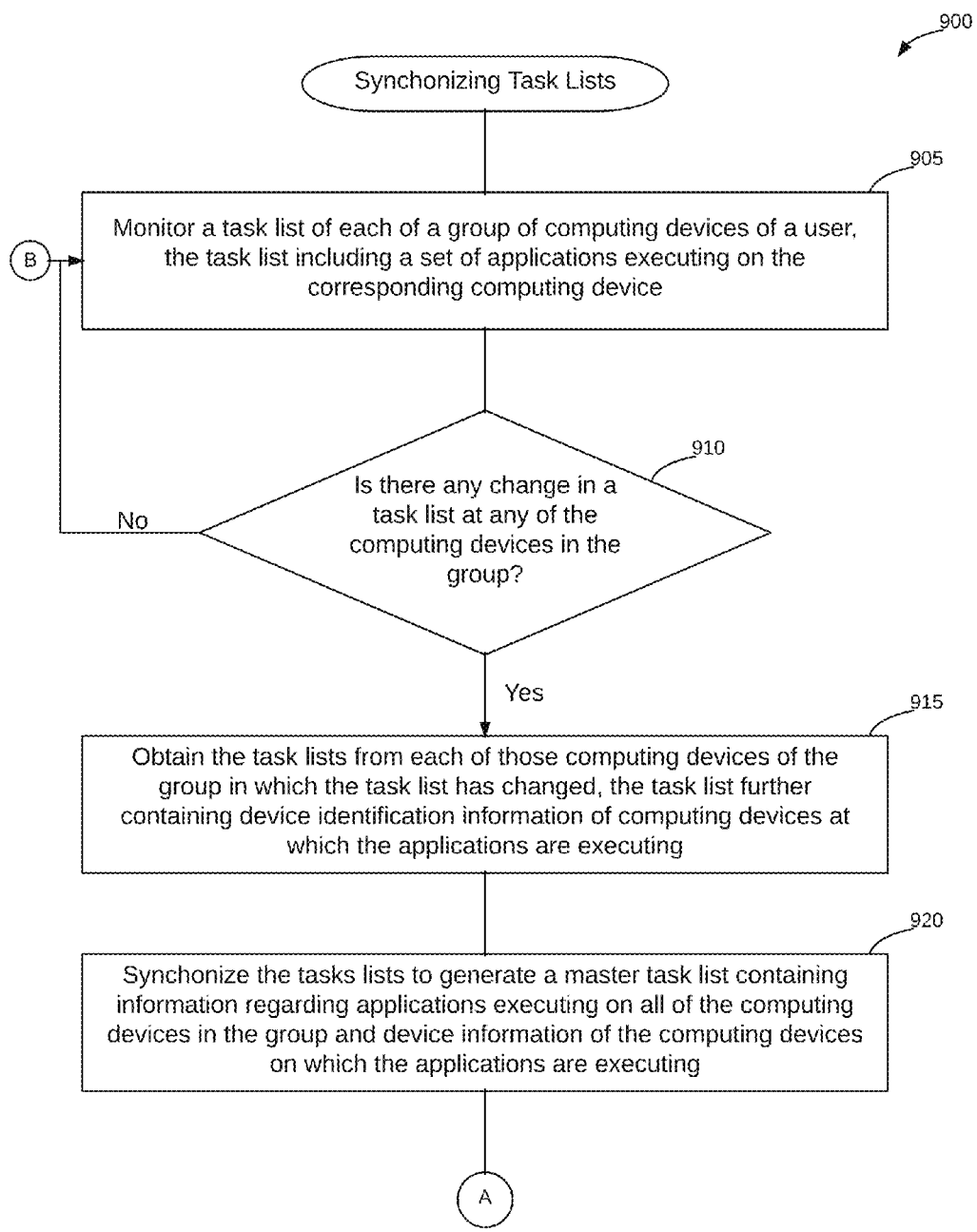
FIG. 9 is a flow diagram of a process for synchronizing task lists across a group of computing devices associated with a user.
Figure 9:
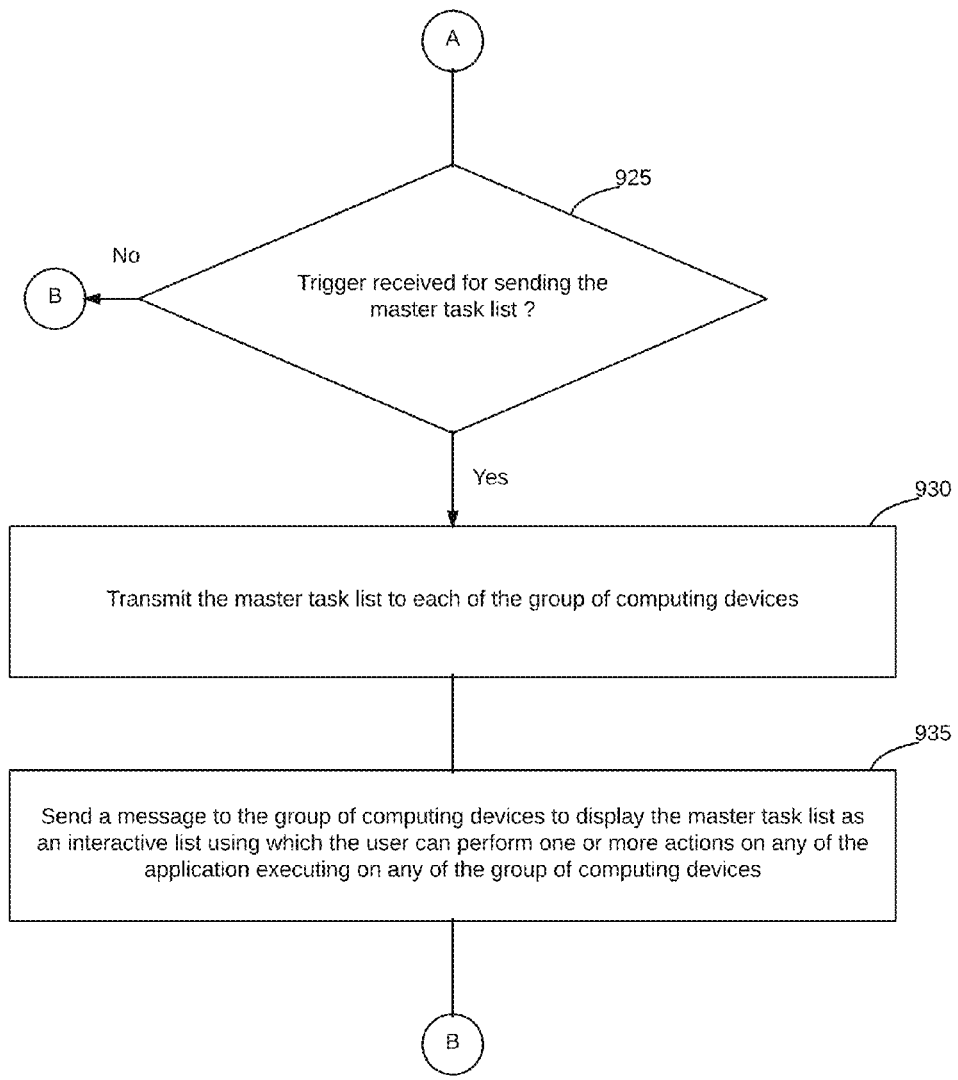

FIG. 9 is a flow diagram of a process 900 for synchronizing task lists across a group of computing devices associated with the user. In some embodiments, the process 900 is implemented in the environment 100 of FIG. 1. At block 905, the task list receiving module 720 of server 110, monitors each of the computing devices in the group to determine the list of applications executing at the computing devices.

At decision block 910, the task list receiving module 720 determines if there is a change in any of the task lists at the computing devices. There can be a change in the task list at a particular computing device in the group if an application has begun to execute or is terminated from execution compared to when the task list receiving module 720 checked the task list at the particular computing device previously. In some embodiments, each of the computing devices stores a copy the task list, which contains a list of applications executing at the corresponding computing device. The task list is updated as and when new applications are executed and/or currently executing applications are terminated.

Responsive to a determination that there is no change in any of the task lists, the task list receiving module 720 continues to monitor the computing devices at block 905. On the other hand, responsive to a determination that there is a change in at least one of the task lists, at block 915, the task list receiving module 720 obtains the task list from the computing devices at which the task lists have changed. The server 110 stores a copy of the task lists received from the computing devices. In some embodiments, the task list receiving module 720 receives the task list via the communication network 120.

At block 920, the task list synchronization module 730 synchronizes the task lists of all the computing devices and generates a master task list, e.g., master task list 225. In some embodiments, the master task list contains information regarding (a) applications executing on each of the computing devices of the group (b) device identification of the computing devices where each of the applications is executing.

At decision block 925, the task list synchronization module 730 determines if a trigger is received for transmitting the master task list to the computing devices. Responsive to a determination that no trigger is received, the process 900 continues to monitor the computing devices at block 905. On the other hand, responsive to a determination that a trigger is received for transmitting the master task list, at block 930, the task list synchronization module 730 requests the network component 705 to transmit the master task list. In some embodiments, the trigger for transmitting the master task list occurs when one or more of the computing devices requests for the master task list, an expiry of an interval since the master task list was last transmitted, an applications begins to execute at a particular computing device, an application is terminated from execution, etc. Various other triggers can be configured to transmit the master task list.

At block 935, the message generation module 740 sends a message to the computing devices to display the master task list on the corresponding computing devices as an interactive GUI, and the process 900 process proceeds to block 905 to continue to monitor the computing devices. The user can perform a number of actions on the tasks using the interactive GUI, such as launch an application, terminate an application, etc. The interactive GUI can be displayed in the task manager at the respective computing devices.

Figure 10A:
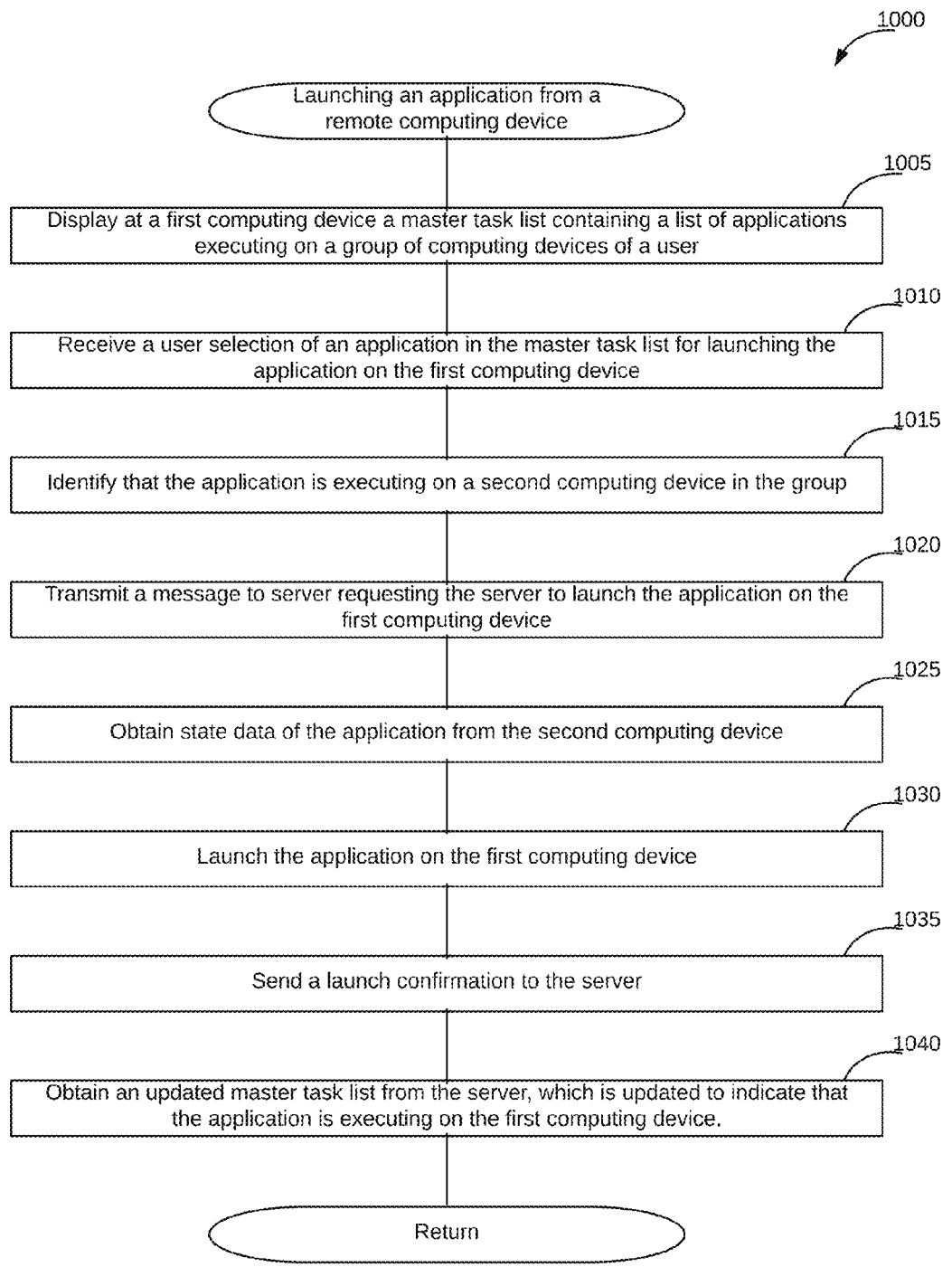
FIG. 10A is a flow diagram of a process for launching on the first computing device an application that is executing on the second computing device.

FIG. 10A is a flow diagram of a process 1000 for app pulling on to a first computing device an application that is executing on a second computing device using the interactive master task list. In some embodiments, the process 1000 is implemented in the environment 100 of FIG. 1. At block 1005, the UI generation module 840 of the first computing device 130, displays a master task list, which contains a list of applications executing on each of the group of computing devices of the user to the user on the first computing device. In some embodiments, the master task list is displayed in the first task manager 255 of the first computing device 130.

At block 1010, the user interaction monitoring module 845 receives a user selection of an application from the master task list for launching the application on the first computing device. At block 1015, the request generation module 825 determines that the application is executing on a second computing device 140. At block 1020, the request generation module 825 generates a message requesting the server 110 to facilitate launching the application on the first computing device 130 and transmits the message to the server 110 via the network component 805.

At block 1025, the state data transceiver module 850 obtains the state data of the application stored on the second computing device 140 from the server 110. After obtaining the state data, the state data transceiver module 850 confirms the receipt of the state data to the user interaction monitoring module 845. At block 1030, the user interaction monitoring module 845 launches the application on the first computing device 130.

At block 1035, the request generation module 825 generates a message to confirm the launching of the application on the first computing device 130 and transmits the message to the server 110 via the network component 805. In some embodiments, the server 110 kills the application at the second computing device 140 after the application is launched successfully at the first computing device 130.

At block 1040, the master task list receiving module 830 receives an updated master task list, which indicates that the application is now executing on the first computing device 130, and the process 1000 returns.

Referring back to blocks 1025 and 1030, in some embodiments, if the first computing device 130 and the second computing device 140 are in proximity to each other, the computing devices can communicate with each other directly, thereby minimizing the involvement of the server 110 in communications between the computing devices. For example, the first computing device 130 can obtain the state data from the second computing device 140 directly, e.g., via short range wireless communication.

Figure 10B:
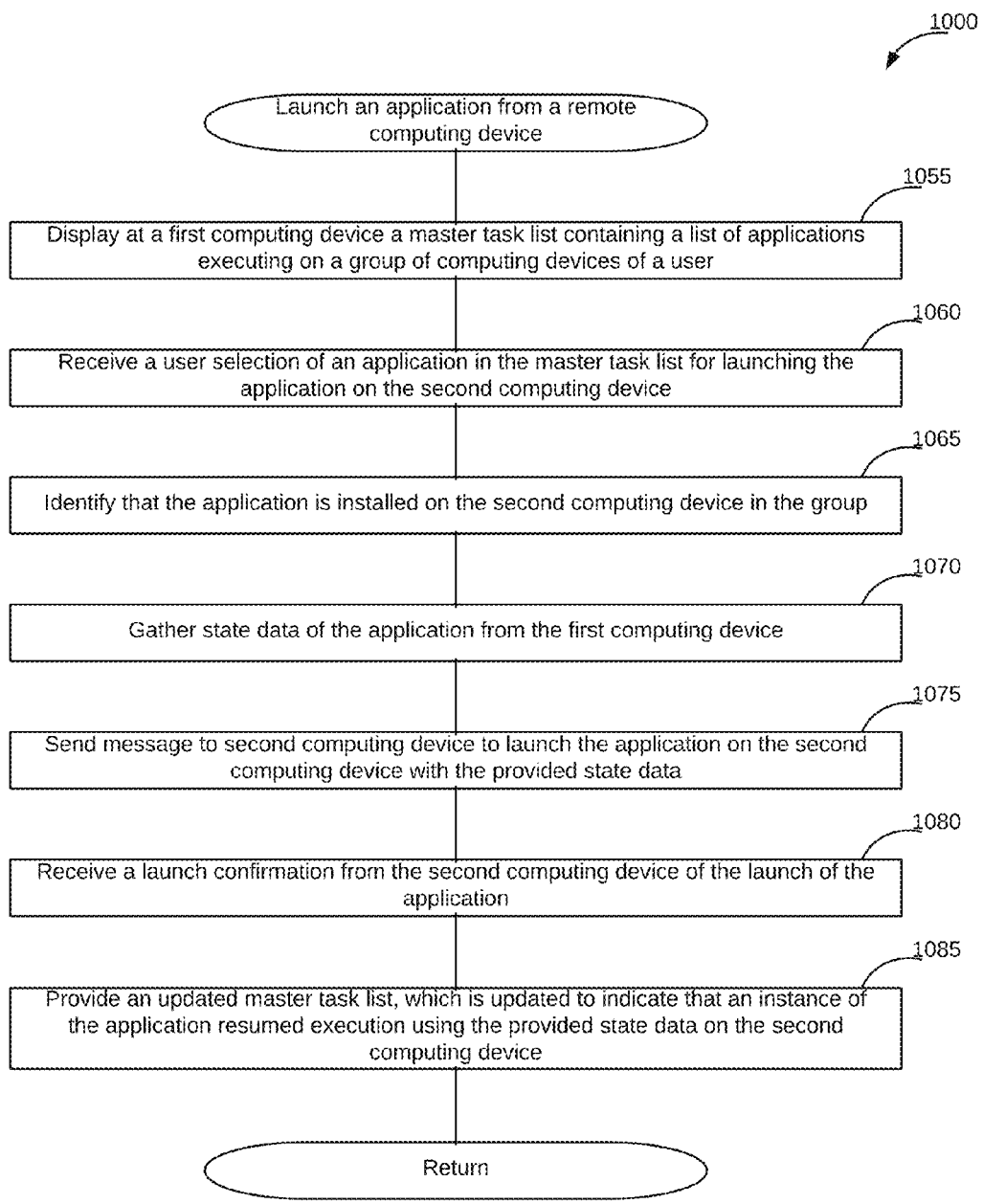
FIG. 10B is a flow diagram of a process for app casting on a second computing device an application that is executing on a first computing device using the interactive master task list.
Figure 10C:
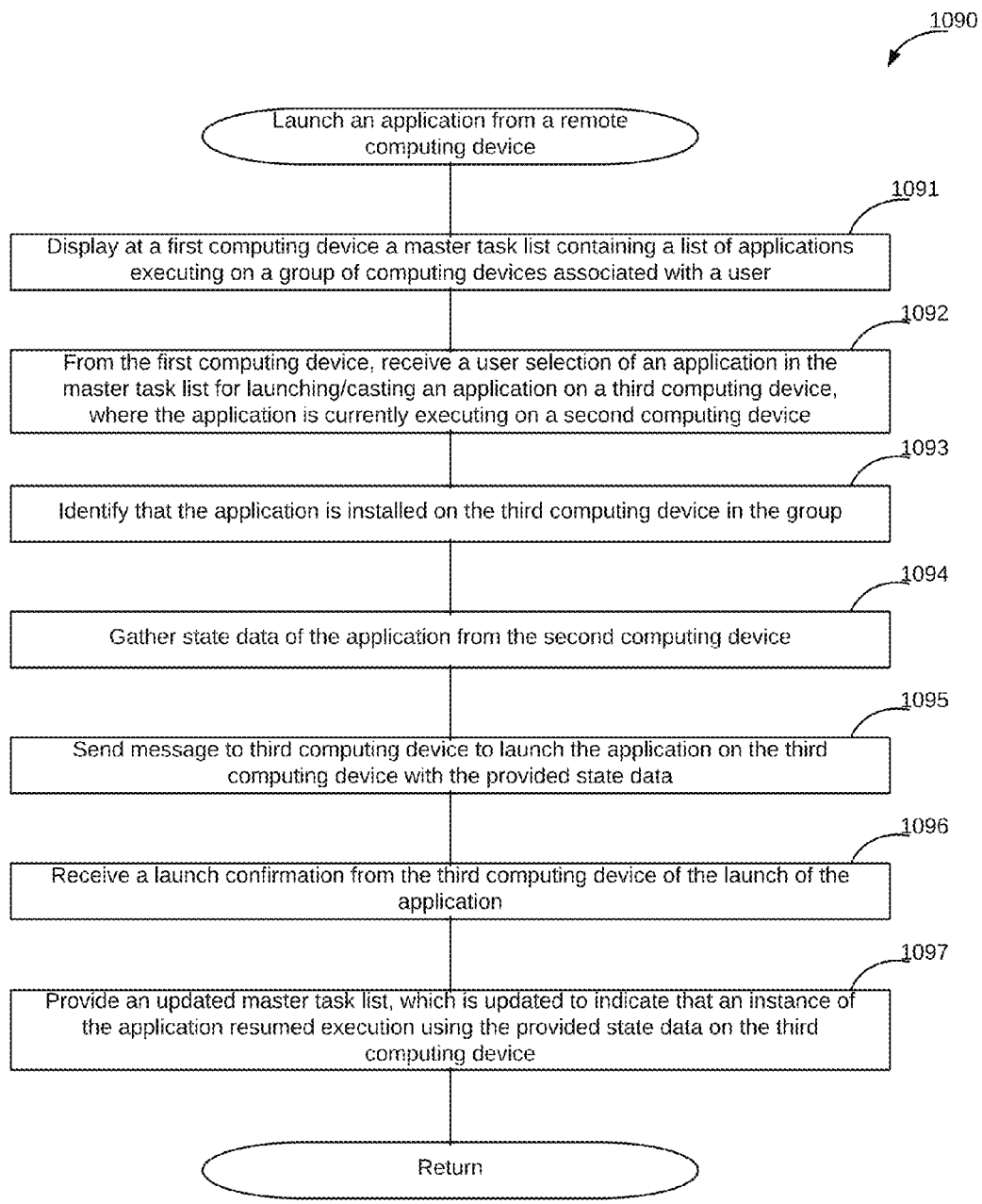
FIG. 10C is a flow diagram of a process for app casting, using an interactive master task list on first computing device, an application that is executing on a second computing device on to a third computing device

FIG. 10B is a flow diagram of a process 1050 for app casting on a second computing device an application that is executing on a first computing device using the interactive master task list. In some embodiments, the process 1000 is implemented in the environment 100 of FIG. 1. At block 1055, the UI generation module 840 of the first computing device 130, displays a master task list, which contains a list of applications executing on each of the group of computing devices of the user to the user on the first computing device. In some embodiments, the master task list is displayed in the first task manager 255 of the first computing device 130.

At block 1060, the user interaction monitoring module 845 receives a user selection of an application from the master task list for launching the application on the second computing device 140. At block 1065, the request generation module 825 determines that the application is executing on a second computing device 140. At block 1070, the state data transceiver module 850 obtains the state data of the application stored on the first computing device 130 from the server 110. After obtaining the state data, the state data transceiver module 850 confirms the receipt of the state data to the user interaction monitoring module 845. At block 1075, the user interaction monitoring module 845 launches the application on the second computing device 140.

At block 1035, the request generation module 825 generates a message to confirm the launching of the application on the second computing device 140 and transmits the message to the server 110 via the network component 805. In some embodiments, the server 110 kills the application at the first computing device 130 after the application is launched successfully at the second computing device 140. At block 1040, the master task list receiving module 830 receives an updated master task list, which indicates that the application is now executing on the second computing device 140, and the process 1000 returns.

FIG. 100 is a flow diagram of a process 1090 for app casting, using an interactive master task list on first computing device, an application that is executing on a second computing device on to a third computing device. In some embodiments, the process 1090 is implemented in the environment 100 of FIG. 1. At block 1091, the UI generation module 840 of the first computing device 130, displays a master task list, which contains a list of applications executing on each of the group of computing devices of the user to the user on the first computing device 130. In some embodiments, the master task list is displayed in the first task manager 255 of the first computing device 130.

At block 1092, the user interaction monitoring module 845 receives a user selection of an application from the master task list for launching the application on the third computing device 150. At block 1093, the request generation module 825 determines that the application is executing on a second computing device 140. At block 1093, the request generation module 825 generates a message requesting the server 110 to facilitate launching the application on the third computing device 150 and transmits the message to the server 110 via the network component 805.

At block 1094, the state data transceiver module 850 obtains the state data of the application stored on the second computing device 140 from the server 110. After obtaining the state data, the state data transceiver module 850 confirms the receipt of the state data to the user interaction monitoring module 845. At block 1095, the user interaction monitoring module 845 launches the application on the third computing device 150.

At block 1096, the request generation module 825 generates a message to confirm the launching of the application on the third computing device 150 and transmits the message to the server 110 via the network component 805. In some embodiments, the server 110 kills the application at the second computing device 140 after the application is launched successfully at the third computing device 150.

At block 1097, the master task list receiving module 830 receives an updated master task list, which indicates that the application is executing on the third computing device 130, and the process 1000 returns.

Referring back to blocks 1094 and 1095, in some embodiments, if the second computing device 140 and the third computing device 150 are in proximity to each other, the computing devices can communicate with each other directly, thereby minimizing the involvement of the server 110 in communications between the computing devices. For example, the third computing device 150 can obtain the state data from the second computing device 140 directly, e.g., via short range wireless communication.

Figure 11:
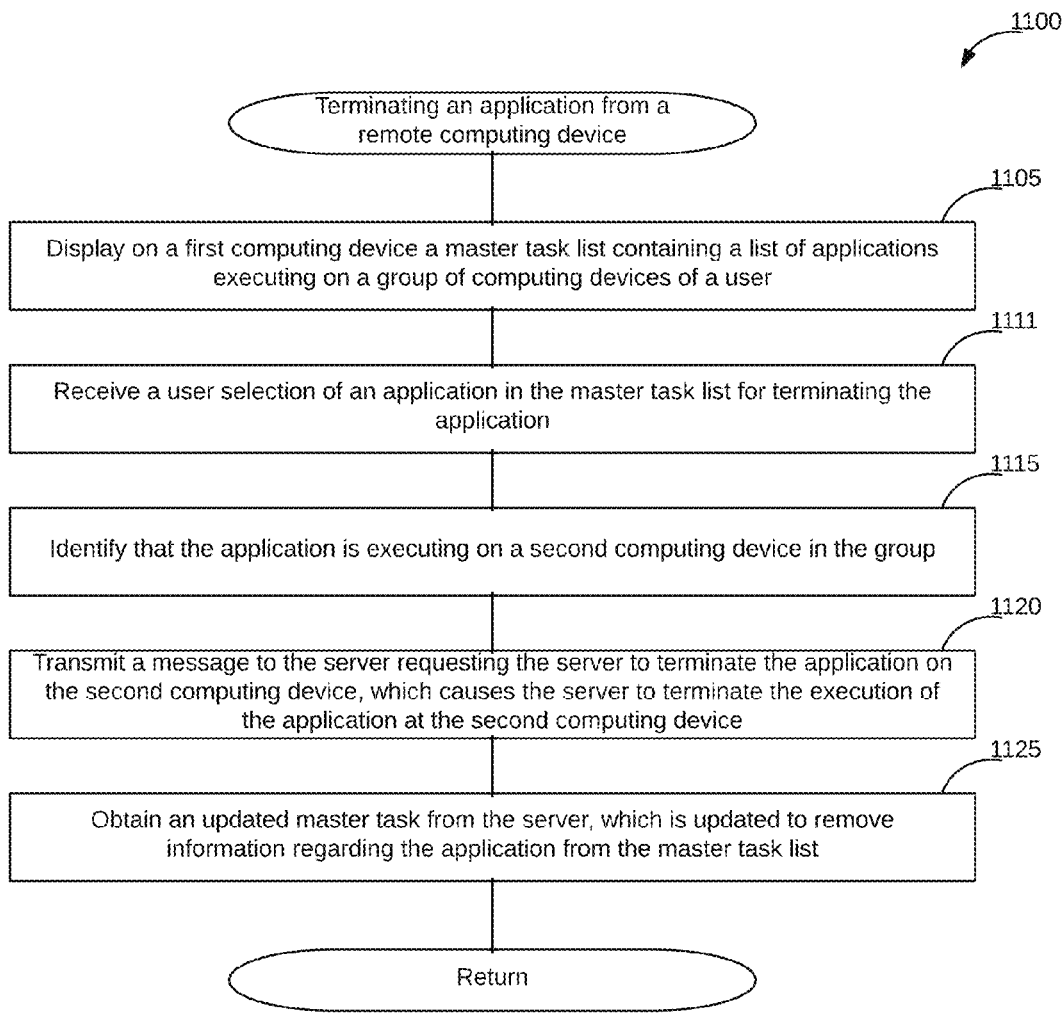
FIG. 11 is a flow diagram of a process for terminating an application that is executing on the second computing device from the first computing device.

FIG. 11 is a flow diagram of a process 1100 for terminating from a first computing device of a user an application that is executing on a second computing device of the user. In some embodiments, the process 1100 is implemented in the environment 100 of FIG. 1. At block 1105, the UI generation module 840 of the first computing device 130, displays a master task list, which contains a list of applications executing on each of the group of computing devices of the user to the user on the first computing device. In some embodiments, the master task list is displayed in the first task manager 255 of the first computing device 130.

At block 1110, the user interaction monitoring module 845 receives a user selection of an application from the master task list for terminating the application. At block 1115, the request generation module 825 determines that the application is executing on a second computing device 140. At block 1120, the request generation module 825 generates a message requesting the server 110 to facilitate terminating the application on the second computing device 140 and transmits the message to the server 110 via the network component 805.

After receiving the request, the server 110 can transmit a message instructing the second computing device 140 to terminate the application. At block 1125, the master task list receiving module 830 receives an updated master task list, which is updated to reflect the termination of the application at the second computing device 140. The process 1100 returns after receiving the updated list. In some embodiments, the master task list is updated to reflect the termination of the application by removing the entry which has the information for the application executing at the second computing device 140.

Referring back to block 1120, in some embodiments, if the first computing device 130 and the second computing device 140 are in proximity to each other, the computing devices can communicate with each other directly, thereby minimizing the involvement of the server 110 in communications between the computing devices. For example, the first computing device 130 can send the termination instruction to the second computing device 140 directly, e.g., via short range wireless communication.

Figure 12:
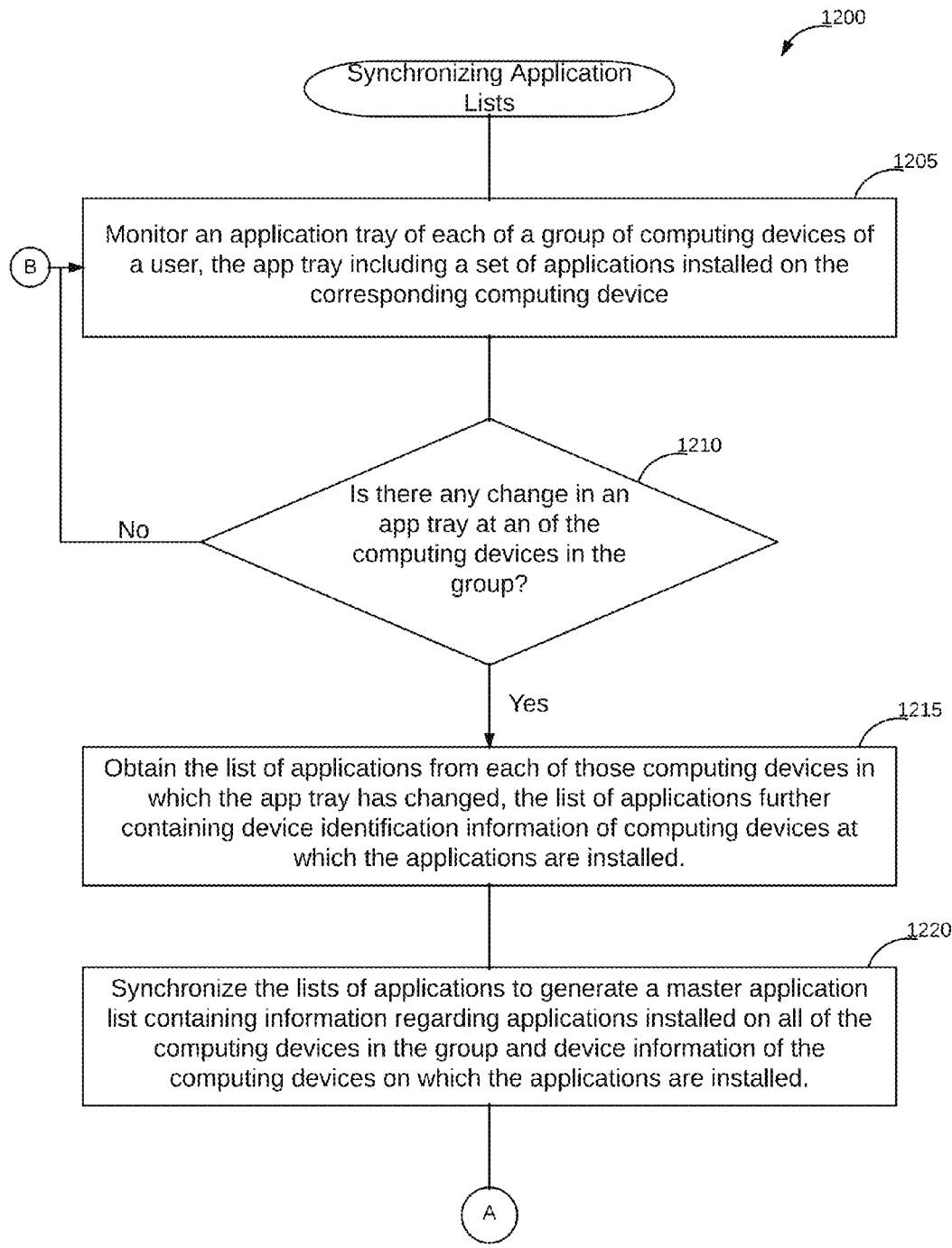
FIG. 12 is a flow diagram of a process for synchronizing application lists across the group of computing devices.
Figure 12:
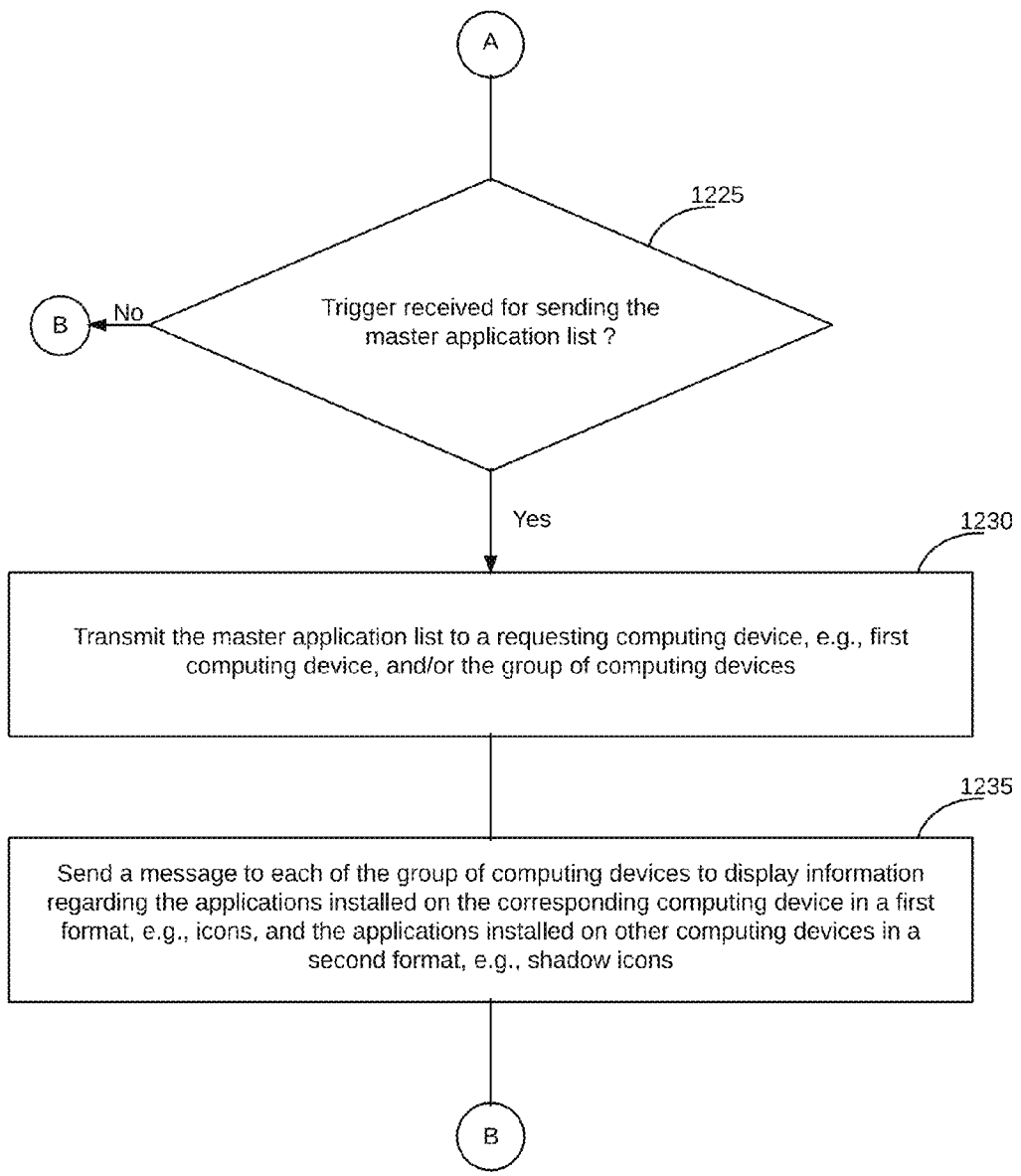

FIG. 12 is a flow diagram of a process 1200 for synchronizing application lists across a group of computing devices associated with the user. In some embodiments, the process 1200 is implemented in the environment 100 of FIG. 1. At block 1205, the application list receiving module 725 of server 110, monitors each of the computing devices in the group to determine the list of applications installed on the computing device.

At decision block 1210, the application list receiving module 725 determines if there is a change in any of the application lists at any of the computing devices. There can be a change in the application list at a particular computing device in the group if an application is installed and/or uninstalled compared to when the application list receiving module 725 checked the application list at the particular computing device previously. In some embodiments, each of the computing devices stores a copy the application list, which contains a list of applications installed on the corresponding computing device. The application list is updated as and when new applications are installed and/or existing applications are uninstalled.

Responsive to a determination that there is no change in any of the application lists, the application list receiving module 725 continues to monitor the computing devices at block 1205. On the other hand, responsive to a determination that there is a change in at least one of the application lists, at block 1215, the application list receiving module 725 obtains the application list from the computing devices at which the application lists have changed. The server 110 stores a copy of the application lists received from the computing devices. In some embodiments, the application list receiving module 725 receives the application list via the communication network 120.

At block 1220, the application list synchronization module 735 synchronizes the application lists of all the computing devices and generates a master application list, e.g., master application list 625. In some embodiments, the master application list contains information regarding (a) applications installed on each of the computing devices of the group (b) device identification of the computing devices where each of the applications is installed.

At decision block 1225, the application list synchronization module 735 determines if a trigger is received for transmitting the master application list to the computing devices. Responsive to a determination that no trigger is received, the process 1200 continues to monitor the computing devices at block 1205. On the other hand, responsive to a determination that a trigger is received for transmitting the master application list, at block 1230, the application list synchronization module 735 requests the network component 705 to transmit the master application list. In some embodiments, the trigger for transmitting the master application list occurs when one or more of the computing devices requests for the master application list, an expiry of an interval since the master application list was transmitted last, etc. Various other triggers can be configured to transmit the master application list.

At block 1235, the message generation module 740 sends a message to the computing devices to display the master application list on the corresponding computing devices as an interactive GUI, and the process 1200 process proceeds to block 1205 to continue to monitor the computing devices. The interactive GUI can be displayed in the app tray at the respective computing devices. The user can perform a number of actions on the applications using the interactive GUI, such as launch an application, install an application, uninstall an application etc. In some embodiments, the message generation module 740 sends a message to the computing devices to display information regarding the local applications in a format different from that of the remote applications. For example, the message generation module 740 sends a message to the first computing device 130 to display icons associated with the local applications on the first computing device 130 in a first format and icons associated with the remote applications in a second format, e.g., as shadow icons.

Figure 13:
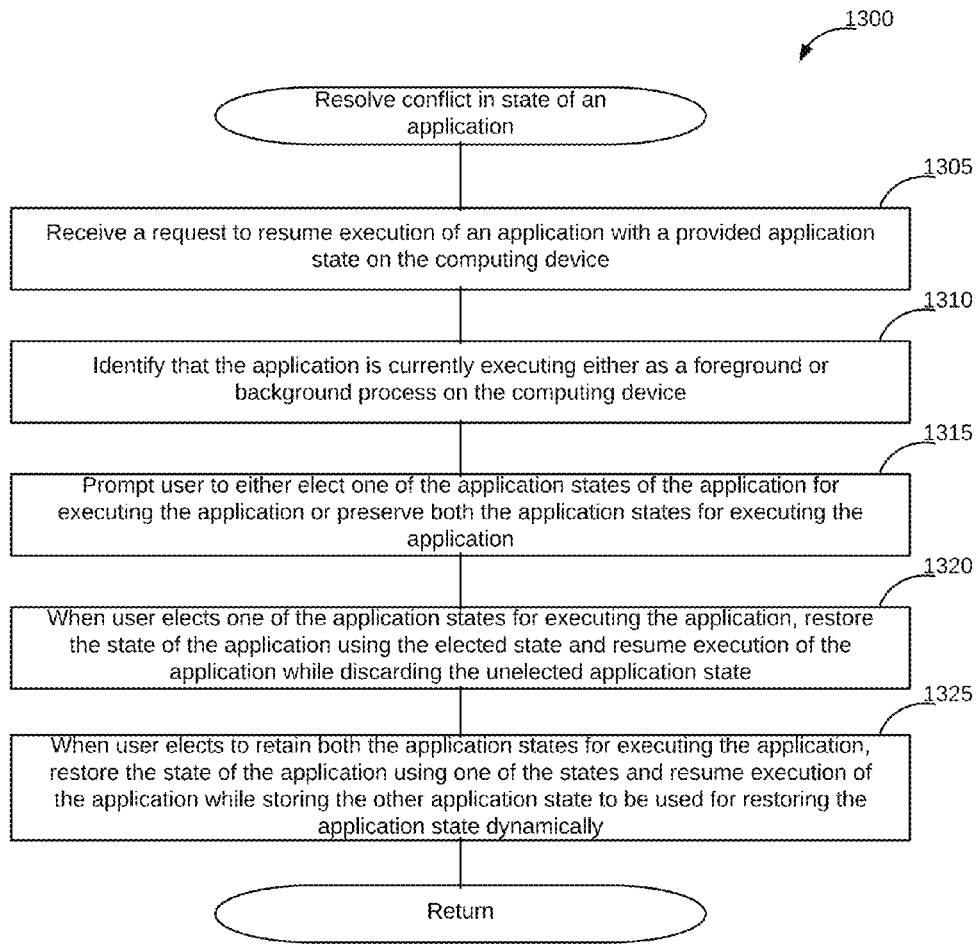
FIG. 13 is a flow diagram of a process for resolving state data conflict in a given computing device.

FIG. 13 is a flow diagram of a process 1300 for resolving state data conflict in a given computing device. In some embodiments, the process 1300 is implemented in the environment 100 of FIG. 1. At block 1305, the conflict resolution module 860 of the first computing device 130 monitors the requests to resume execution of an application using a received state data to identify any potential conflict in state data. At block At block 1310, the conflict resolution module 860 analyzes the master task list to determine if the application (to be resumed using the received state data) is currently executing either as a foreground or background process on the first computing device 130. At block 1315, when the conflict resolution module 860 identifies a conflict, the conflict resolution module 860 prompts the user to either elect one of the state data of the application for executing the application or preserve more than one of the available state data for executing the application.

At block 1320, when user elects one of the application states for executing the application, the conflict resolution module 860 restores the state of the application using the elected state data and resumes execution of the application. In some embodiments, the conflict resolution module 860 discards the unelected application state.

At block 1325, when user elects to retain more than one state data for the application, the conflict resolution module 860 restore the state of the application using one of the state data and resumes execution of the application. Further, the conflict resolution module 860 stores the other application state data to be used for restoring the application state dynamically when the user selects the instance of the application (e.g., through the master task list) representing the stored application state data, and the process 1300 returns.

Figure 14:
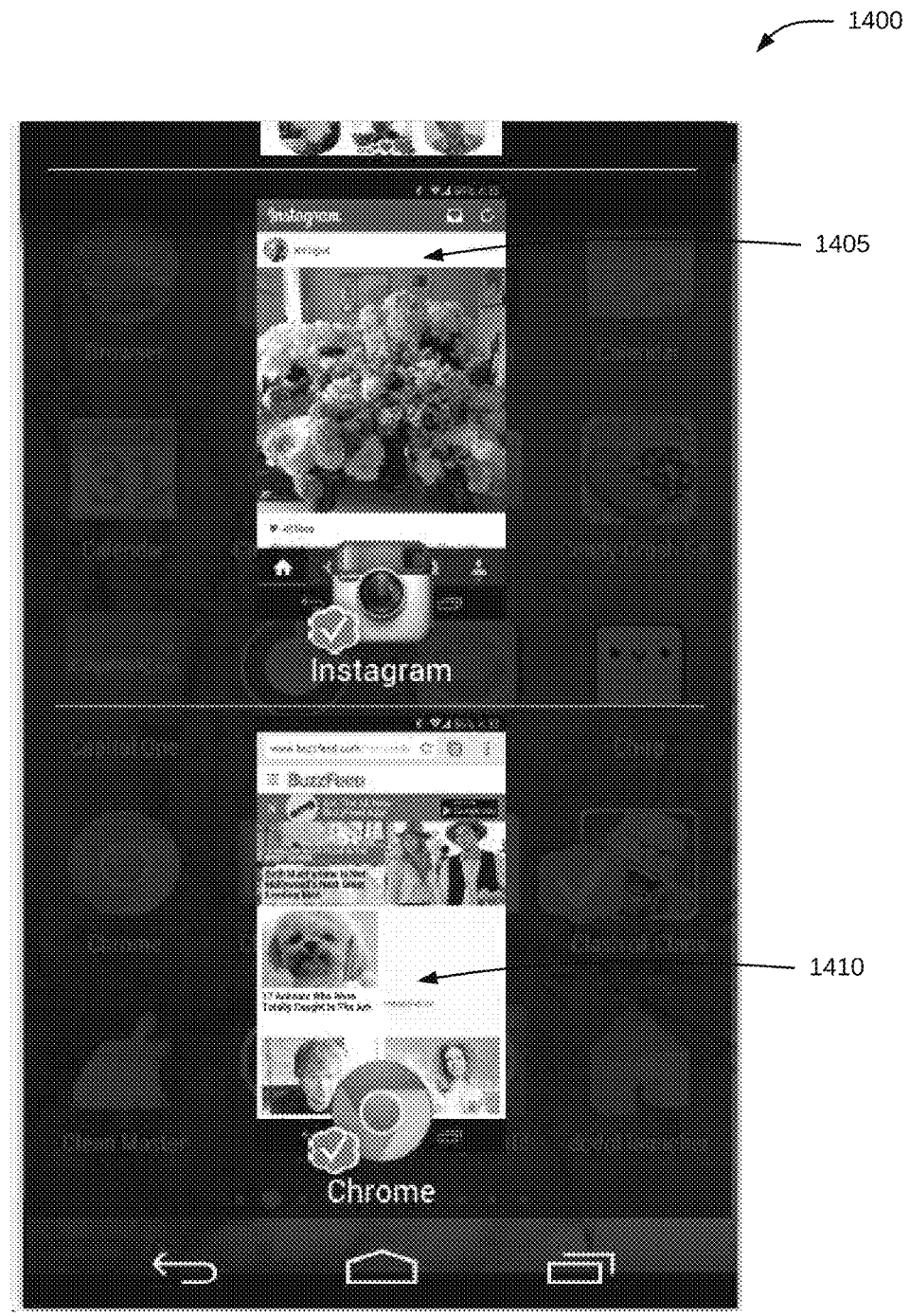
FIG. 14 is an example GUI of a task manager displayed at the first computing device.

FIG. 14 is an example GUI 1400 of a first task manager 255 displayed at a first computing device 130 of the user. The GUI 1400 displays the applications as a scrollable list of tiles. For example, the GUI 1400 displays the application "Instagram" as a first tile 1405 and the application "Chrome" as a second tile 1410. The applications displayed in the GUI 1400 can be executing on any of the computing devices of the user.

Figure 15B:
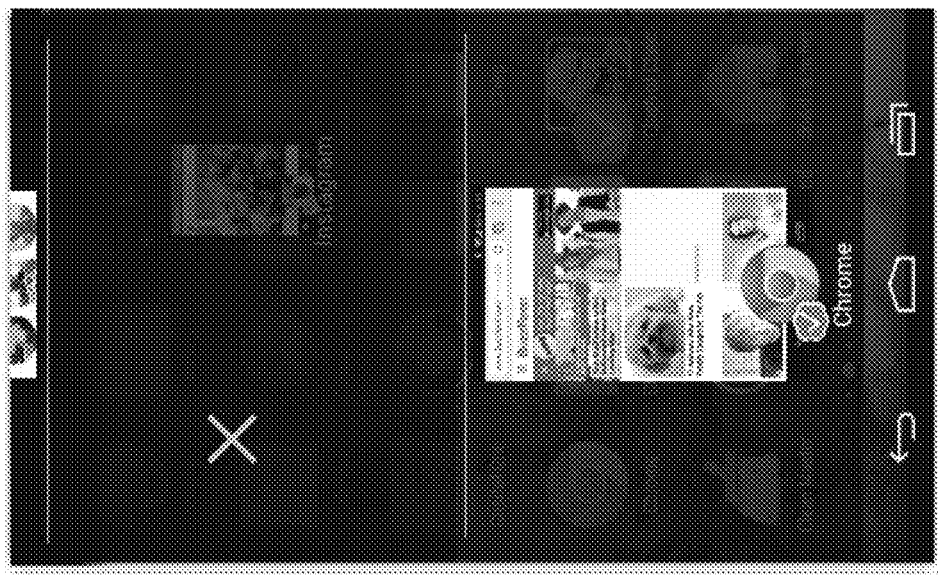
FIGS. 15A and 15B, collectively, is an example GUI of a task manager illustrating terminating an application executing on the second computing device from the first computing device.
Figure 15A:
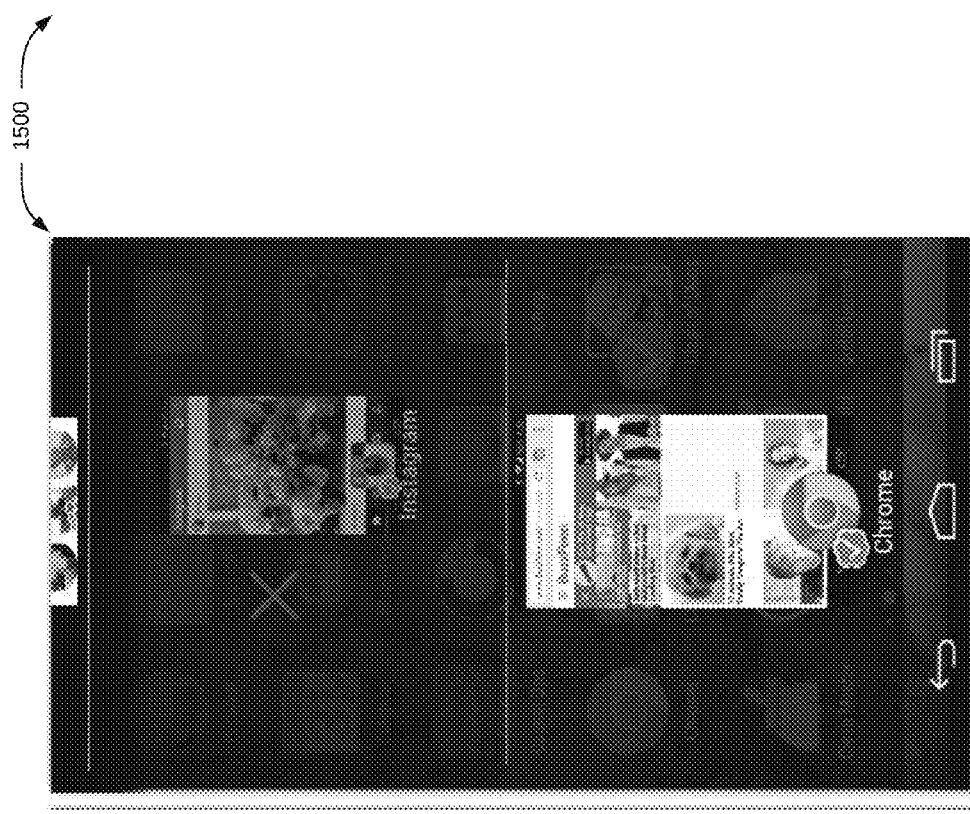

FIGS. 15A and 15B, collectively, is an example GUI 1500 of a first task manager 255 illustrating terminating an application executing on the second computing device 140 from the first computing device 130 of the user. The user can terminate an application by swiping the tile associated with the application, e.g., from left to right on the display of the first computing device 130, as illustrated in FIGS. 14A and 14B. The applications displayed in the GUI 1500 can be executing on any of the computing devices of the user. In some embodiments, the application "Instagram" is executing on a second computing device of the user.

FIGS. 16A and 16B, collectively, is an example GUI 1600 of a first task manager 255 illustrating app casting an application from a first computing device 130 to a second computing device using the task manager 255. The user can app cast an application within the task manager 255 by swiping the tile associated with the application, e.g., from right to left on the display of the first computing device 130, as illustrated in FIGS. 16A and 16B. In some embodiments, the GUI 1600 can display a list of available computing devices and the user can select one of the available computing devices and app cast the application to the selected device.

Figure 17A:
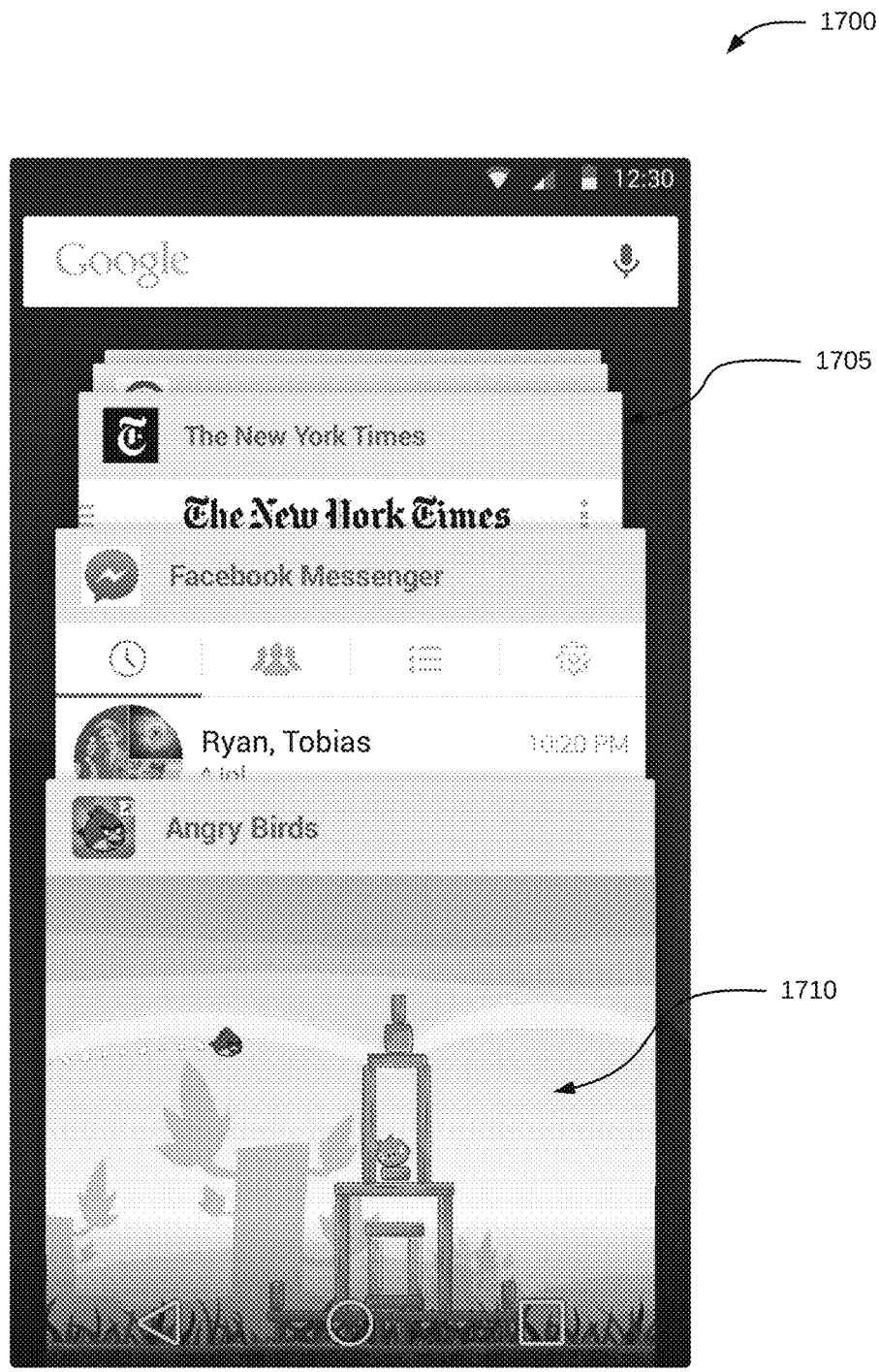
FIGS. 17A-17E, collectively, is an example GUI of a first task manager illustrating app casting an application from a first computing device to a second computing device using the task manager.

FIGS. 17A-17E, collectively, is an example GUI 1700 of a first task manager 255 illustrating app casting an application from a first computing device 130 to a second computing device 140 using the task manager 255. FIG. 17A illustrates the task manager 225 as a group of tiles 1705 each corresponding to the various instances of applications executing on the first computing device 130. For example, the tile 1710 ("Angry Bird® tile") corresponds to an instance of Angry Bird® application executing on the first computing device 130. In some embodiments, the tile displays the point of execution of the instance of application when the task manager 255 was invoked or when the instance of the application was pushed to the background.

Figure 17B:
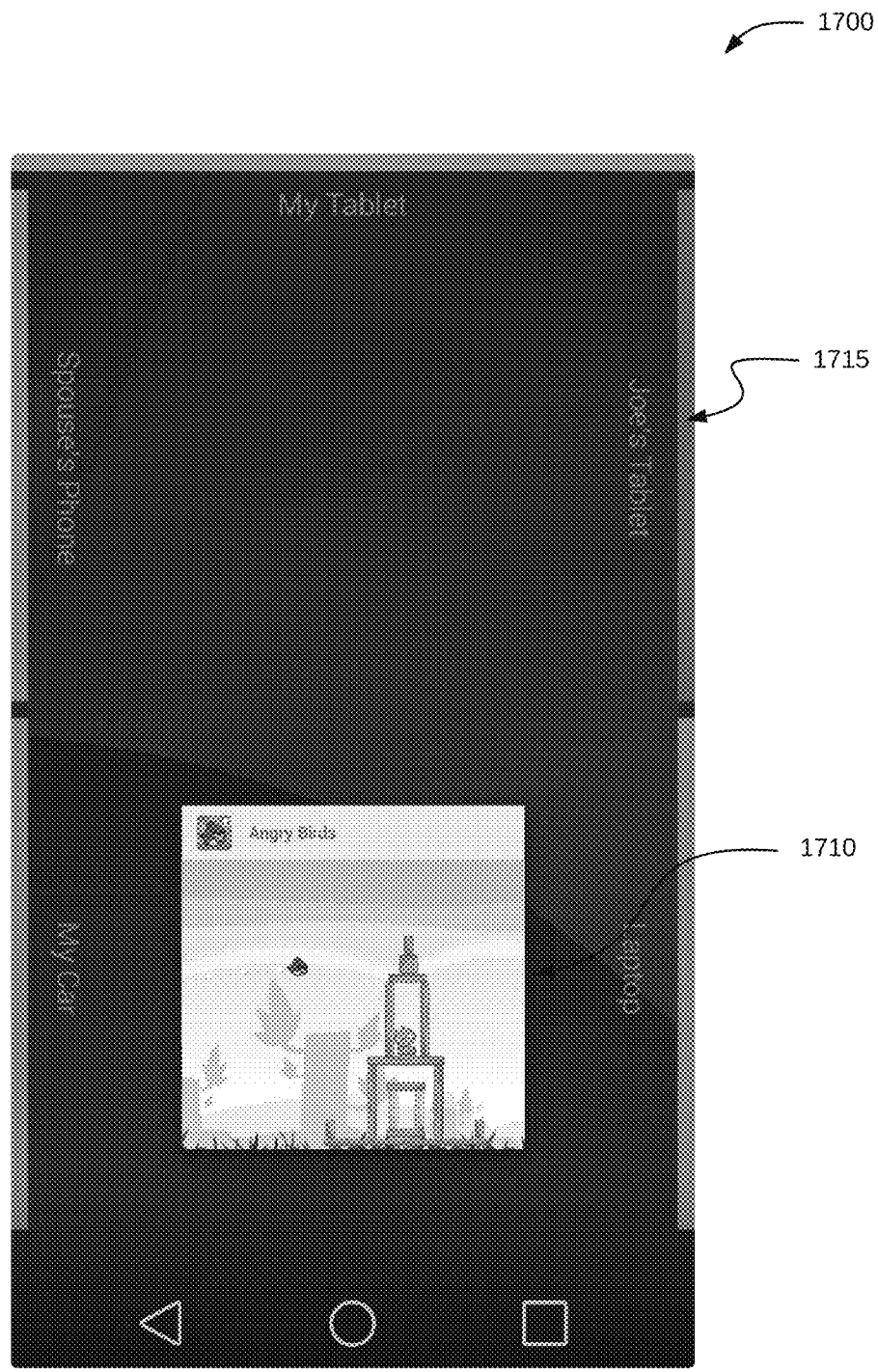

FIG. 17B illustrates the utilization of the task manager 255 to app cast the instance of Angry Bird® application, represented by the tile 1710, to one of the computing devices associated with the user. The user can select (e.g., by clicking) any of the tiles displayed by the task manager 255 to app cast. In some embodiments, once the user selects a tile, the task manager 255 hides the unselected tiles (while continuing to display the selected tile 1710) and provides the various computing devices 1715 the user can app cast the instance of application corresponding to the selected tile 1710. In some embodiments, the user can app cast the selected tile 1710 to more than one computing device, for e.g., to the computing devices of a group of friends.

In some embodiments, the various computing devices 1715 can include any of the computing devices associated with the user, e.g., the user's laptop, the user's tablet, the phone of the user's spouse, the tablet of the user's friend, the in-vehicle computing system of the user's automobile, etc. In some embodiments, the task manager 255 can automatically app cast (or app pull) an application to one of the computing devices associated with the user based on a combination of factors, including the service provided by the application, the preference of the user, the relative benefit of running the application in a particular computing device over the rest of the computing devices associated with the user, etc.

For example, the user can set preferences to automatically app pull an executing navigation application from any of the user's computing devices to the in-vehicle computing system of the user's automobile when the user is in proximity to the automobile or when the automobile is in use. So, when the user has requested directions to a particular destination using the navigation application on the user's smartphone, the in-vehicle computing system of the user's automobile will app pull the navigation application from the smartphone and start directing the user to the particular destination using the in-vehicle computing system when the user enters the automobile.

It should be noted that the above example is provided to illustrate a scenario where the user can setup various preferences to utilize the app pull and app cast features in conjunction with the task manager 255 to create a seamless usage experience amongst the various computing devices of the user. Therefore, the above example should be construed to limit the scope of the disclosed technology.

Figure 17C:
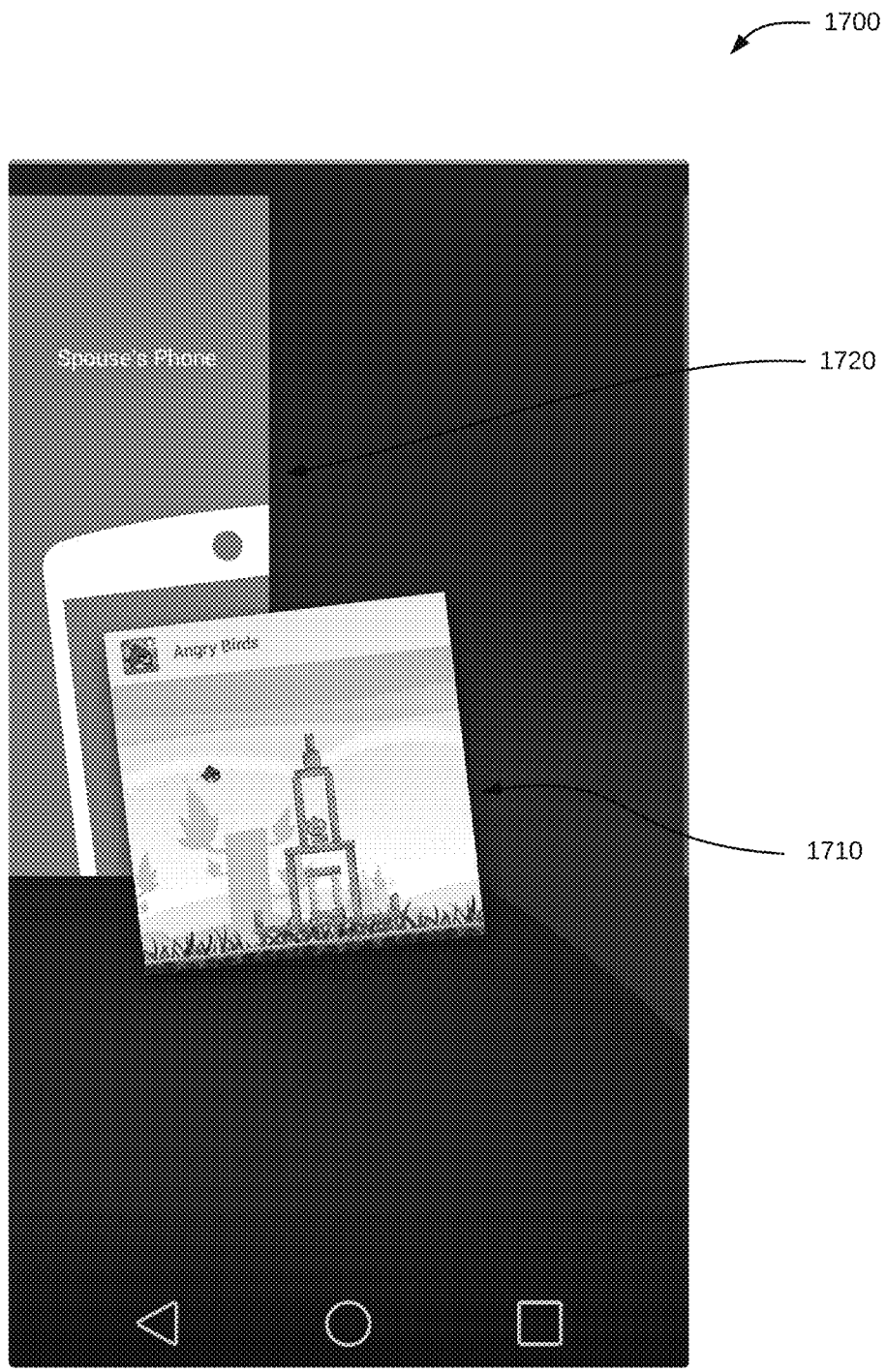
Figure 17D:
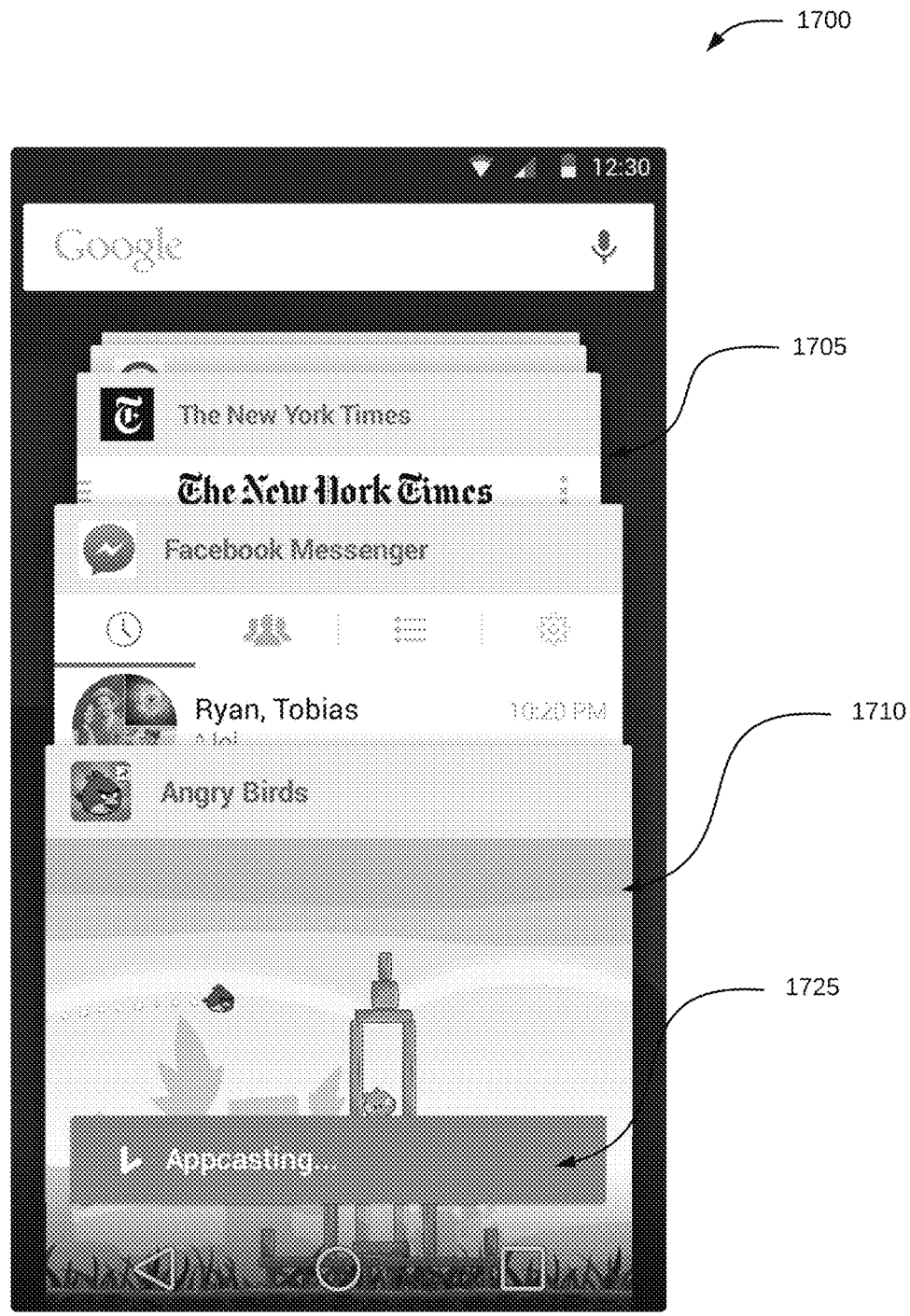
Figure 17E:
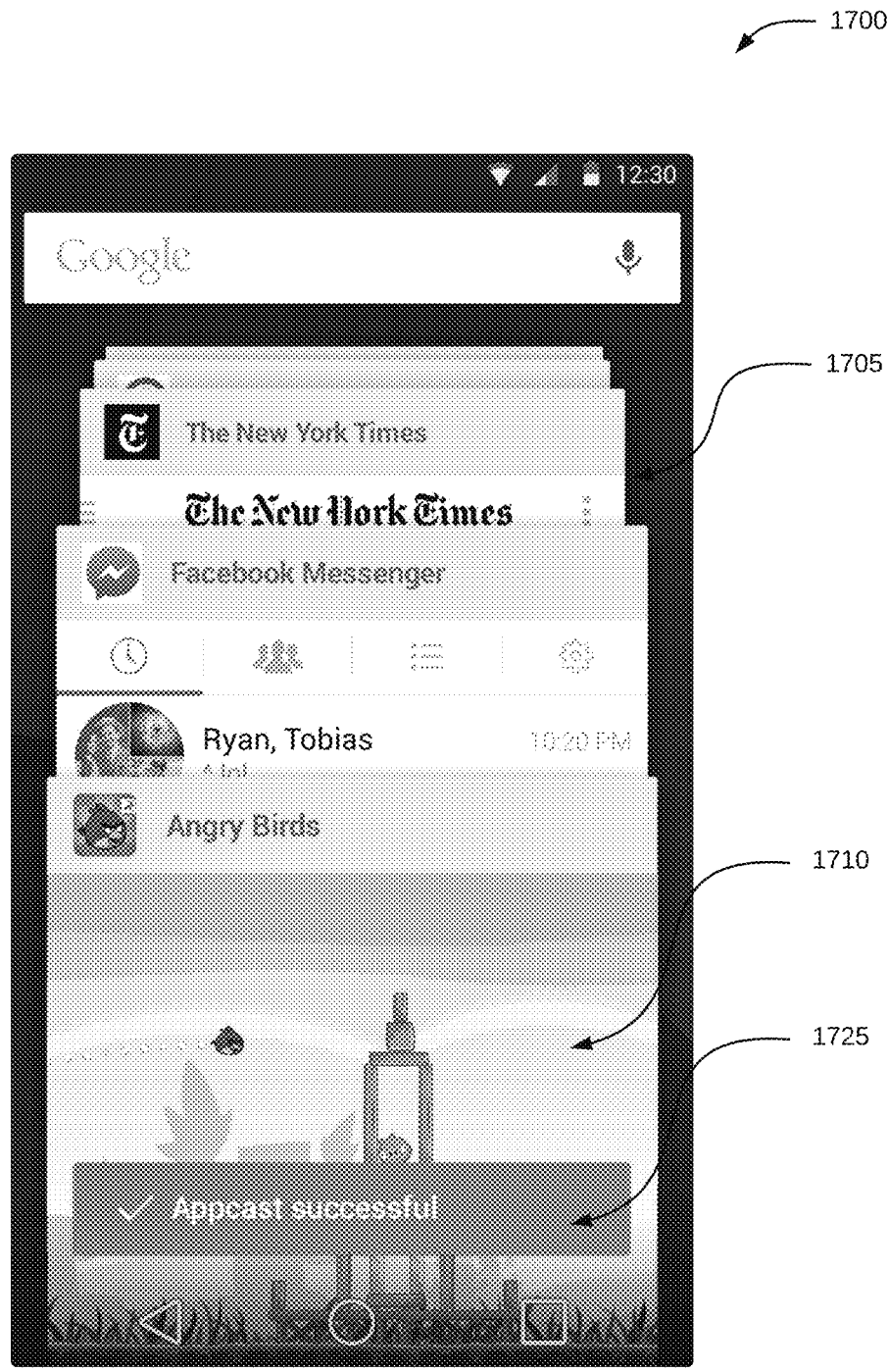

FIG. 17C illustrates the utilization of the task manager 255 to app cast the instance of Angry Bird® application, represented by the tile 1710, to the computing device 1720 associated with the user's spouse. The user can transfer the execution of an application by dragging the tile associated with the application, e.g., by using touch sensitive screen to select and drag the tile, as illustrated in FIG. 17C. In some embodiments, the GUI 1700 provides a highlighted area of the display screen associated with the device 1720 the tile 1710 is being app cast to. In some embodiments, the GUI 1700 hides all the remaining devices other than the device(s) the tile 1710 (and, in turn, the associated instance of application) is being app cast to. FIGS. 17D and 17E illustrate the status update 1725, provided by the task manager 255, 1705, as the instance of the application associated with the tile 1710 is being app cast to the second computing device 140 (i.e., the phone of the user's spouse).

Figure 18A:
FIGS. 18A and 18B, collectively, is an example GUI of a second task manager on the second computing device illustrating notification and launching of an application app cast from a first computing device.
Figure 18B:
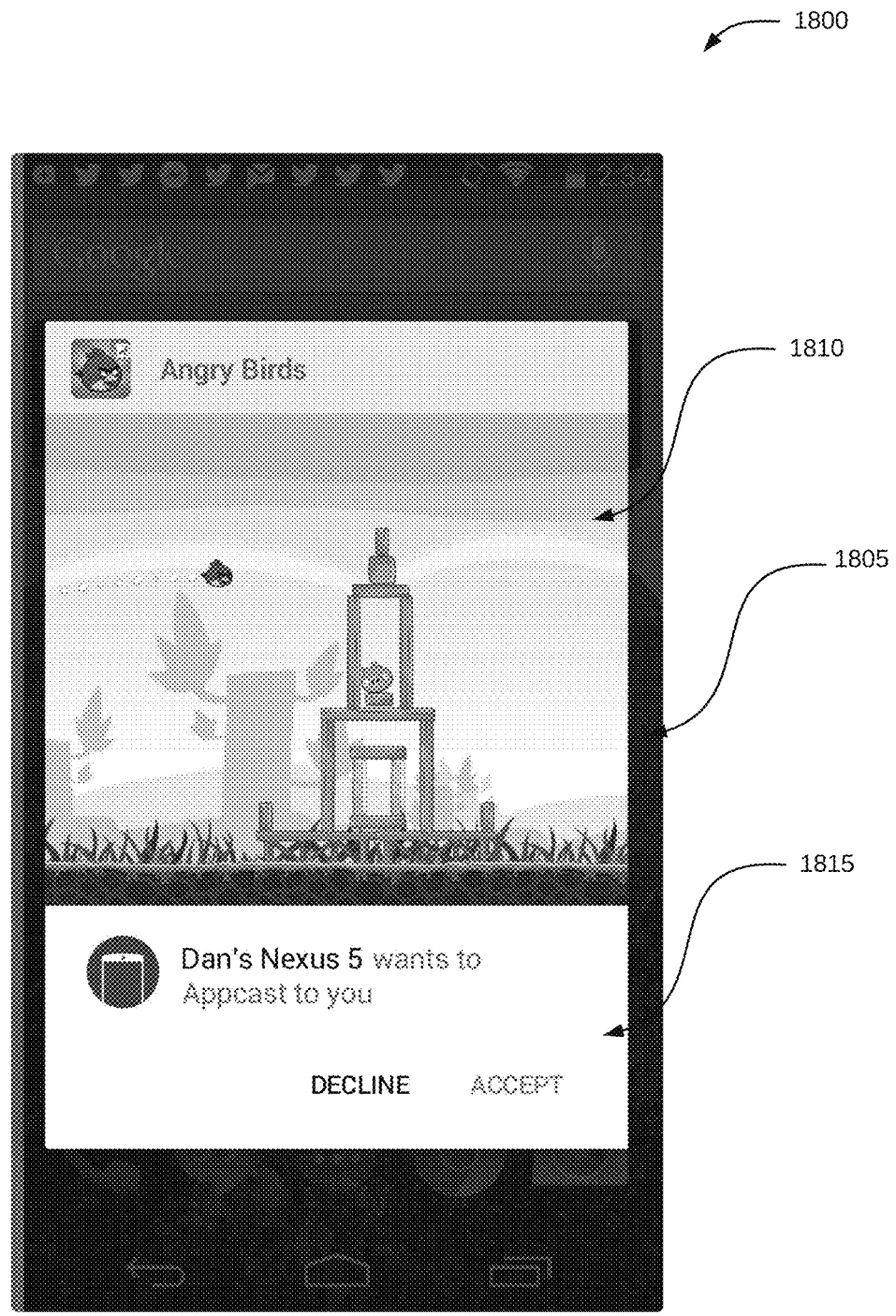

FIGS. 18A and 18B, collectively, is an example GUI 1800 of a task manager 1805 on the second computing device 140 illustrating notification and launching of an application app cast from a first computing device 130 using the task manager 255. FIG. 18A illustrates the task manager 1805 of the second computing device 140 providing a user notification of an application being app casted to the second computing device. In FIG. 18A, the task manager 1805 notifies the user by displaying a portion of the tile 1810 associated with the application that was app cast from the first computing device 130. In some embodiments, the user of the second computing device 140 can access the displayed portion of the tile 1810 to initiate the launch of the app casted application on the second computing device 140.

FIG. 18B illustrates the launch notification 1815 provided by the task manager 1805 when the user of the second computing device 140 accesses the portion of the tile 1810 displayed is FIG. 18A. The user of the second computing device 140 can either accept or decline the application app cast from the first computing device 130. In some embodiments, the task manager 1805 invokes the conflict resolution module when more than one state data of the application app cast from the first computing device 130 is available in the second computing device 140.

It should be noted that the features of app casting and app pulling can be implemented independent of the task manager 255, 1805. In some embodiments, features of the app casting and app pulling processes can be implemented within the applications being app cast/app pulled. Such an application can interact with the server or other instances of the application on the various computing devices to perform app casting/app pulling when requested by the user. In some embodiments, features of the app casting and app pulling processes can be implemented within the framework of the various operating systems running on the various computing devices. Such operating systems can interact with each other to perform app casting/app pulling when requested by the user.

In some embodiments, features of the app casting and app pulling processes can be implemented within a particular application. The particular application can be installed on the various computing devices to enable the various computing device to app cast/app pull from each other, where the instances of the particular application on the various computing devices interact with each other to provide the app cast/app pull feature to any application executing on the various computing devices. In some embodiments, each instance of the particular application utilizes the framework of the operating system running on a given computing device to enable the app cast/app pull process. Therefore, the features of app casting and app pulling should not be limited to being implemented in conjunction with the task manager 255, 1805

Figure 19:
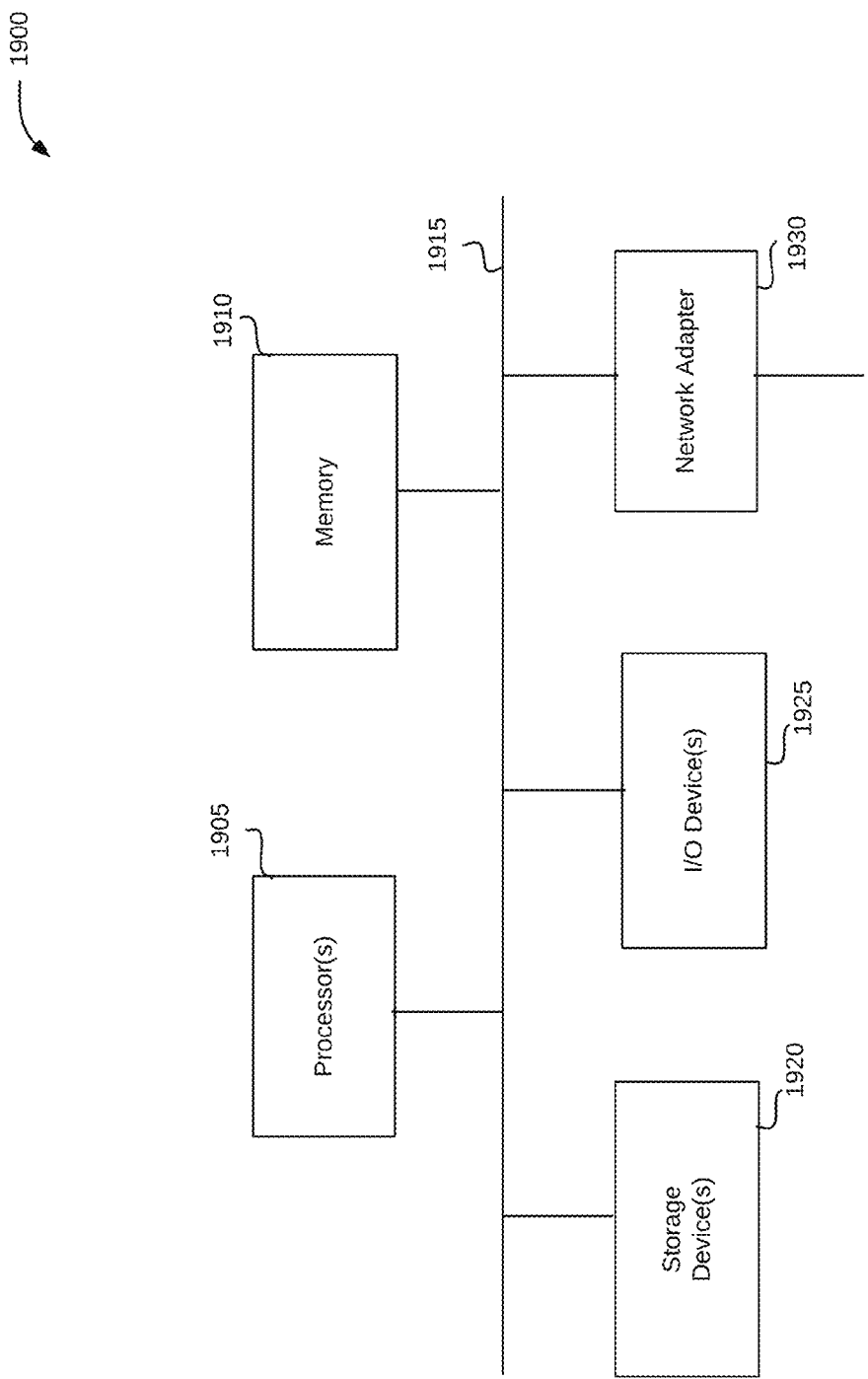
FIG. 19 is a block diagram of a computer system as may be used to implement features of some embodiments of the disclosed technology.

FIG. 19 is a block diagram of a computer system as may be used to implement features of some embodiments of the disclosed technology. The computing system 1900 may be used to implement any of the entities, components or services depicted in the examples of FIGS. 1-18 (and any other components described in this specification). The computing system 1900 may include one or more central processing units ("processors") 1905, memory 1910, input/output devices 1925 (e.g., keyboard and pointing devices, display devices), storage devices 1920 (e.g., disk drives), and network adapters 1930 (e.g., network interfaces) that are connected to an interconnect 1915. The interconnect 1915 is illustrated as an abstraction that represents any one or more separate physical buses, point to point connections, or both connected by appropriate bridges, adapters, or controllers. The interconnect 1915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1910 and storage devices 1920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1910 can be implemented as software and/or firmware to program the processor(s) 1905 to carry out actions described above. In some embodiments, such software or firmware may be initially provided to the computing system 1900 by downloading it from a remote system through the computing system 1900 (e.g., via network adapter 1930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method comprising:
receiving, at a server and from a first mobile computing device of a group of mobile computing devices associated with a user, a request to transfer execution of an application from a second mobile computing device of the group to a third mobile computing device of the group, the application being one of a plurality of applications displayed in a master task list on the first mobile computing device, the master task list containing information regarding (a) a plurality of applications executing on each of the group of mobile computing devices and (b) device identification of one or more of the group of mobile computing devices at which the applications are executing;
identifying, by the server, an installation of an instance of the application on the third mobile computing device, the instance of the application including an instance of another application similar to the instance of the application;
synchronizing, by the server, state data of the application between the second mobile computing device and the third mobile computing device, the state data representing a current state of execution of the application at the second mobile computing device;
transmitting, by the server, a first message to the third mobile computing device to launch the application at the third mobile computing device, the first message further instructing the third mobile computing device to resume execution of the application using the state data obtained from the second mobile computing device; and
updating, by the server, the master task list to generate an updated master task list, the updated master task list indicating that the application is executing on the third mobile computing device, the updating further including transmitting the updated master task list to the first mobile computing device.

2. The computer-implemented method of claim 1, wherein synchronizing the state data of the application between the second mobile computing device and the third mobile computing device further comprises:
comparing a first hash value corresponding to the state data of the application with a second hash value corresponding to an earlier shared state data of the application, the earlier shared state data being stored at the third mobile computing device, the earlier shared state data stored at the third mobile computing device being a function of a particular state of execution of the application at the second mobile computing device; and
transmitting an update to the earlier shared state data of the application when the first hash value and the second hash value do not match, the update being a function of the current state of execution of the application at the second mobile computing device and the earlier shared state data stored at the third mobile computing device,
wherein the third mobile computing device resumes execution of the application using the earlier shared state data of the application when the first hash value and the second hash value matches.

3. The computer-implemented method of claim 1, further comprising:
transmitting, by the server, a second message to the second mobile computing device to terminate the execution of the application on the second mobile computing device; and
updating, by the server, the master task list to generate an updated master task list, the updated master task list indicating that the application is terminated on the second mobile computing device.

4. The computer-implemented method of claim 1, wherein the group of mobile computing devices includes a plurality of mobile computing devices connected to at least one of a particular Wi-Fi network, a particular local area network, or a particular peer-to-peer network.

5. The computer-implemented method of claim 1, wherein synchronizing the state data of the application between the second mobile computing device and the third mobile computing device further comprises:
receiving a request for the state data of the application stored in the second mobile computing device; and
transmitting a portion of the state data from the second mobile computing device to the third mobile computing device.

6. The computer-implemented method of claim 1, wherein synchronizing the state data of the application between the second mobile computing device and the third mobile computing device further comprises transmitting a portion of the state data from the second mobile computing device to the third mobile computing device.

7. The computer-implemented method of claim 1, wherein the particular state of execution of the application at the second mobile computing device corresponds to an execution state of the application prior to the application being placed in a partial hibernation.

8. The computer-implemented method of claim 1 further comprising:
sending, by the server, a third message to the second mobile computing device to terminate the execution of the application on the second computing device.

9. The computer-implemented method of claim 1, wherein synchronizing the state data of the application includes:
receiving, by the server, a portion of the state data from the second mobile computing device, and
transmitting, by the server, the portion of the state data to the third mobile computing device.

10. The computer-implemented method of claim 1, wherein synchronizing the state data of the application includes:
transmitting, by the server, a third message to the third mobile computing device instructing the third mobile computing device to obtain the state data from the second mobile computing device over a short range wireless communication.

11. The computer-implemented method of claim 1, wherein the state data is used for executing the application at the third mobile computing device at a state at which the application is executing on the second mobile computing device at the time of being terminated.

12. The computer-implemented method of claim 1, wherein sending the first message to launch the application includes:
determining, by the server, if the application is installed on the third mobile computing device, and
responsive to a determination that the application is not installed on the third mobile computing device, sending a third message to the third mobile computing device to install the application.

13. A server comprising:
a processor;
a network component that facilitates communication with a group of computing devices associated with a user; and
a memory having instructions, which when executed by the processor, performs a method including:
   receiving, at the server and from a first mobile computing device of a group of mobile computing devices associated with a user, a request to transfer execution of an application from a second mobile computing device of the group to a third mobile computing device of the group, the application being one of a plurality of applications displayed in a master task list on the first mobile computing device, the master task list containing information regarding (a) a plurality of applications executing on each of the group of mobile computing devices and (b) device identification of one or more of the group of mobile computing devices at which the applications are executing;
   identifying, by the server, an installation of an instance of the application on the third mobile computing device, the instance of the application including an instance of another application similar to the instance of the application;
   synchronizing, by the server, state data of the application between the second mobile computing device and the third mobile computing device, the state data representing a current state of execution of the application at the second mobile computing device;
   transmitting, by the server, a first message to the third mobile computing device to launch the application at the third mobile computing device, the first message further instructing the third mobile computing device to resume execution of the application using the state data obtained from the second mobile computing device; and
   updating, by the server, the master task list to generate an updated master task list, the updated master task list indicating that the application is executing on the third mobile computing device, the updating further including transmitting the updated master task list to the first mobile computing device.

14. The server of claim 13, wherein synchronizing the state data of the application between the second mobile computing device and the third mobile computing device further comprises:
   comparing a first hash value corresponding to the state data of the application with a second hash value corresponding to an earlier shared state data of the application, the earlier shared state data being stored at the third mobile computing device, the earlier shared state data stored at the third mobile computing device being a function of a particular state of execution of the application at the second mobile computing device; and
   transmitting an update to the earlier shared state data of the application when the first hash value and the second hash value do not match, the update being a function of the current state of execution of the application at the second mobile computing device and the earlier shared state data stored at the third mobile computing device,
   wherein the third mobile computing device resumes execution of the application using the earlier shared state data of the application when the first hash value and the second hash value matches.

15. The server of claim 13, wherein the memory further includes instructions for performing a method comprising:
   transmitting, by the server, a second message to the second mobile computing device to terminate the execution of the application on the second mobile computing device; and
   updating, by the server, the master task list to generate an updated master task list, the updated master task list indicating that the application is terminated on the second mobile computing device.

16. The server of claim 13, wherein the group of mobile computing devices includes a plurality of mobile computing devices connected to at least one of a particular Wi-Fi network, a particular local area network, or a particular peer-to-peer network.

17. The server of claim 13, wherein synchronizing the state data of the application between the second mobile computing device and the third mobile computing device further comprises:
   receiving a request for the state data of the application stored in the second mobile computing device; and
   transmitting a portion of the state data from the second mobile computing device to the third mobile computing device.

18. The server of claim 13, wherein synchronizing the state data of the application between the second mobile computing device and the third mobile computing device further comprises transmitting a portion of the state data from the second mobile computing device to the third mobile computing device.

19. The server of claim 13, wherein the particular state of execution of the application at the second mobile computing device corresponds to an execution state of the application prior to the application being placed in a partial hibernation.

20. The server of claim 13, wherein the memory includes instructions for performing the method further comprising:
   sending, by the server, a third message to the second mobile computing device to terminate the execution of the application on the second computing device.

21. The server of claim 13, wherein synchronizing the state data of the application includes:
   receiving, by the server, a portion of the state data from the second mobile computing device, and
   transmitting, by the server, the portion of the state data to the third mobile computing device.

22. The server of claim 13, wherein synchronizing the state data of the application includes:
   transmitting, by the server, a third message to the third mobile computing device instructing the third mobile computing device to obtain the state data from the second mobile computing device over a short range wireless communication.

23. The server of claim 13, wherein the state data is used for executing the application at the third mobile computing device at a state at which the application is executing on the second mobile computing device at the time of being terminated.

24. The server of claim 13, wherein sending the first message to launch the application includes:
   determining, by the server, if the application is installed on the third mobile computing device, and
   responsive to a determination that the application is not installed on the third mobile computing device, sending a third message to the third mobile computing device to install the application.

25. A non-transitory computer-readable storage medium storing computer-executable instructions, comprising:
   instructions for receiving, at a server and from a first mobile computing device of a group of mobile computing devices associated with a user, a request to transfer execution of an application from a second mobile computing device of the group to a third mobile computing device of the group, the application being one of a plurality of applications displayed in a master task list on the first mobile computing device, the master task list containing information regarding (a) a plurality of applications executing on each of the group of mobile computing devices and (b) device identification of one or more of the group of mobile computing devices at which the applications are executing;

instructions for identifying, by the server, an installation of an instance of the application on the third mobile computing device, the instance of the application including an instance of another application similar to the instance of the application; instructions for synchronizing, by the server, state data of the application between the second mobile computing device and the third mobile computing device, the state data representing a current state of execution of the application at the second mobile computing device;

transmitting, by the server, a first message to the third mobile computing device to launch the application at the third mobile computing device, the first message further instructing the third mobile computing device to resume execution of the application using the state data obtained from the second mobile computing device; and instructions for updating, by the server, the master task list to generate an updated master task list, the updated master task list indicating that the application is executing on the third mobile computing device, the updating further including transmitting the updated master task list to the first mobile computing device.

26. The computer-readable storage medium of claim 25, wherein the instructions for synchronizing the state data of the application between the second mobile computing device and the third mobile computing device further comprises:

instructions for comparing a first hash value corresponding to the state data of the application with a second hash value corresponding to an earlier shared state data of the application, the earlier shared state data being stored at the third mobile computing device, the earlier shared state data stored at the third mobile computing device being a function of a particular state of execution of the application at the second mobile computing device; and instructions for transmitting an update to the earlier shared state data of the application when the first hash value and the second hash value do not match, the update being a function of the current state of execution of the application at the second mobile computing device and the earlier shared state data stored at the third mobile computing device, wherein the third mobile computing device resumes execution of the application using the earlier shared state data of the application when the first hash value and the second hash value matches.

27. The computer-readable storage medium of claim 25, further comprising:

instructions for transmitting, by the server, a second message to the second mobile computing device to terminate the execution of the application on the second mobile computing device; and instructions for updating, by the server, the master task list to generate an updated master task list, the updated master task list indicating that the application is terminated on the second mobile computing device.

28. The computer-readable storage medium of claim 25, wherein the instructions for synchronizing the state data of the application between the second mobile computing device and the third mobile computing device further comprises:

instructions for receiving a request for the state data of the application stored in the second mobile computing device; and instructions for transmitting a portion of the state data from the second mobile computing device to the third mobile computing device.

29. The computer-readable storage medium of claim 25, wherein the instructions for synchronizing the state data of the application between the second mobile computing device and the third mobile computing device further comprises instructions for transmitting a portion of the state data from the second mobile computing device to the third mobile computing device.

30. The computer-readable storage medium of claim 25, wherein the particular state of execution of the application at the second mobile computing device corresponds to an execution state of the application prior to the application being placed in a partial hibernation.

* * * * *